US012459933B2

(12) United States Patent
Crowley et al.

(10) Patent No.: US 12,459,933 B2
(45) Date of Patent: Nov. 4, 2025

(54) COMPOUNDS AND METHODS OF USE THEREOF AS ANTIBACTERIAL AGENTS

(71) Applicant: Merck Sharp & Dohme LLC, Rahway, NJ (US)

(72) Inventors: Brendan M. Crowley, Collegeville, PA (US); Philippe Nantermet, Lansdale, PA (US); David Olsen, Lansdale, PA (US); Takao Suzuki, Shanghai (CN)

(73) Assignee: Merck Sharp & Dohme LLC, Rahway, NJ (US)

( * ) Notice: Subject to any disclaimer, the term of this patent is extended or adjusted under 35 U.S.C. 154(b) by 827 days.

(21) Appl. No.: 17/619,338

(22) PCT Filed: Jun. 2, 2020

(86) PCT No.: PCT/CN2020/093887
§ 371 (c)(1),
(2) Date: Dec. 15, 2021

(87) PCT Pub. No.: WO2021/000684
PCT Pub. Date: Jan. 7, 2021

(65) Prior Publication Data
US 2022/0235041 A1 Jul. 28, 2022

(30) Foreign Application Priority Data
Jul. 3, 2019 (WO) ................ PCT/CN2019/094601

(51) Int. Cl.
C07D 413/14 (2006.01)
A61K 31/422 (2006.01)
A61K 31/437 (2006.01)
A61K 31/541 (2006.01)
A61K 45/06 (2006.01)
A61P 31/06 (2006.01)
A61P 31/08 (2006.01)
C07D 413/10 (2006.01)
C07D 413/12 (2006.01)
C07D 417/10 (2006.01)
C07D 471/04 (2006.01)

(52) U.S. Cl.
CPC .......... *C07D 413/14* (2013.01); *A61K 31/422* (2013.01); *A61K 31/437* (2013.01); *A61K 31/541* (2013.01); *A61K 45/06* (2013.01); *A61P 31/06* (2018.01); *A61P 31/08* (2018.01); *C07D 413/10* (2013.01); *C07D 413/12* (2013.01); *C07D 417/10* (2013.01); *C07D 471/04* (2013.01)

(58) Field of Classification Search
CPC .................................................. C07D 413/14
See application file for complete search history.

(56) References Cited

U.S. PATENT DOCUMENTS

2015/0038438 A1  2/2015  Branstrom

FOREIGN PATENT DOCUMENTS

| CN | 101220000 B | 12/2010 |
|----|-------------|---------|
| WO | 1997023212 A1 | 7/1997 |
| WO | 1998007708 A1 | 2/1998 |
| WO | 1999041244 A1 | 8/1999 |
| WO | 2003035073 A1 | 5/2003 |
| WO | 2004029066 A2 | 4/2004 |
| WO | 2004048392 A1 | 6/2004 |
| WO | 2004078753 A1 | 9/2004 |
| WO | 2005058886 A1 | 6/2005 |
| WO | 2005116021 A1 | 12/2005 |
| WO | 2017066964 A1 | 4/2017 |
| WO | 2017070024 A1 | 4/2017 |
| WO | 2021000684 A1 | 1/2021 |
| WO | 2021001330 A1 | 1/2021 |
| WO | 2021001331 A1 | 1/2021 |
| WO | 2021001420 A1 | 1/2021 |
| WO | 2021001423 A1 | 1/2021 |

OTHER PUBLICATIONS

American Chemical Society Reg Stn On the Web Feb. 13, 2017 (Feb. 13, 2017), 45 pages.
Barbachyn, Michael R. et al., Identification of Phenylisoxazolines as Novel and Viable Antibacterial Agents Active against Gram-Positive Pathogens, Journal of Medicinal Chemistry, 2003, 284-302, 46(2).
Bloom, Barry R. et al., The Evolving Relation Between Humans and *Mycobacterium tuberculosis*, The New England Journal of Medicine, 1998, 677-678, 338.

(Continued)

Primary Examiner — John S Kenyon
Assistant Examiner — Sara Elizabeth Bell
(74) Attorney, Agent, or Firm — James Corcoran; Catherine D. Fitch

(57) ABSTRACT

Disclosed are dihydroisoxazole compounds of Formula (I) and pharmaceutically acceptable salts thereof, wherein A, E, and $R^1$ are as defined herein. Also disclosed are compositions which comprise at least one of these dihydroisoxazole compounds, methods for inhibiting growth of mycobacterial cells as well as a method of treating mycobacterial infections by *Mycobacterium tuberculosis* comprising administering a therapeutically effective amount of these dihydroisoxazole compounds and/or a pharmaceutically acceptable salt thereof, or a composition comprising such compound and/or salt.

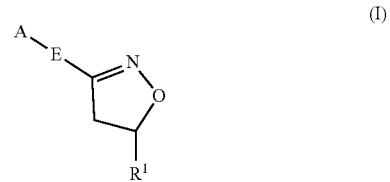

(I)

32 Claims, No Drawings

(56) References Cited

OTHER PUBLICATIONS

Dadiboyena, Sureshbabu et al., Solid phase synthesis of isoxazole and isoxazoline-carboxamides via [2+ 3 ]—di polar cycloaddition using resin-bound alkynes or alkenes, Tetrahedron Letters, 2012, 2096-2099, 53(16).

Flanagan, Shawn, et al., Nonclinical and Pharmacokinetic Assessments to Evaluate the Potential of Tedizolid and Linezolid To Affect Mitochondrial Function, Antimicrobial Agents and Chemotherapy, 2015, p. 178-185, vol. 59, No. 1.

Hickey et al., Experimental model of reversible myelosuppression caused by short-term, high-dose oxazolidinone administration, Therapy, 2006, 521-526, 3(4).

Hurdle, Julian G. et al., A microbiological assessment of novel nitrofuranylamides as anti-tuberculosis agents, Journal of Antimicrobial Chemotherapy, 2008, 1037-1045, 62.

Kaufmann, Stefan H.E. et al., Tuberculosis: a neglected disease strikes back, Trends in Microbiology, 1993, 2-5, 1.

Kovganko, V.N. et al., 4, 5-Dihydroisoxazoles in the synthesis of new metallomesogens, Russian Journal of Organic Chemistry, 2006, 430-434, 42(3).

Lee, Myungsun, Linezolid for Treatment of Chronic Extensively Drug-Resistant Tuberculosis, The New England Journal of Medicine, 2012, p. 1508-1518, vol. 367, No. 16.

Patel, Nandini C. et al., Discovery and Characterization of a Novel Dihydroisoxazole Class of alpha-Amino-3-hydroxy-5-methyl-4-isoxazole-propionic acid (AMPA) Receptor Potentiators, J. Med. Chem., 2013, 9180-9191, 56(22).

Rakesh, Dianqing Sun et al., Synthesis, optimization and structureeactivity relationships of 3, 5-disubstituted soxazolines as new anti-tuberculosis agents, European Journal of Medicinal Chemistry, 2009, 460-472, 44.

Triandafillidi, Ierasia et al., Green Organocatalytic Synthesis of Isoxazolines via a One-Pot Oxidation of Allyloximes, Org. Lett., 2017, 106-109, 19(1).

Meanwell, N. A., Synopsis of Some Recent Tactical Application of Bioisosteres in Drug Design, J. Med. Chem, vol. 54, p. 2529-2591, 2011.

COMPOUNDS AND METHODS OF USE THEREOF AS ANTIBACTERIAL AGENTS

CROSS-REFERENCE TO RELATED APPLICATIONS

This application is a U.S. National Phase application under 35 U.S.C. § 371 of PCT Application No. PCT/CN2020/093887, filed Jun. 2, 2020, which published as WO 2021/000684 on Jan. 7, 2021, and claims priority under 35 U.S.C. § 365(b) from PCT Application No. PCT/CN2019/094601, filed Jul. 3, 2019.

FIELD OF THE INVENTION

The present invention relates to novel dihydroisoxazole compounds, and pharmaceutically acceptable salts thereof, useful for the treatment of bacterial infections, particularly mycobacterial infections, as well as, pharmaceutical compositions containing such compounds and processes of making such compounds. The invention also relates to methods of use of dihydroisoxazole compounds for the treatment of mycobacterial infections such as those caused by *Mycobacteria tuberculosis*.

BACKGROUND OF THE INVENTION

*Mycobacterium* is a genus of bacterium, neither truly gram-positive nor truly gram-negative, including pathogens responsible for tuberculosis (*M. tuberculosis*) and leprosy (*M. leprae*). Tuberculosis (TB), in particular, despite the availability of anti-TB drugs such as isoniazide and rifampin, is considered to be one of the world's deadliest diseases. According to World Health Organization, in 2012, there were 8.6 million new TB cases and 1.3 million TB deaths. See, Global tuberculosis report 2013 published by the World Health Organization. Complicating the TB epidemic is the rising tide of multi-drug-resistant strains, and the deadly association with HIV. People who are HIV-positive and infected with TB are 30 times more likely to develop active TB than people who are HIV-negative, and TB is responsible for the death of one out of every three people with HIV/AIDS worldwide. See, e.g., Kaufmann et al., *Trends Microbiol.* 1: 2-5 (1993) and Bloom et al., *N. Engl. J. Med.* 338: 677-678 (1998).

*Mycobacteria* other than *M. tuberculosis* are increasingly found in opportunistic infections that plague the AIDS patient. Organisms from the *M. avium-intracellulare* complex (MAC), especially serotypes four and eight, account for 68% of the mycobacterial isolates from AIDS patients. Enormous numbers of MAC are found (up to 1010 acid-fast bacilli per gram of tissue), and consequently, the prognosis for the infected AIDS patient is poor.

Several antibiotics have been approved or are in clinical trials for the treatment of gram-positive bacterial infections such as methicillin resistant *Staphylococcus aureus*. Examples of antibiotics include linezolid (Zyvox™, Pfizer Inc., New York, NY) and tedizolid (Sivextro™, Merck Sharp & Dohme Corp., Kenilworth, NJ). Tedizolid is used to treat acute bacterial skin and skin structure infections caused by specific susceptible gram-positive bacteria. Linezolid is indicated for the treatment of several infections caused by susceptible strains of gram-positive microorganisms including nosocomial pneumonia, complicated skin and skin structure infections, and community-acquired pneumonia. In addition, it is currently being tested for the treatment of multi-drug resistant (MDR) and extensively drug-resistant (XDR) *Mycobacterium tuberculosis* (Mtb) in clinical trials. Lee et al., *N. Engl. J. Med* 367: 1508-18 (2012). Despite clinical efficacy in treating these diseases, long-term use of linezolid has been associated with adverse events including myelosuppression (including anemia and leukopenia) (Hickey et al., Therapy 3(4):521-526 (2006), neuropathy, and serotonin syndrome. These adverse events are hypothesized to be associated with the inhibition of mitochondrial protein synthesis. Flanagan et al., *Antimicrobial Agents and Chemotherapy* 59(1):178-185 (2015).

Development of new antibiotics that are safer than approved antibiotics yet at least as effective would greatly benefit Mtb patients.

SUMMARY OF THE INVENTION

The present invention is directed to certain novel dihydroisoxazole compounds which have antibacterial activity. The compounds, and their pharmaceutically acceptable salts, can be useful, for example, for the treatment of bacterial infections, for example, mycobacterial infections. More particularly, the present invention includes compounds of Formula I, or a pharmaceutically acceptable salt thereof:

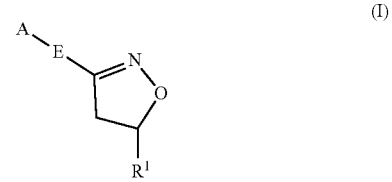

(I)

wherein $R^1$, A and E are described in detail below.

The present invention also relates to a pharmaceutical composition for treating a bacterial infection in a subject, particularly an *M. tuberculosis* infection, comprising a compound of the invention and a pharmaceutically acceptable carrier, diluent or excipient.

The Compounds of Formula (I) (also referred to herein as the "Dihydroisoxazole Compounds") and pharmaceutically acceptable salts thereof can be useful, for example, for inhibiting the growth of *Mycobacterium tuberculosis*, and/or for treating or preventing tuberculosis in a patient. Without being bound by any specific theory, it is believed that uses of the compounds of the invention for the treatment of tuberculosis are likely to cause less myelosuppression than approved antibacterial compounds such as linezolid because they are not associated with a high degree of inhibition of mitochondrial protein synthesis.

The present invention is also directed to 1) methods of treating tuberculosis in a subject in need of treatment thereof, comprising administering to the subject an effective amount of a dihydroisoxazole compound; and 2) uses of a dihydroisoxazole compound for the treatment of tuberculosis.

Embodiments, sub-embodiments and features of the present invention are either further described in or will be apparent from the ensuing description, examples and appended claims.

DETAILED DESCRIPTION OF THE INVENTION

In vitro testing of the compounds of Formula I revealed such compounds had excellent potency in inhibiting the growth of *Mycobacteria tuberculosis*, but are not associated with a high degree of mitochondrial protein synthesis inhibition. Thus, compounds of Formula I and their pharmaceutically acceptable salts are expected to be useful for the treatment of mycobacterial tuberculosis (Mtb), yet not lead to the side effects such as myelosuppression that are associated with linezolid, which is approved for treatment of Gram-positive infections. Therefore, such compounds would have significant advantages over linezolid and analogs as Mtb therapeutic agents.

The Compounds of Formula (I)

Described herein are compounds of Formula I:

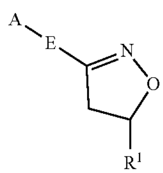

(I)

or a pharmaceutically acceptable salt thereof, wherein $R^1$ is —$CH_2N(R^2)_2$, —$CH_2NR^2COR^3$, —$CH_2NR^2COOR^3$, —$CH_2NR^2CON(R^2)_2$, —$CH_2NR^2CONR^2N(R^2)_2$, —$CH_2NR^2SO_2R^3$, —CON$(R^2)_2$, —C═$NOR^3$, —$CH_2OR^4$, —$CH_2NR^2R^4$, —$CH_2R^6$ or —$CH_2OC(O)N(R^2)_2$;

each occurrence of $R^2$ is independently selected from the group consisting of H, $C_1$-$C_6$ alkyl, $C_2$-$C_6$ alkenyl, and $C_3$-$C_6$ cycloalkyl, wherein said $C_1$-$C_6$ alkyl, said $C_2$-$C_6$ alkenyl, and said $C_3$-$C_6$ cycloalkyl can be optionally substituted with up to four substituents, which are independently selected from the group consisting of halogen, —$OCH_3$, —OH, —$NH_2$, —$NHCH_3$, and —$N(CH_3)_2$;

$R^3$ is H, $C_1$-$C_6$ alkyl, $C_2$-$C_6$ alkenyl, a 4- or 5-membered heterocycloalkyl or $C_3$-$C_6$ cycloalkyl, wherein said $C_1$-$C_6$ alkyl, said $C_2$-$C_6$ alkenyl, said 4- or 5-membered heterocycloalkyl and said $C_3$-$C_6$ cycloalkyl can be optionally substituted with up to four substituents, which are independently selected from the group consisting of halogen, $C_1$-$C_6$ alkyl, halo$C_1$-$C_6$ alkyl, CN, —$OCH_3$, —OH, —$NH_2$, —$NHCH_3$, and —$N(CH_3)_2$;

$R^4$ is H or a 5- or 6-membered heterocycle, which is optionally substituted with $R^5$;

$R^5$ is H, halogen, $C_1$-$C_6$ alkyl, $C_3$-$C_6$ alkenyl, or $C_3$-$C_6$ cycloalkyl, wherein said $C_1$-$C_6$ alkyl, said $C_3$-$C_6$ alkenyl, and said $C_3$-$C_6$ cycloalkyl can be optionally substituted with up to four substituents, which are independently selected from the group consisting of halogen, —$OCH_3$, —OH, —$NH_2$, —$NHCH_3$, and —$N(CH_3)_2$;

$R^6$ is H, $C_1$-$C_6$ alkyl, or a 5-membered heterocycle, wherein said 5-membered heterocycle is optionally substituted with up to two $R^7$;

each occurrence of $R^7$ is H, halogen, oxo, $C_1$-$C_6$ alkyl, $C_2$-$C_6$ alkenyl, or $C_3$-$C_6$ cycloalkyl, wherein said $C_1$-$C_6$ alkyl and said $C_3$-$C_6$ cycloalkyl can be optionally substituted with from one to four substituents which are independently selected from the group consisting of halogen, —$OCH_3$, —OH, —$NH_2$, —$NHCH_3$, and —$N(CH_3)_2$;

E is a 6-membered aryl or a 5- or 6-membered heteroaryl containing from one to three heteroatoms independently selected from the group consisting of S, O, and N, wherein said aryl and said heteroaryl are optionally substituted with up to four substituents, which are independently selected from the group consisting of halogen, —CN, —$CF_3$, —$CHF_2$, —$CH_2NH_2$, —$CH_2NHCOCH_3$, —$OCF_3$, —$OCHF_2$, —OH, —O—$(C_1$-$C_6)$alkyl, $C_1$-$C_6$ alkyl, and $C_3$-$C_6$ cycloalkyl; A is a heterocycle optionally substituted with up to four $R^8$, or an aryl optionally substituted with up to four $R^8$;

each occurrence of $R^8$ is independently selected from the group consisting of halogen, $C_1$-$C_6$ alkyl, $C_3$-$C_6$ cycloalkyl, $C_1$-$C_6$alkylheterocycloalkyl, heterocycloalkyl, —Oheterocycloalkyl, benzyl, —$OCF_3$, —$OCHF_2$, —$OR^3$, ═O, —CN, —$NO_2$, —$SR^3$, —$SF_5$, —$SCF_3$, —$SOR^3$, —$SO_2R^3$, —S(═O)(═N)$R^2$, —$N(R^2)_2$, —$NR^2COR^3$, —$SO_2N(R^2)_2$, —$NR^2SO_2R^3$, —COOH, —$COR^9$, —$COOR^3$, —$CON(R^2)_2$, (═N)$R^2$ and —$C(R^9)_2N(R^2)_2$, wherein said $C_1$-$C_6$ alkyl, $C_3$-$C_6$ cycloalkyl, $C_1$-$C_6$alkylheterocycloalkyl, heterocycloalkyl, —Oheterocycloalkyl, and benzyl are optionally substituted with up to four methyl, F, —$OCH_3$, —OH, ═O, $NH_2$, $NHCH_3$, or $N(CH_3)_2$; and each occurrence of $R^9$ is independently selected from the group consisting of H, $C_1$-$C_6$ alkyl, and $C_3$-$C_6$ cycloalkyl.

More particularly, the present invention includes compounds of Formula I, or a pharmaceutically acceptable salt thereof:

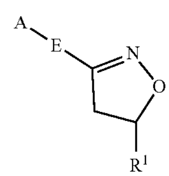

(I)

wherein $R^1$ is —$CH_2N(R^2)_2$, —$CH_2NR^2COR^3$, —$CH_2NR^2COOR^3$, —$CH_2NR^2CON(R^2)_2$, —$CH_2NR^2CONR^2N(R^2)_2$, —$CH_2NR^2SO_2R^3$, —CON$(R^2)_2$, —C═$NOR^3$, —$CH_2OR^4$, —$CH_2NR^2R^4$, or —$CH_2R^6$;

each occurrence of $R^2$ is independently selected from the group consisting of H, $C_1$-$C_6$ alkyl, $C_2$-$C_6$ alkenyl, and $C_3$-$C_6$ cycloalkyl, wherein said $C_1$-$C_6$ alkyl, said $C_2$-$C_6$ alkenyl, and said $C_3$-$C_6$ cycloalkyl can be optionally substituted with up to four substituents, which are independently selected from the group consisting of halogen, —$OCH_3$, —OH, $NH_2$, $NHCH_3$, and $N(CH_3)_2$;

$R^3$ is H, $C_1$-$C_6$ alkyl, $C_2$-$C_6$ alkenyl, 4-membered heterocycloalkyl and $C_3$-$C_6$ cycloalkyl, wherein said $C_1$-$C_6$ alkyl, said $C_2$-$C_6$ alkenyl, 4-membered heterocycloalkyl and said $C_3$-$C_6$ cycloalkyl can be optionally substituted with up to four substituents, which are independently selected from the group consisting of halogen, $C_1$-$C_6$ alkyl, —$OCH_3$, —OH, —$NH_2$, —$NHCH_3$, and —$N(CH_3)_2$;

$R^4$ is H or a 5- or 6-membered heterocycle, which is optionally substituted with $R^5$; $R^5$ is selected from the group consisting of H, halogen, $C_1$-$C_6$ alkyl, $C_3$-$C_6$ alkenyl, and $C_3$-$C_6$ cycloalkyl, wherein said $C_1$-$C_6$ alkyl, said $C_3$-$C_6$ alkenyl, and said $C_3$-$C_6$ cycloalkyl can be optionally substituted with up to four substituents, which are independently selected from the group consisting of halogen, —$OCH_3$, —OH, $NH_2$, $NHCH_3$, and $N(CH_3)_2$;

R⁶ is H, $C_1$-$C_6$ alkyl, or a 5-membered heterocycle, wherein said 5-membered heterocycle is optionally substituted with up to two R⁷;

R⁷ is H, halogen, oxo, $C_1$-$C_6$ alkyl, $C_2$-$C_6$ alkenyl, or $C_3$-$C_6$ cycloalkyl, wherein said $C_1$-$C_6$ alkyl and said $C_3$-$C_6$ cycloalkyl can be optionally substituted with from one to four substituents which are independently selected from the group consisting of halogen, $OCH_3$, OH, $NH_2$, $NHCH_3$, and $N(CH_3)_2$;

E is a 6-membered aryl or a 5- or 6-membered heteroaryl containing from one to three heteroatoms independently selected from the group consisting of S, O, and N, wherein said aryl and said heteroaryl are optionally substituted with up to four substituents, which are independently selected from the group consisting of halogen, —CN, —$CF_3$, —$CHF_2$, —$CH_2NH_2$, —$CH_2NHCOCH_3$, —$OCF_3$, —$OCHF_2$, —OH, —O—($C_1$-$C_6$)alkyl, $C_1$-$C_6$ alkyl, and $C_3$-$C_6$ cycloalkyl;

A is a heterocycle optionally substituted with up to four R⁸, or an aryl substituted with up to four R⁸;

each occurrence of R⁸ is independently selected from the group consisting of halogen, $C_1$-$C_6$ alkyl, $C_3$-$C_6$ cycloalkyl, $C_1$-$C_6$alkylheterocycloalkyl, heterocycloalkyl, benzyl, —$OCF_3$, —$OCHF_2$, —OR³, =O, —CN, —$NO_2$, —SR³, —$SF_5$, —$SCF_3$, —SOR³, —$SO_2R^3$, —S(=O)(=N)R², —N(R²)₂, —NR²COR³, —$SO_2$N(R²)₂, —NR²$SO_2R^3$, —COOH, —COR⁹, —COOR³, —CON(R²)₂ and —C(R⁹)₂N(R²)₂, wherein said $C_1$-$C_6$ alkyl, $C_3$-$C_6$ cycloalkyl, $C_1$-$C_6$alkylheterocycloalkyl, heterocycloalkyl, and benzyl are optionally substituted with up to four methyl, F, —$OCH_3$, —OH, =O, $NH_2$, $NHCH_3$, and $N(CH_3)_2$; and each occurrence of R⁹ is independently selected from the group consisting of H, $C_1$-$C_6$ alkyl, and $C_3$-$C_6$ cycloalkyl.

In one aspect, the present invention includes compounds of Formula I:

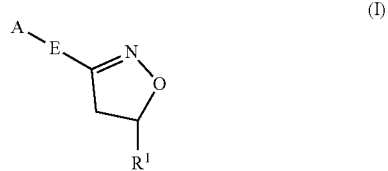

(I)

and pharmaceutically acceptable salts thereof, wherein A, E, and R¹ are defined above for the Compounds of Formula (I); wherein the compounds may be suitable for use for the treatment of bacterial infections, particularly mycobacterial infections.

A first embodiment of the invention (Embodiment E1) is a compound of Formula I, or a pharmaceutically acceptable salt thereof, wherein A is an aryl optionally substituted with up to four R⁸; and wherein all other variables are as originally defined (i.e. as defined in Formula I above).

In a sub-embodiment of Embodiment E1, A is a 6-membered aryl. In still further sub-embodiments, A is an 8-, 10-, 12-, or 14-membered aryl.

A second embodiment (Embodiment E2) is a compound of Formula I, or a pharmaceutically acceptable salt thereof, wherein, A is a heterocycle, wherein from 1 to 4 of the ring atoms is independently O, N, $SO_2$, S or S(N)(O) and the remaining ring atoms are carbon atoms, and all other variables are as defined above. In a sub-embodiment of Embodiment E2, A is a heteroaryl, wherein from 1 to 4 of the ring atoms is independently O, N, $SO_2$, S or S(N)(O) and the remaining ring atoms are carbon atoms, and all other variables are as defined in above.

In a sub-embodiment of Embodiment E2, A is a 5-membered heteroaryl containing one heteroatom. In a further sub-embodiment, A is a 5-membered heteroaryl containing two heteroatoms. In another sub-embodiment A is a 5-membered heteroaryl containing three heteroatoms. In a still further sub-embodiment A is a 5-membered heteroaryl containing four heteroatoms. In another sub-embodiment, A is a 6-membered heteroaryl containing one heteroatom. In a further sub-embodiment, A is a 6-membered heteroaryl containing two heteroatoms. In another sub-embodiment A is a 6-membered heteroaryl containing three heteroatoms. In a still further sub-embodiment A is a 6-membered heteroaryl containing four heteroatoms. In still further sub-embodiments, A is a 7-, 8-, 9-, 10-, 11-, 12-, 13-, or 14-membered heteroaryl containing from one to four heteroatoms selected from the group consisting of O, N, $SO_2$, S or S(N)(O).

A third embodiment (Embodiment E3) is a compound of Formula I, or a pharmaceutically acceptable salt thereof, wherein A is a monocyclic saturated or partially unsaturated ring optionally substituted with up to four R⁸, wherein from 1 to 4 of the ring atoms is independently O, N, $SO_2$, S or S(N)(O) and the remaining ring atoms are carbon atoms, and all other variables are as defined above. In a sub-embodiment of Embodiment E3, A is a monocyclic heterocycloalkyl optionally substituted with up to four R⁸, wherein from 1 to 4 of the ring atoms is independently O, N, $SO_2$, S or S(N)(O) and the remaining ring atoms are carbon atoms, and all other variables are as defined above.

In a sub-embodiment of Embodiment E3, A is a 5-membered monocyclic saturated or partially unsaturated ring containing one heteroatom. In a further sub-embodiment, A is a 5-membered monocyclic saturated or partially unsaturated ring containing two heteroatoms. In another sub-embodiment, A is a 5-membered monocyclic saturated or partially unsaturated ring containing three heteroatoms. In a still further sub-embodiment A is a 5-membered monocyclic saturated or partially unsaturated ring containing four heteroatoms. In another sub-embodiment, A is a 6-membered monocyclic saturated or partially unsaturated ring containing one heteroatom. In a further sub-embodiment, A is a 6-membered monocyclic saturated or partially unsaturated ring containing two heteroatoms. In another sub-embodiment A is a 6-membered monocyclic saturated or partially unsaturated ring containing three heteroatoms. In a still further sub-embodiment A is a 6-membered monocyclic saturated or partially unsaturated ring containing four heteroatoms.

A fourth embodiment (Embodiment E4) is a compound of Formula I, or a pharmaceutically acceptable salt thereof, wherein, A is a bicyclic saturated or partially unsaturated ring system, optionally substituted with up to four R⁸, wherein from 1 to 4 of the ring atoms is independently O, N, $SO_2$, S or S(N)(O) and the remaining ring atoms are carbon atoms, and all other variables are as defined above.

In a sub-embodiment of Embodiment E4, A is a bicyclic saturated or partially unsaturated ring system containing one heteroatom. In a further sub-embodiment, A is a bicyclic saturated or partially unsaturated ring system containing two heteroatoms. In another sub-embodiment A is a bicyclic saturated or partially unsaturated ring system containing three heteroatoms. In a still further sub-embodiment A is a bicyclic saturated or partially unsaturated ring system containing four heteroatoms.

In Embodiments E1-E4 and sub-embodiments of Embodiments E1-E4, A is optionally substituted with up to four occurrences of $R^8$. In sub-embodiments of Embodiments E1-E4 and preceding sub-embodiments thereof, A is substituted with four occurrences of $R^8$, which are as originally defined. In another sub-embodiment, A is substituted with three occurrences of $R^8$. In a further sub-embodiment, A is substituted with two occurrences of $R^8$. In yet a further sub-embodiment, A is substituted with a single occurrence of $R^8$. In alternative embodiments of Embodiments E1-E4, A is unsubstituted. In a further sub-embodiment, wherein A is substituted $R^8$, $R^8$ includes hydrogen.

A fifth embodiment (Embodiment E5) is a compound of Formula I, or a pharmaceutically acceptable salt thereof, wherein, A is selected from the group consisting of:

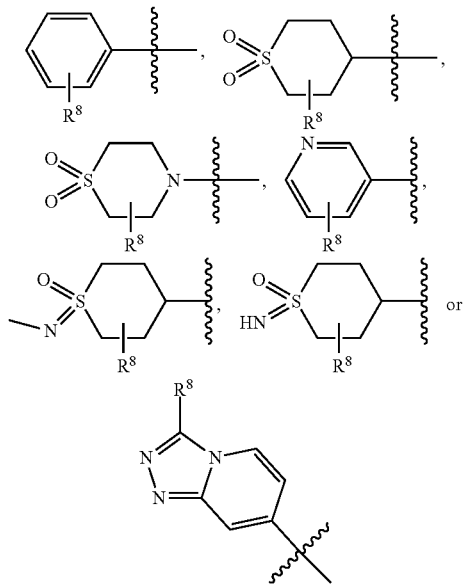

wherein $R^8$ represents up to four optional substituents, which can be the same or different; and wherein $R^8$ and all other variables are as defined in above.

In sub-embodiments of Embodiments E5, A is selected from the group consisting of:

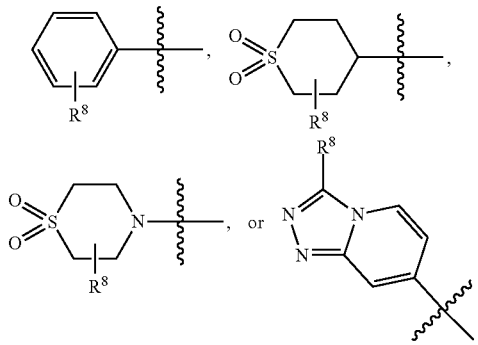

wherein $R^8$ represents up to four optional substituents, which can be the same or different; and wherein $R^8$ and all other variables are as defined in above.

In sub-embodiments of Embodiments E5, A is substituted with four occurrences of $R^8$. In another sub-embodiment, A is substituted with three occurrences of $R^8$. In a further sub-embodiment, A is substituted with two occurrences of $R^8$. In yet a further sub-embodiment, A is substituted with a single occurrence of $R^8$. In an alternative sub-embodiment of Embodiment E5, A is unsubstituted.

A sixth embodiment (Embodiment E6) is a compound of Formula I, or a pharmaceutically acceptable salt thereof, wherein, A is selected from the group consisting of:

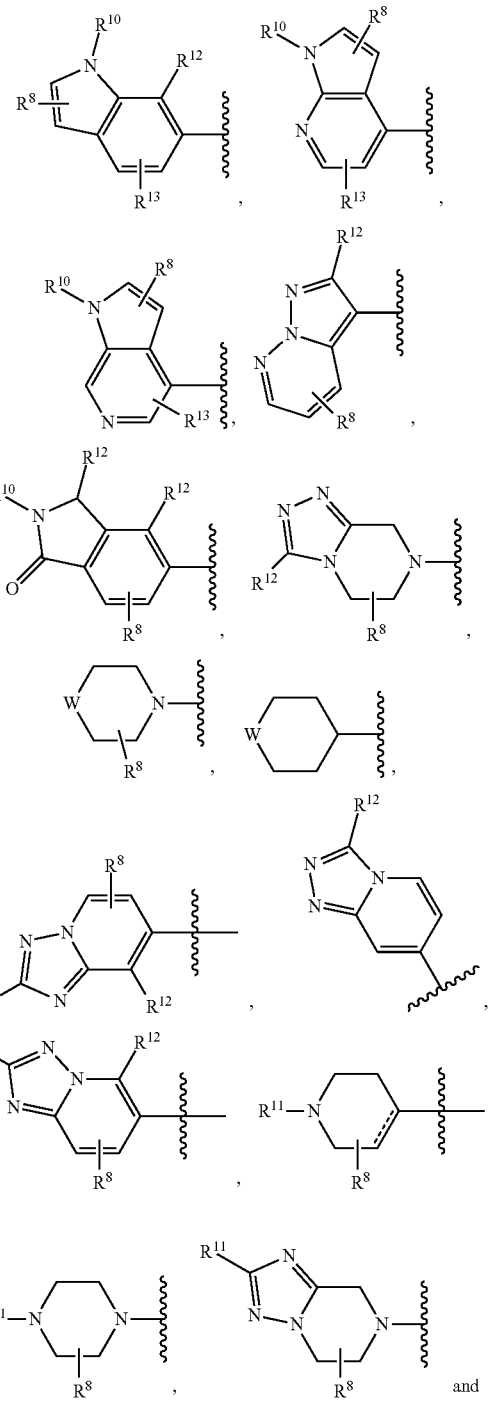

and

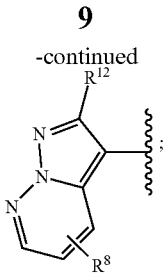

each occurrence of $R^8$ is independently selected from the group consisting of H, halogen, $C_1$-$C_6$ alkyl, $C_3$-$C_6$ cycloalkyl, $C_1$-$C_6$alkylheterocycloalkyl, heterocycloalkyl, benzyl, —$OCF_3$, —$OCHF_2$, —$OR^3$, =O, —CN, —$NO_2$, —$SR^3$, —$SF_5$, —$SCF_3$, —$SOR^3$, —$SO_2R^3$, —S(=O)(=N)$R^2$, —N($R^2$)$_2$, —$NR^2COR^3$, —$SO_2N(R^2)_2$, —$NR^2SO_2R^3$, —COOH, —$COR^9$, —$COOR^3$, —CON($R^2$)$_2$, (=N)$R^2$ and —C($R^9$)$_2$N($R^2$)$_2$, wherein said $C_1$-$C_6$ alkyl, $C_3$-$C_6$ cycloalkyl, $C_1$-$C_6$alkylheterocycloalkyl, heterocycloalkyl, and benzyl are optionally substituted with up to four methyl, F, —$OCH_3$, —OH, =O, $NH_2$, $NHCH_3$, and N($CH_3$)$_2$;

$R^{10}$ is selected from the group consisting of H, $C_1$-$C_6$ alkyl and $C_3$-$C_6$ cycloalkyl, wherein said $C_1$-$C_6$ alkyl and said $C_3$-$C_6$ cycloalkyl are optionally substituted with from one to four substituents, which are independently selected from the group consisting of F, —$OCH_3$, —OH, $NH_2$, $NHCH_3$, and N($CH_3$)$_2$;

$R^{11}$ is selected from the group consisting of H, $C_1$-$C_6$ alkyl and $C_3$-$C_6$ cycloalkyl, —$COR^9$, —$COOR^3$, —CON($R^9$)$_2$, and —$SO_2R^9$;

each occurrence of $R^{12}$ is independently selected from the group consisting of H, halogen, $C_1$-$C_6$ alkyl, $C_3$-$C_6$ cycloalkyl, benzyl, —$OCF_3$, —$OCHF_2$, —$OR^3$, —CN, —$NO_2$, —$SR^3$, —$SF_5$, —$SCF_3$, —$SOR^3$, —$SO_2R^3$, —S(=O)(=N)$R^2$, —N($R^2$)$_2$, —$NR^2COR^3$, —$SO_2N(R^2)_2$, —$NR^2SO_2R^3$, —COOH, —$COR^9$, —$COOR^3$, —CON($R^2$)$_2$, 4-membered heterocycle and —C($R^9$)$_2$N($R^2$)$_2$, wherein said $C_1$-$C_6$ alkyl, $C_3$-$C_6$ cycloalkyl, 4-membered heterocycle and benzyl are optionally substituted with up to four methyl, F, —$OCH_3$, —OH, $NH_2$, $NHCH_3$, and N($CH_3$)$_2$;

$R^{13}$ is selected from the group consisting of H, halogen, $C_1$-$C_6$ alkyl, $C_3$-$C_6$ cycloalkyl, benzyl, —$OCF_3$, —$OCHF_2$, —$OR^3$, —CN, —$NO_2$, —$SR^3$, —$SF_5$, —$SCF_3$, —$SOR^3$, —$SO_2R^3$, —S(=O)(=N)$R^2$, —N($R^2$)$_2$, —$NR^2COR^3$, —$SO_2N(R^2)_2$, —$NR^2SO_2R^3$, —COOH, —$COR^9$, —$COOR^3$, —CON($R^2$)$_2$, and —C($R^9$)$_2$N($R^2$)$_2$, wherein said $C_1$-$C_6$ alkyl, $C_3$-$C_6$ cycloalkyl, and benzyl are optionally substituted with up to four methyl, F, —$OCH_3$, —OH, $NH_2$, $NHCH_3$, and N($CH_3$)$_2$; and W is selected from the group consisting of O, S, SO, $SO_2$, and S(=O)(=NH); and wherein ═ represents a double or a single bond, wherein all other variable are as defined above.

In Embodiments E1-E6 and sub-embodiments of Embodiments E1-E6, each occurrence of $R^8$ is independently selected from the group consisting of halogen, $C_1$-$C_6$ alkyl, $C_3$-$C_6$ cycloalkyl, $C_1$-$C_6$alkylheterocycloalkyl, heterocycloalkyl, benzyl, —$OCF_3$, —$OCHF_2$, —$OR^3$, =O, —CN, —$NO_2$, —$SR^3$, —$SF_5$, —$SCF_3$, —$SOR^3$, —$SO_2R^3$, —S(=$CH_2$)$C_1$-$C_6$ alkyl, —S(=O)(=N)$R^2$, —N($R^2$)$_2$, —$NR^2COR^3$, —$SO_2N(R^2)_2$, —$NR^2SO_2R^3$, —COOH, —$COR^9$, —$COOR^3$, —CON($R^2$)$_2$, (=N)$R^2$ and —C($R^9$)$_2$N($R^2$)$_2$, wherein said $C_1$-$C_6$ alkyl, $C_3$-$C_6$ cycloalkyl, $C_3$-$C_6$heterocycloalkyl, and benzyl are optionally substituted with up to four methyl, F, —$OCH_3$, —OH, =O, $NH_2$, $NHCH_3$, and N($CH_3$)$_2$.

In Embodiments E1-E6 and sub-embodiments of Embodiments E1-E6, each occurrence of $R^8$ represents up to four optional ring carbon substituents, wherein each occurrence of $R^8$ is independently selected from the group consisting of, halogen, $C_1$-$C_6$ alkyl, $C_3$-$C_6$ cycloalkyl, $C_1$-$C_6$alkylheterocycloalkyl, heterocycloalkyl, —Oheterocycloalkyl, benzyl, —$OCHF_2$, —$OR^3$, =O, —CN, —$NO_2$, —$SR^3$, —$SF_5$, —$SCF_3$, —$SOR^3$, —$SO_2R^3$, —S(=O)(=N)$R^2$, —N($R^2$)$_2$, —$NR^2COR^3$, —$SO_2N(R^2)_2$, —$NR^2SO_2R^3$, —COOH, —$COR^9$, —$COOR^3$, —CON($R^2$)$_2$, and —C($R^9$)$_2$N($R^2$)$_2$, (=N)$R^2$ wherein said $C_1$-$C_6$ alkyl, $C_3$-$C_6$ cycloalkyl, $C_1$-$C_6$alkylheterocycloalkyl, heterocycloalkyl, —Oheterocycloalkyl, and benzyl are optionally substituted with up to four methyl, F, —$OCH_3$, —OH, =O, $NH_2$, $NHCH_3$, and N($CH_3$)$_2$ In a specific sub-embodiment of Embodiments E1-E6, one or more occurrences of $R^8$ is selected from the group consisting of: —OH, —CN, —$CH_3$, —$CH_2NH_2$, —$CONH_2$, C($CH_3$)$_2$OH, —COOC($CH_3$)$_2CH_3$, —$SCH_3$, —$OCH_3$, —Cl, —F, —$CHF_2$, =O, -cyclopropyl, $NO_2$, —$NHSO_2CH_3$, —$SO_2N(CH_3)_2$, —S(=O)(=NH)$CH_3$, —$SO_2CH_3$, —$SOCH_3$, and —$SO_2NH_2$.

In another specific sub-embodiment of Embodiments E1-E6, one or more occurrences of $R^8$ is selected from the group consisting of: fluorine, methyl

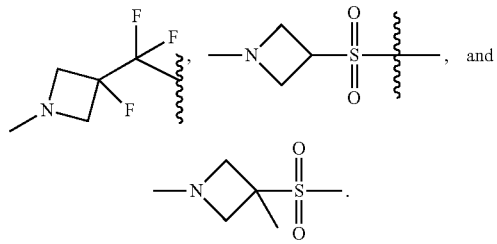

In a specific sub-embodiment of Embodiments E1-E6, one or more occurrences of $R^8$ is selected from the group consisting of fluorine, methyl, CN, $SO_2CH_3$,

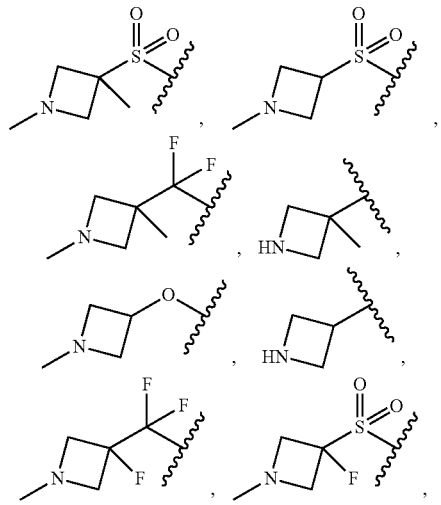

-continued

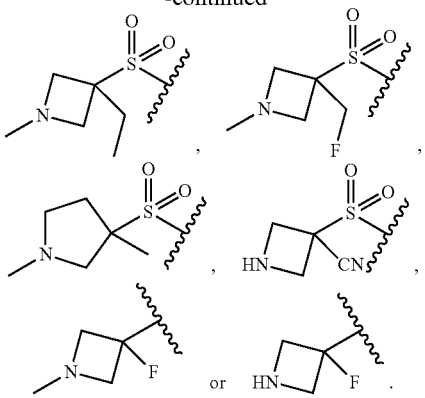

A seventh embodiment (Embodiment E7) is a compound of Formula I, or a pharmaceutically acceptable salt thereof, wherein, A is as defined above or in any of Embodiments E1-E6, E is a 6-membered aryl, wherein said aryl is optionally substituted with up to four substituents, which are independently selected from the group consisting of halogen, —CN, —CF$_3$, —CH$_2$NH$_2$, —CH$_2$NHCOCH$_3$, —OCHF$_2$, —OH, —O—(C$_1$-C$_6$)alkyl, C$_1$-C$_6$ alkyl, and C$_3$-C$_6$ cycloalkyl, and all other variables are as defined above.

An eighth embodiment (Embodiment E8) is a compound of Formula I, or a pharmaceutically acceptable salt thereof, wherein, A is as defined in above or in any of Embodiments E1-E6, E is a 5-membered heteroaryl containing from one to three heteroatoms independently selected from the group consisting of S, O, and N, wherein said heteroaryl is optionally substituted with up to four substituents, which are independently selected from the group consisting of halogen, —CN, —CF$_3$, —CHF$_2$, —CH$_2$NH$_2$, —CH$_2$NHCOCH$_3$, —OCHF$_2$, —OH, —O—(C$_1$-C$_6$)alkyl, C$_1$-C$_6$ alkyl, and C$_3$-C$_6$ cycloalkyl, and all other variables are as defined above.

A ninth embodiment (Embodiment E9) is a compound of Formula I, or a pharmaceutically acceptable salt thereof, wherein, A is as defined above or in any of Embodiments E1-E6, E is a 6-membered heteroaryl containing from one to three heteroatoms independently selected from the group consisting of S, O, and N, wherein said 6-membered heteroaryl is optionally substituted with up to four substituents, which are independently selected from the group consisting of halogen, —CN, —CF$_3$, —CHF$_2$, —CH$_2$NH$_2$, —CH$_2$NHCOCH$_3$, —OCHF$_2$, —OH, —O—(C$_1$-C$_6$)alkyl, C$_1$-C$_6$ alkyl, and C$_3$-C$_6$ cycloalkyl, and all other variables are as defined above.

A tenth embodiment (Embodiment E10) is a compound of Formula I, or a pharmaceutically acceptable salt thereof, wherein, A is as defined above or in any of Embodiments E1-E6, E is phenyl, substituted with one or two fluorines In a sub-embodiment, E is:

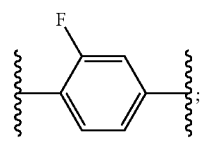 [SMILES: *c1ccc(*)c(F)c1]

and all other variables are as defined above.

In a sub-embodiment, E is:

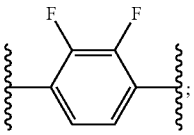

and all other variables are as defined above.

An eleventh embodiment (Embodiment E11) is a compound of Formula I, or a pharmaceutically acceptable salt thereof, wherein, A is as defined above or in any of Embodiments E1-E6, E is:

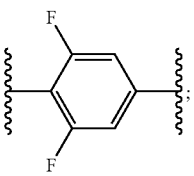 [SMILES: *c1cc(F)c(*)c(F)c1]

and all other variables are as defined above.

A twelfth embodiment (Embodiment E12) is a compound of Formula I, or a pharmaceutically acceptable salt thereof, wherein, A is as defined above or in any of Embodiments E1-E6, E is:

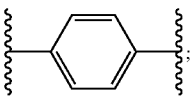

and all other variables are as originally defined.

A thirteenth embodiment (Embodiment E13) is a compound of Formula I, or a pharmaceutically acceptable salt thereof, wherein, A is as defined above or in any of Embodiments E1-E6, E is as defined in any of Embodiments E7-E12, and R$^1$ is selected from the group consisting of —CH$_2$N(R$^2$)$_2$, —CH$_2$NR$^2$COR$^3$, —CH$_2$NR$^2$COOR$^3$, —CH$_2$NR$^2$CON(R$^2$)$_2$, —CH$_2$NR$^2$CONR$^2$N(R$^2$)$_2$, —CH$_2$NR$^2$SO$_2$R$^3$, —CON(R$^2$)$_2$, —C═NOR$^3$, —CH$_2$OR$^4$, —CH$_2$NR$^2$R$^4$, —CH$_2$R$^6$ and —CH$_2$OC(O)N(R$^2$)$_2$. In a sub-embodiment, R$^1$ is selected from the group consisting of —CH$_2$N(R$^2$)$_2$, —CH$_2$NR$^2$COR$^3$, —CH$_2$NR$^2$COOR$^3$, —CH$_2$NR$^2$CON(R$^2$)$_2$, —CH$_2$NR$^2$CONR$^2$N(R$^2$)$_2$, —CH$_2$NSO$_2$R$^3$, —CON(R$^2$)$_2$, —C═NOR$^3$, —CH$_2$OR$^4$, —CH$_2$NR$^2$R$^4$, and —CH$_2$R$^6$.

A fourteenth embodiment (Embodiment E14) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NR$^2$COR$^3$, —CH$_2$NR$^2$COOR$^3$, —CH$_2$OR$^4$, —CH$_2$OC(O)N(R$^2$)$_2$ or —CH$_2$R$^6$. In a sub-embodiment, R$^1$ is —CH$_2$NR$^2$COR$^3$, —CH$_2$NR$^2$COOR$^3$, —CH$_2$OR$^4$ or —CH$_2$R$^6$.

In a sub-embodiment of Embodiment E14, one occurrence of R$^6$ is triazole.

In a further sub-embodiment of Embodiment E14, one occurrence of R$^2$ is H and one occurrence of R$^3$ methyl.

In a still further sub-embodiment of Embodiment E14, one occurrence of R$^4$ is H.

In a further sub-embodiment, wherein $R^1$ is —$CH_2NR^2COR^3$, —$CH_2OR^4$, —$CH_2NR^2SO_2R^3$, $CH_2NR^2COOR^3$, —$CH_2OC(O)N(R^2)_2$ or —$CH_2R^6$; and $R^2$ is H;

$R^3$ is methyl, ethyl, bicyclo[1.1.1]pentane or cyclopropyl, wherein the cyclopropyl is substituted with methyl;

$R^4$ is H; and $R^6$ is:

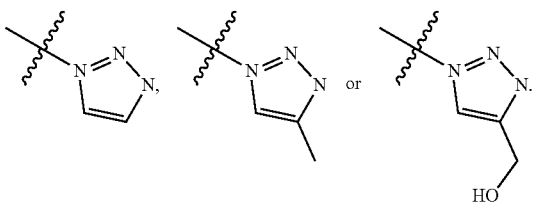

A fifteenth embodiment (Embodiment E15) is a compound of Formula I, or a pharmaceutically acceptable salt thereof, wherein, A is as defined above or in any of Embodiments E1-E6, E is as defined in any of Embodiments E7-E12, and $R^1$ is —$CH_2R^6$. A sixteenth embodiment (Embodiment E16) is a compound of Formula I, or a pharmaceutically acceptable salt thereof, wherein, A is as defined above or in any of Embodiments E1-E6, E is as defined in any of Embodiments E7-E12, and $R^1$ is —$CH_2OR^4$.

A seventeenth embodiment (Embodiment E17) is a compound of Formula I, or a pharmaceutically acceptable salt thereof, wherein, A is as defined above or in any of Embodiments E1-E6, E is as defined in any of Embodiments E7-E12, and $R^1$ is —$CH_2NR^2COR^3$.

In a sub-embodiment of Embodiment E17, $R^1$ is —$CH_2NHCOR^3$.

In a further sub-embodiment, $R^1$ is —$CH_2NR^2CO(C_1-C_6alkyl)$.

In another sub-embodiment, $R^1$ is —$CH_2NR^2COCH_3$.

In another sub-embodiment, $R^1$ is —$CH_2NHCOCH_3$.

In another sub-embodiment, $R^1$ is —$CH_2NR^2CO(C_3-C_6cycloalkyl)$.

In another sub-embodiment, $R^1$ is —$CH_2NR^2COcyclopropyl$.

In another sub-embodiment, $R^1$ is —$CH_2NHCOcyclopropyl$.

In another sub-embodiment, $R^1$ is —$CH_2NR^2CO(bicyclo[1.1.1]pentane)$.

In another sub-embodiment, $R^1$ is —$CH_2NHCO(bicyclo[1.1.1]pentane)$.

An eighteenth embodiment (Embodiment E18) is a compound of Formula I, or a pharmaceutically acceptable salt thereof, wherein, A is as defined above or in any of Embodiments E1-E6, E is as defined in any of Embodiment E7-E12, and $R^1$ is —$CH_2NR^2COOR^3$.

In a sub-embodiment of Embodiment E18, $R^1$ is —$CH_2NHCOOR^3$.

In a sub-embodiment of Embodiment E18, $R^1$ is —$CH_2NR^2COOCH_3$.

In another sub-embodiment of Embodiment E18, $R^1$ is —$CH_2NHCOOCH_3$.

In another sub-embodiment of Embodiment E18, $R^1$ is —$CH_2NHCOOCH_2CH_3$.

In a further sub-embodiment of Embodiment E18, $R^1$ is —$CH_2NR^2COO(C_1-C_6alkyl)$.

In a sub-embodiment of Embodiment E18, $R^1$ is —$CH_2NR^2COO(C_3-C_6cycloalkyl)$.

In a sub-embodiment of Embodiment E18, $R^1$ is —$CH_2NR^2COO(cyclopropyl)$.

In a sub-embodiment of Embodiment E18, $R^1$ is —$CH_2NHCOO(cyclopropyl)$.

In a sub-embodiment of Embodiment E18, $R^1$ is —$CH_2NHCOO(cyclopropyl)$.

In a sub-embodiment of Embodiment E18, $R^1$ is —$CH_2OC(O)N(R^2)_2$.

In a sub-embodiment of Embodiment E18, $R^1$ is —$CH_2OC(O)NH_2$.

A nineteenth embodiment (Embodiment E19) is a compound of Formula I, or a pharmaceutically acceptable salt thereof, wherein, A is as defined above or in any of Embodiments E1-E6, E is as defined in any of Embodiment E7-E12, and $R^1$ is —$CH_2R^6$.

A twentieth embodiment (Embodiment E20) is a compound of Formula I, or a pharmaceutically acceptable salt thereof, wherein, A is as defined above or in any of Embodiments E1-E6, E is as defined in any of Embodiment E7-E12, and $R^1$ is —$CH_2NR^2COOR^3$.

In a sub-embodiment of Embodiment E20, one occurrence of $R^2$ is H and one occurrence of $R^3$ is $C_1-C_6$ alkyl, wherein said $C_1-C_6$ alkyl is optionally substituted with up to four substituents, which are independently selected from the group consisting of halogen, —$OCH_3$, —OH, —$NH_2$, —$NHCH_3$, and —$N(CH_3)_2$.

In a further sub-embodiment of Embodiment E20, one occurrence of $R^2$ is H and one occurrence of $R^2$ is $C_1-C_6$ alkyl.

In a still further sub-embodiment of Embodiment E20, one occurrence of $R^2$ is H and one occurrence of $R^2$ is $C_3-C_6$ cycloalkyl, wherein said $C_3-C_6$ cycloalkyl is optionally substituted with up to four substituents, which are independently selected from the group consisting of halogen, —$OCH_3$, —OH, —$NH_2$, —$NHCH_3$, and —$N(CH_3)_2$.

A twenty-first embodiment (Embodiment E21) is a compound of Formula I, or a pharmaceutically acceptable salt thereof, wherein, A is as defined above or in any of Embodiments E1-E6, E is as defined in any of Embodiment E7-E12, and $R^1$ is —C=$NOR^3$.

In sub-embodiments of Embodiments E16, E17, E18 and E21, $R^3$ is H

In sub-embodiments of Embodiments E16, E17, E18 and E21, $R^3$ is $C_1-C_6$ alkyl, wherein said $C_1-C_6$ alkyl can be optionally substituted with up to four substituents, which are independently selected from the group consisting of halogen, —$OCH_3$, —OH, —$NH_2$, —$NHCH_3$, and —$N(CH_3)_2$.

In sub-embodiments of Embodiments E16, E17, E18 and E21, $R^3$ is $C_2-C_6$ alkenyl, wherein said $C_2-C_6$ alkenyl can be optionally substituted with up to four substituents, which are independently selected from the group consisting of halogen, —$OCH_3$, —OH, —$NH_2$, —$NHCH_3$, and —$N(CH_3)_2$.

In sub-embodiments of Embodiments, E16, E17, E18 and E21, $R^3$ is $C_3-C_6$ cycloalkyl, wherein said $C_3-C_6$ cycloalkyl can be optionally substituted with up to four substituents, which are independently selected from the group consisting of halogen, —$OCH_3$, —OH, —$NH_2$, —$NHCH_3$, and —$N(CH_3)_2$.

A twenty-second embodiment (Embodiment E22) is a compound of Formula I, or a pharmaceutically acceptable salt thereof, wherein, A is as defined above or in any of Embodiments E1-E6, E is as defined in any of Embodiment E7-E12, and $R^1$ is —$CH_2OR^4$.

A twenty-third embodiment (Embodiment E23) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NR$^2$R$^4$.

In sub-embodiments of Embodiments E22 and E23, R$^4$ is a 5-membered heterocycle, optionally substituted with R$^5$.

In sub-embodiments of Embodiments E22 and E23, R$^4$ is a 6-membered heterocycle, optionally substituted with R$^5$.

In sub-embodiments of Embodiments E22 and E23, R$^4$ is H.

In sub-embodiments of Embodiments E16, E19, and E23, R$^2$ is H.

In further sub-embodiments of Embodiments E16, E19, and E23, R$^2$ is C$_1$-C$_6$ alkyl, wherein said C$_1$-C$_6$ alkyl is optionally substituted with up to four substituents, which are independently selected from the group consisting of halogen, —OCH$_3$, —OH, NH$_2$, NHCH$_3$, and N(CH$_3$)$_2$.

In other sub-embodiments of Embodiments E16, E19, and E23, R$^2$ is C$_2$-C$_6$ alkenyl, wherein said C$_2$-C$_6$ alkenyl is optionally substituted with up to four substituents, which are independently selected from the group consisting of halogen, —OCH$_3$, —OH, NH$_2$, NHCH$_3$, and N(CH$_3$)$_2$.

In alternate sub-embodiments of Embodiments E16, E19, and E23, R$^2$ is C$_3$-C$_6$ cycloalkyl, wherein said C$_3$-C$_6$ cycloalkyl is optionally substituted with up to four substituents, which are independently selected from the group consisting of halogen, —OCH$_3$, —OH, NH$_2$, NHCH$_3$, and N(CH$_3$)$_2$.

A twenty-fourth embodiment (Embodiment E24) is a compound of Formula I, or a pharmaceutically acceptable salt thereof, wherein, A is as defined above or in any of Embodiments E1-E6, E is as defined in any of Embodiment E7-E12, and R$^1$ is —CH$_2$R$^6$.

In a sub-embodiment of Embodiment E24, R$^6$ is H.

In a sub-embodiment of Embodiment E24, R$^6$ is C$_1$-C$_6$ alkyl.

In a sub-embodiment of Embodiment E24, R$^6$ is a 5-membered heterocycle, wherein said 5-membered heterocycle is unsubstituted or substituted with one or two R$^7$.

A twenty-fifth embodiment (Embodiment E25) is a compound of Formula I, or a pharmaceutically acceptable salt thereof, wherein, A is as defined above or in any of Embodiments E1-E6, E is defined in any of Embodiments E7-E12, and R$^1$ is —CH$_2$OH.

A twenty-sixth embodiment (Embodiment E26) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NHC(O)CH$_3$.

A twenty-seventh embodiment (Embodiment E27) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NHC(O)-cyclopropyl.

A twenty-eighth embodiment (Embodiment E28) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NHCOOCH$_3$.

A twenty-ninth embodiment (Embodiment E29) is a compound of Formula I, or a pharmaceutically acceptable salt thereof, wherein, A is as defined above or in any of Embodiments E1-E6, E is as defined in any of Embodiment E7-E12, and R$^1$ is —CH$_2$NHCOCH$_2$NH$_2$.

A thirtieth embodiment (Embodiment E30) is a compound of Formula I, or a pharmaceutically acceptable salt thereof, wherein, A is as defined above or in any of Embodiments E1-E6, E is as defined in any of Embodiment E7-E12, and R$^1$ is CH$_2$NHCOCHCH$_2$CH$_3$.

A thirty-first embodiment (Embodiment E31) is a compound of Formula I, or a pharmaceutically acceptable salt thereof, wherein, A is as defined above or in any of Embodiments E1-E6, E is as defined in any of Embodiment E7-E12, and R$^1$ is CH$_2$NHC(O)NHN(CH$_3$)$_2$.

A thirty-second embodiment (Embodiment E32) is a compound of Formula I, or a pharmaceutically acceptable salt thereof, wherein, A is as defined above or in any of Embodiments E1-E6, E is as defined in any of Embodiment E7-E12, and R$^1$ is:

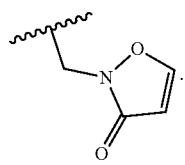

A thirty-third embodiment (Embodiment E33) is a compound of Formula I, or a pharmaceutically acceptable salt thereof, wherein, A is as defined above or in any of Embodiments E1-E6, E is as defined in any of Embodiment E7-E13, and R$^1$ is:

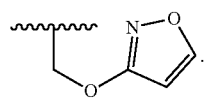 [SMILES: *COc1ccon1]

A thirty-fourth embodiment (Embodiment E34) is a compound of Formula I, or a pharmaceutically acceptable salt thereof, wherein, A is as defined above or in any of Embodiments E1-E6, E is as defined in any of Embodiment E7-E13, and R$^1$ is:

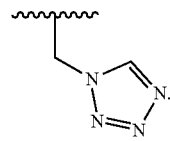 [SMILES: *Cn1cnnn1]

A thirty-fifth embodiment (Embodiment E35) is a compound of Formula I, or a pharmaceutically acceptable salt thereof, wherein, A is as defined above or in any of Embodiments E1-E6, E is as defined in any of Embodiment E7-E13, and R$^1$ is:

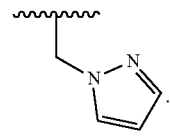

A thirty-sixth embodiment (Embodiment E36) is a compound of Formula I, or a pharmaceutically acceptable salt thereof, wherein, A is as defined above or in any of Embodiments E1-E6, E is as defined in any of Embodiment E7-E13, and R$^1$ is:

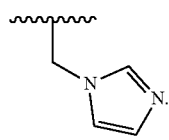 [SMILES: *Cn1ccnc1]

A thirty-seventh embodiment (Embodiment E37) is a compound of Formula I, or a pharmaceutically acceptable salt thereof, wherein, A is as defined above or in any of Embodiments E1-E6, E is as defined in any of Embodiment E7-E13, and $R^1$ is:

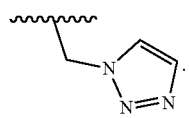

A thirty-eighth embodiment (Embodiment E38) is a compound of Formula I, or a pharmaceutically acceptable salt thereof, wherein A is as defined in any of Embodiments E1-E6, E is defined in any of Embodiments E7-E12, $R^1$ is $-CH_2OR^4$ or $-CH_2NR^2R^4$; $R^2$ is H; and $R^4$ is selected from the group consisting of:

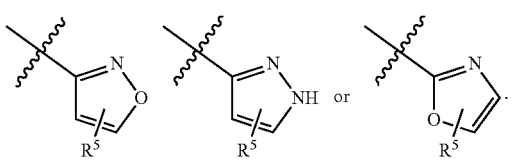

A thirty-ninth embodiment (Embodiment E39) is a compound of Formula I, or a pharmaceutically acceptable salt thereof, wherein A is as defined in any of Embodiments E1-E6, E is defined in any of Embodiments E7-E12, $R^1$ is $CH_2R^6$ and $R^6$ is selected from the group consisting of:

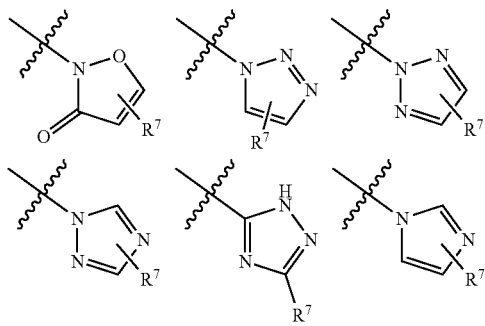

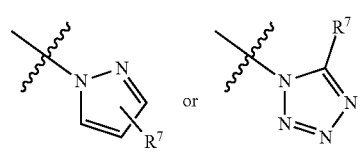

A fortieth embodiment (Embodiment E40) is a compound of Formula I, or a pharmaceutically acceptable salt thereof, wherein A is:

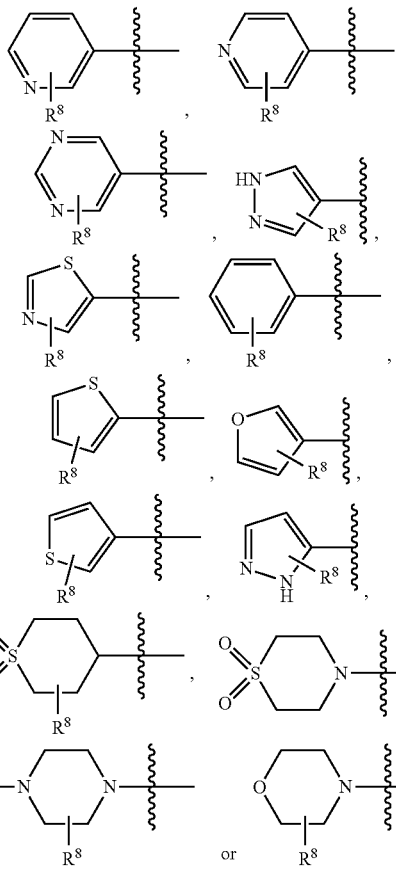

wherein $R^8$ represents up to four optional ring carbon substituents, which can be the same or different, E is defined in any of Embodiments E7-E12, and $R^1$ is defined in any of Embodiments E13-E37.

A forty-first embodiment (Embodiment E41) is a compound of Formula I, or a pharmaceutically acceptable salt thereof, wherein E is as defined in any of Embodiments E7-E12, $R^1$ is defined in any of Embodiments E13-E37, A is:

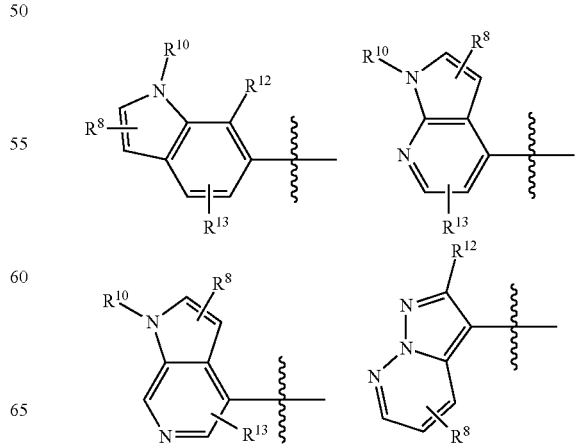

-continued

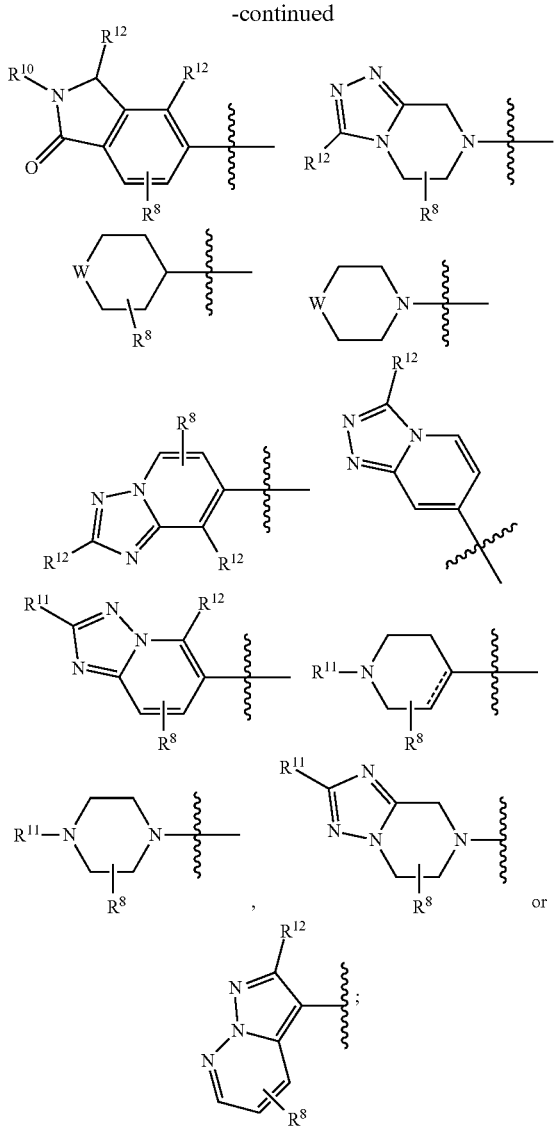

wherein:
each occurrence of $R^8$ is independently selected from the group consisting of H, halogen, $C_1$-$C_6$ alkyl, $C_3$-$C_6$ cycloalkyl, $C_1$-$C_6$alkylheterocycloalkyl, heterocycloalkyl, benzyl, —OCF$_3$, —OCHF$_2$, —OR$^3$, =O, —CN, —NO$_2$, —SR$^3$, —SF$_5$, —SCF$_3$, —SOR$^3$, —SO$_2$R$^3$, —S(=O)(=N)R$^2$, —N(R$^2$)$_2$, —NR$^2$COR$^3$, —SO$_2$N(R$^2$)$_2$, —NR$^2$SO$_2$R$^3$, —COOH, —COR$^9$, —COOR$^3$, —CON(R$^2$)$_2$, (=N)R$^2$ and —C(R$^9$)$_2$N(R$^2$)$_2$, wherein said $C_1$-$C_6$ alkyl, $C_3$-$C_6$ cycloalkyl, $C_1$-$C_6$alkylheterocycloalkyl, heterocycloalkyl, and benzyl are optionally substituted with up to four methyl, F, —OCH$_3$, —OH, =O, NH$_2$, NHCH$_3$, and N(CH$_3$)$_2$;

$R^{10}$ is selected from the group consisting of H, $C_1$-$C_6$ alkyl and $C_3$-$C_6$ cycloalkyl, wherein said $C_1$-$C_6$ alkyl and said $C_3$-$C_6$ cycloalkyl are optionally substituted with from one to four substituents, which are independently selected from the group consisting of F, —OCH$_3$, —OH, NH$_2$, NHCH$_3$, and N(CH$_3$)$_2$;

$R^{11}$ is selected from the group consisting of H, $C_1$-$C_6$ alkyl and $C_3$-$C_6$ cycloalkyl, —COR$^9$, —COOR$^9$, —CON(R$^9$)$_2$, and —SO$_2$R$^9$;

each occurrence of $R^{12}$ is independently selected from the group consisting of H, halogen, $C_1$-$C_6$ alkyl, $C_3$-$C_6$ cycloalkyl, benzyl, —OCF$_3$, —OCHF$_2$, —OR$^3$, —CN, —NO$_2$, —SR$^3$, —SF$_5$, —SCF$_3$, —SOR$^3$, —SO$_2$R$^3$, —S(=O)(=N)R$^2$, —N(R$^2$)$_2$, —NR$^2$COR$^3$, —SO$_2$N(R$^2$)$_2$, —NR$^2$SO$_2$R$^3$, —COOH, —COR$^9$, —COOR$^3$, —CON(R$^2$)$_2$, 4-membered heterocycle and —C(R$^9$)$_2$N(R$^2$)$_2$, wherein said $C_1$-$C_6$ alkyl, $C_3$-$C_6$ cycloalkyl, 4-membered heterocycle and benzyl are optionally substituted with up to four methyl, F, —OCH$_3$, —OH, NH$_2$, NHCH$_3$, and N(CH$_3$)$_2$;

$R^{13}$ is selected from the group consisting of H, halogen, $C_1$-$C_6$ alkyl, $C_3$-$C_6$ cycloalkyl, benzyl, —OCF$_3$, —OCHF$_2$, —OR$^3$, —CN, —NO$_2$, —SR$^3$, —SF$_5$, —SCF$_3$, —SOR$^3$, —SO$_2$R$^3$, —S(=O)(=N)R$^2$, —N(R$^2$)$_2$, —NR$^2$COR$^3$, —SO$_2$N(R$^2$)$_2$, —NR$^2$SO$_2$R$^3$, —COOH, —COR$^9$, —COOR$^3$, —CON(R$^2$)$_2$, and —C(R$^9$)$_2$N(R$^2$)$_2$, wherein said $C_1$-$C_6$ alkyl, $C_3$-$C_6$ cycloalkyl, and benzyl are optionally substituted with up to four methyl, F, —OCH$_3$, —OH, NH$_2$, NHCH$_3$, and N(CH$_3$)$_2$; and W is selected from the group consisting of O, S, SO, SO$_2$, and S(=O)(=NH); and wherein ⹀ represents a double or a single bond and wherein all other variables are as defined above.

A forty-second embodiment (Embodiment E42) is a compound of Formula IA, or a pharmaceutically acceptable salt thereof, having the formula:

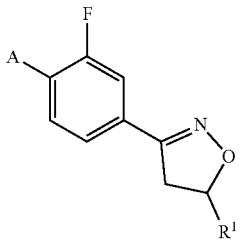

(IA)

wherein:
$R^1$ is —CH$_2$NHCOOCH$_3$, —CH$_2$NHC(O)CH$_3$, —CH$_2$NHC(O)—C$_3$-C$_6$cycloalkyl, CH$_2$OH, or CH$_2$R$^6$; A is as defined in any of Embodiments E1-E6; and $R^6$ is as defined above.

A forty-third embodiment (Embodiment E43) is a compound of Formula IB, or a pharmaceutically acceptable salt thereof, having the formula:

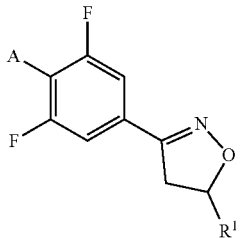

(IB)

wherein:
$R^1$ is —CH$_2$NHCOOCH$_3$, —CH$_2$NHC(O)CH$_3$, —CH$_2$NHC(O)—C$_3$-C$_6$cycloalkyl, CH$_2$OH, or CH$_2$R$^6$; A is as defined in any of Embodiments E1-E6; and R$^6$ is as defined above.

In sub-embodiments of Embodiments E42 and E43, R$^1$ is —CH$_2$NHCOOCH$_3$.

In additional sub-embodiments of Embodiments E42 and E43, A is:

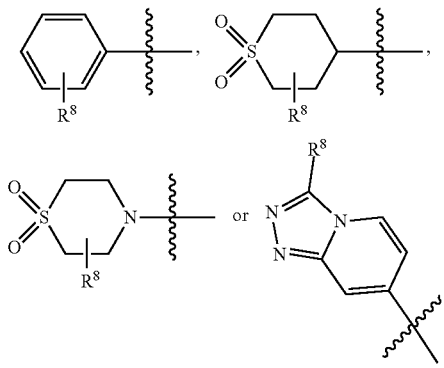

wherein R$^8$ represents up to four optional ring carbon substituents, which can be the same or different.

In additional sub-embodiments of Embodiments E42 and E43, A is:

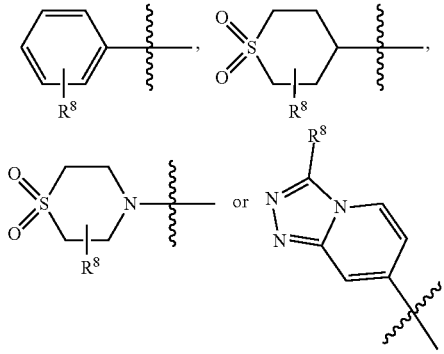

wherein R$^8$ each occurrence of R$^8$ is independently selected from the group consisting of H, halogen, C$_1$-C$_6$ alkyl, C$_1$-C$_6$alkylheterocycloalkyl, heterocycloalkyl, —SO$_2$R$^3$, wherein said C$_1$-C$_6$ alkyl, C$_1$-C$_6$alkylheterocycloalkyl, and benzyl are optionally substituted with up to four methyl and F; and R$^3$ is a 4-membered heterocycloalkyl, wherein said, 4-membered heterocycloalkyl can be optionally substituted with up to four substituents, which are independently selected from the group consisting of C$_1$-C$_6$ alkyl.

In additional sub-embodiments, A is:

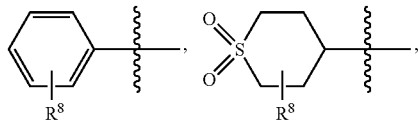

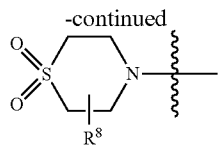

wherein R$^8$ represents up to four optional ring carbon substituents, wherein each occurrence of R$^8$ is independently selected from the group consisting of H, halogen, C$_1$-C$_6$ alkyl, C$_3$-C$_6$ cycloalkyl, C$_1$-C$_6$alkylheterocycloalkyl, heterocycloalkyl, —Oheterocycloalkyl, benzyl, —OCF$_3$, —OCHF$_2$, —OR$^3$, =O, —CN, —NO$_2$, —SR$^3$, —SF$_5$, —SCF$_3$, —SOR$^3$, —SO$_2$R$^3$, —S(=O)(=N)R$^2$, —N(R$^2$)$_2$, —NR$^2$COR$^3$, —SO$_2$N(R$^2$)$_2$, —NR$^2$SO$_2$R$^3$, —COOH, —COR$^9$, —COOR$^3$, —CON(R$^2$)$_2$, (=N)R$^2$ and —C(R$^9$)$_2$N(R$^2$)$_2$, wherein said C$_1$-C$_6$ alkyl, C$_3$-C$_6$ cycloalkyl, C$_1$-C$_6$alkylheterocycloalkyl, heterocycloalkyl, —Oheterocycloalkyl, and benzyl are optionally substituted with up to four methyl, F, —OCH$_3$, —OH, =O, NH$_2$, NHCH$_3$, and N(CH$_3$)$_2$;

each occurrence of R$^2$ is independently selected from the group consisting of H, C$_1$-C$_6$ alkyl, C$_2$-C$_6$ alkenyl, and C$_3$-C$_6$ cycloalkyl, wherein said C$_1$-C$_6$ alkyl, said C$_2$-C$_6$ alkenyl, and said C$_3$-C$_6$ cycloalkyl can be optionally substituted with up to four substituents, which are independently selected from the group consisting of halogen, —OCH$_3$, —OH, —NH$_2$, —NHCH$_3$, and —N(CH$_3$)$_2$;

R$^3$ is H, C$_1$-C$_6$ alkyl, C$_2$-C$_6$ alkenyl, 4- or 5-membered heterocycloalkyl and C$_3$-C$_6$ cycloalkyl, wherein said C$_1$-C$_6$ alkyl, said C$_2$-C$_6$ alkenyl, 4- or 5-membered heterocycloalkyl and said C$_3$-C$_6$ cycloalkyl can be optionally substituted with up to four substituents, which are independently selected from the group consisting of halogen, C$_1$-C$_6$ alkyl, haloC$_1$-C$_6$ alkyl, CN, —OCH$_3$, —OH, —NH$_2$, —NHCH$_3$, and —N(CH$_3$)$_2$; and each occurrence of R$^9$ is independently selected from the group consisting of H, C$_1$-C$_6$ alkyl, and C$_3$-C$_6$ cycloalkyl.

In additional sub-embodiments, A is:

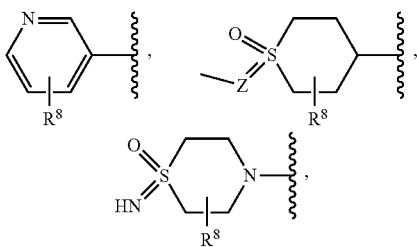

wherein R$^8$ represents up to four optional ring carbon substituents, wherein each occurrence of R$^8$ is independently selected from the group consisting of halogen, C$_1$-C$_6$ alkyl, C$_3$-C$_6$ cycloalkyl, C$_1$-C$_6$alkylheterocycloalkyl, heterocycloalkyl, —Oheterocycloalkyl, benzyl, —OCF$_3$, —OCHF$_2$, —OR$^3$, =O, —CN, —NO$_2$, —SR$^3$, —SF$_5$, —SCF$_3$, —SOR$^3$, —SO$_2$R$^3$, —S(=O)(=N)R$^2$, —N(R$^2$)$_2$, —NR$^2$COR$^3$, —SO$_2$N(R$^2$)$_2$, —NR$^2$SO$_2$R$^3$, —COOH, —COR$^9$, —COOR$^3$, —CON(R$^2$)$_2$, (=N)R$^2$ and —C(R$^9$)$_2$N(R$^2$)$_2$, wherein said C$_1$-C$_6$ alkyl, C$_3$-C$_6$ cycloalkyl, C$_1$-C$_6$alkylheterocycloalkyl, heterocycloalkyl, —Oheterocycloalkyl, and benzyl are optionally substituted with up to four methyl, F, —OCH$_3$, —OH, =O, NH$_2$, NHCH$_3$, and N(CH$_3$)$_2$;

each occurrence of R$^2$ is independently selected from the group consisting of H, C$_1$-C$_6$ alkyl, C$_2$-C$_6$ alkenyl, and C$_3$-C$_6$ cycloalkyl, wherein said C$_1$-C$_6$ alkyl, said C$_2$-C$_6$ alkenyl, and said C$_3$-C$_6$ cycloalkyl can be optionally substituted with up to four substituents, which are independently selected from the group consisting of halogen, —OCH$_3$, —OH, —NH$_2$, —NHCH$_3$, and —N(CH$_3$)$_2$;

R$^3$ is H, C$_1$-C$_6$ alkyl, C$_2$-C$_6$ alkenyl, 4- or 5-membered heterocycloalkyl and C$_3$-C$_6$ cycloalkyl, wherein said C$_1$-C$_6$ alkyl, said C$_2$-C$_6$ alkenyl, 4- or 5-membered heterocycloalkyl and said C$_3$-C$_6$ cycloalkyl can be optionally substituted with up to four substituents, which are independently selected from the group consisting of halogen, C$_1$-C$_6$ alkyl, haloC$_1$-C$_6$ alkyl, CN, —OCH$_3$, —OH, —NH$_2$, —NHCH$_3$, and —N(CH$_3$)$_2$; and each occurrence of R$^9$ is independently selected from the group consisting of H, C$_1$-C$_6$ alkyl, and C$_3$-C$_6$ cycloalkyl Specific embodiments disclosed herein, include compounds, or pharmaceutically acceptable salts thereof, having the following structure:

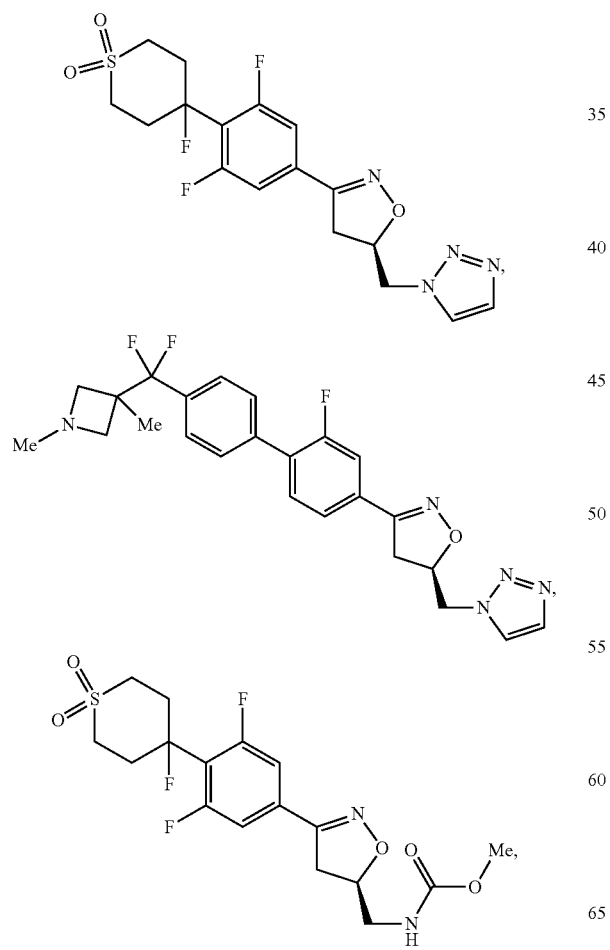

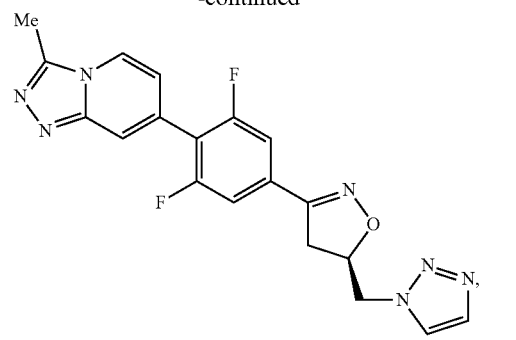

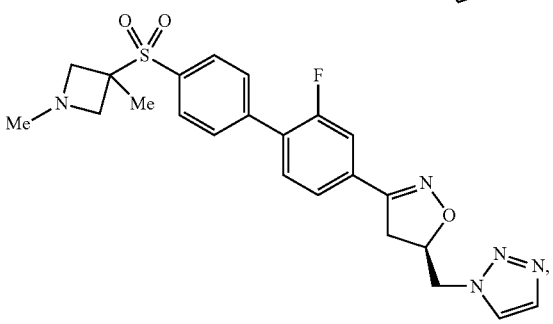

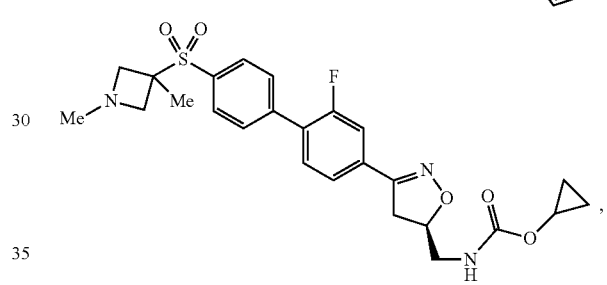

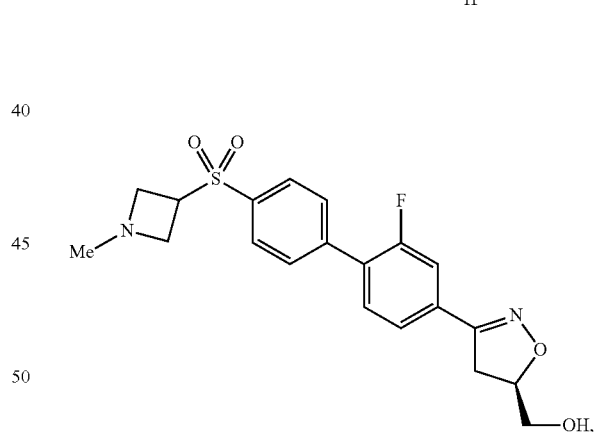

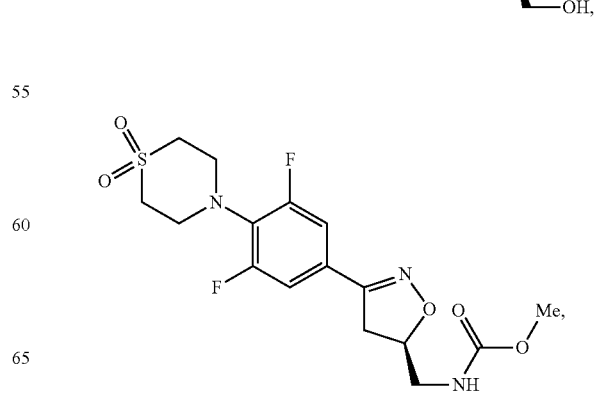

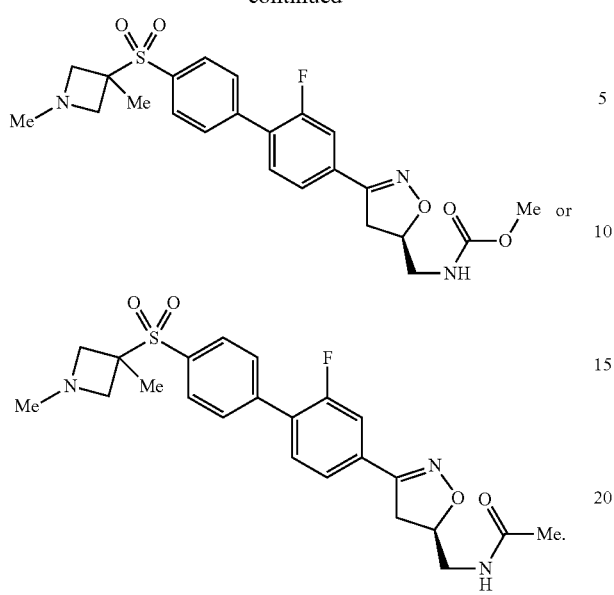
Specific embodiments disclosed herein include compounds, or pharmaceutically acceptable salts thereof, having the following structure:
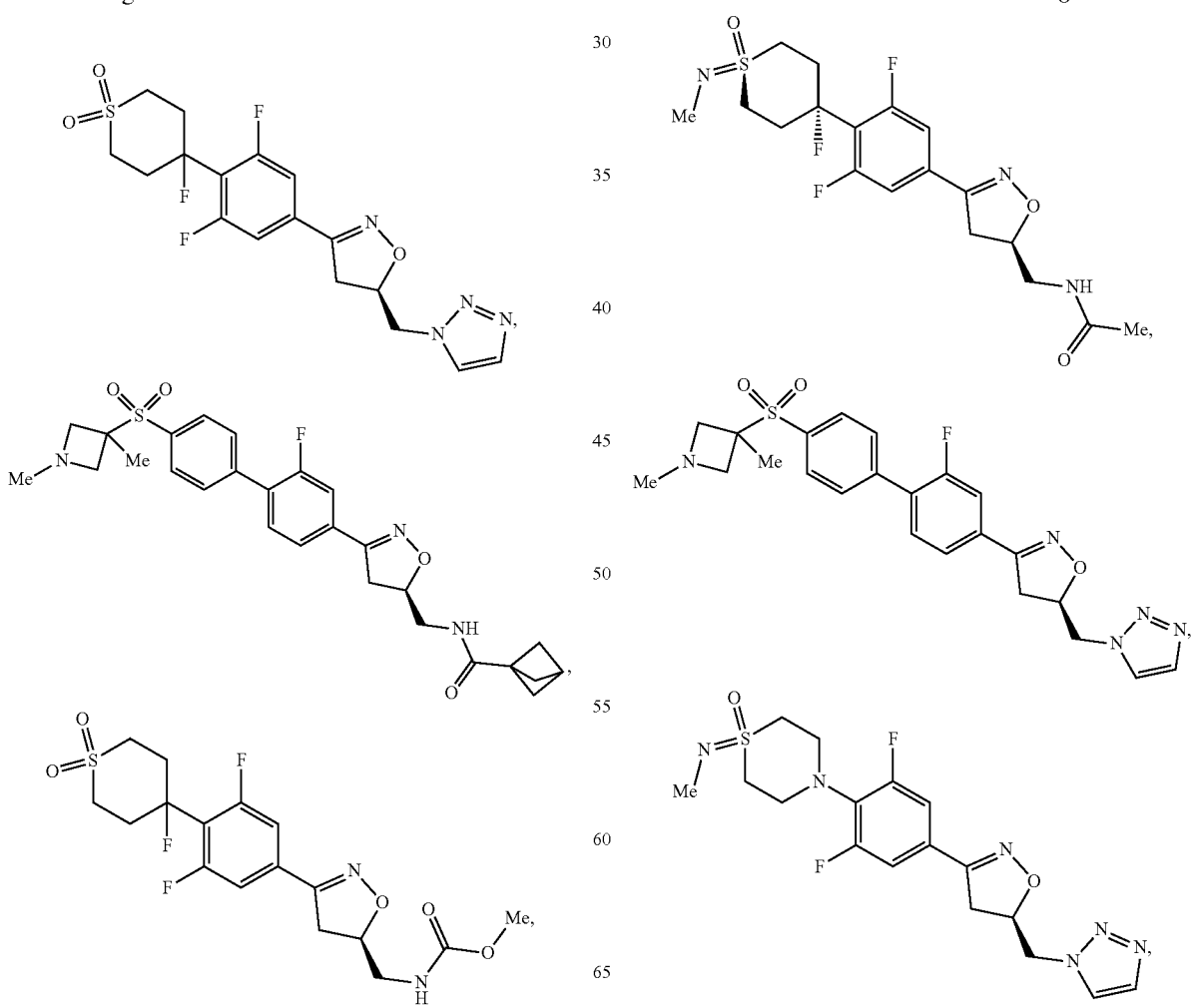

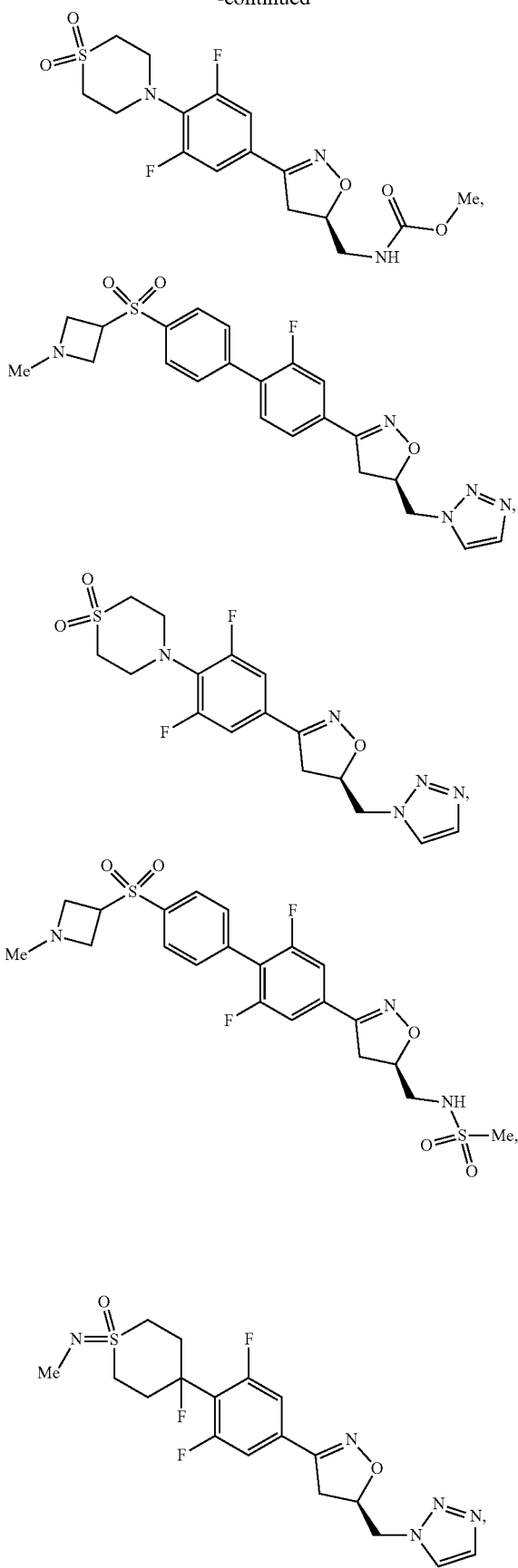
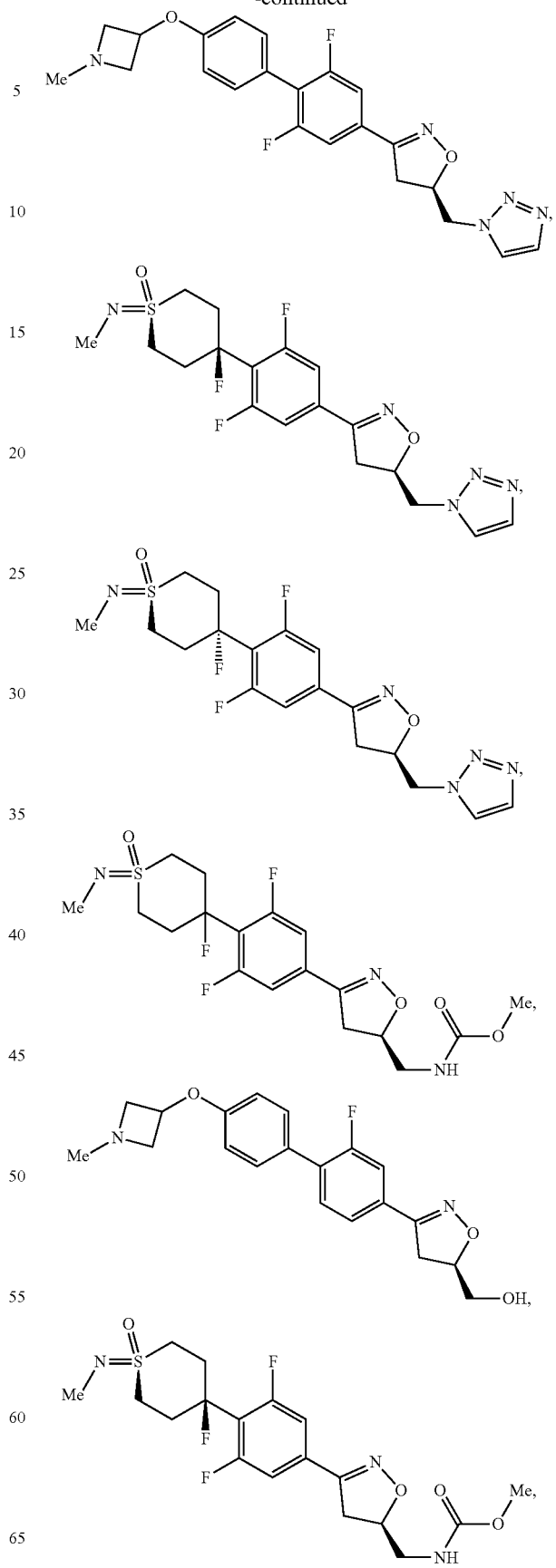

29
-continued
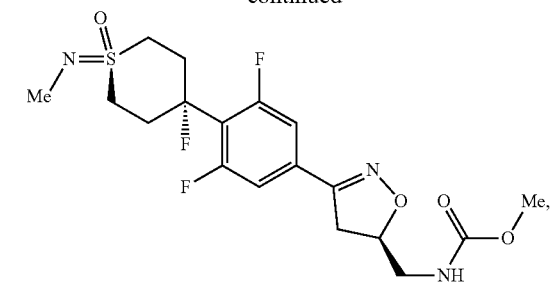
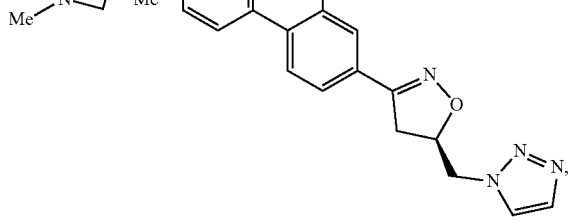
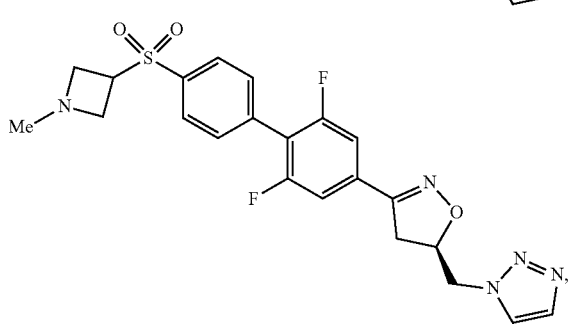
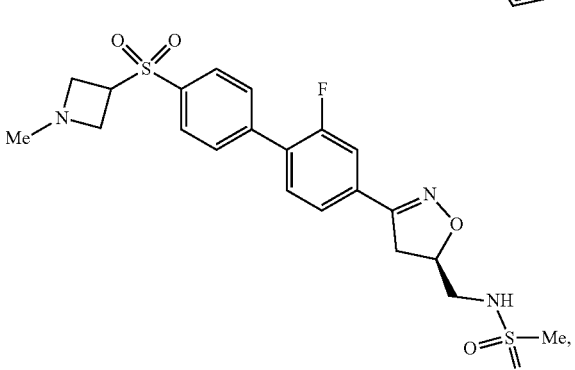
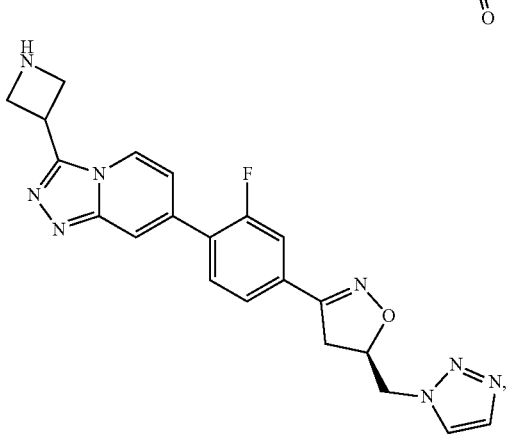
30
-continued
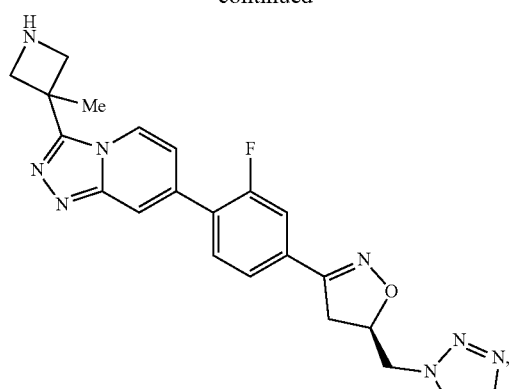
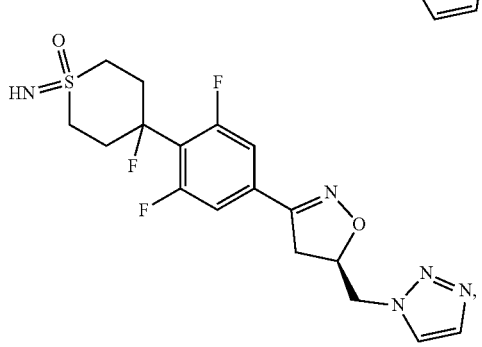
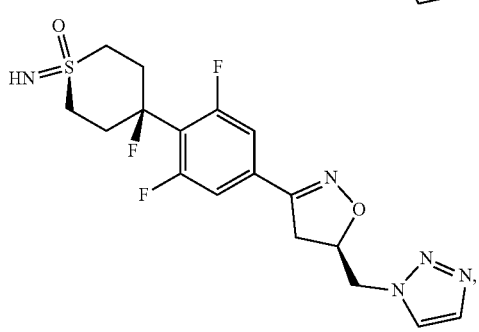
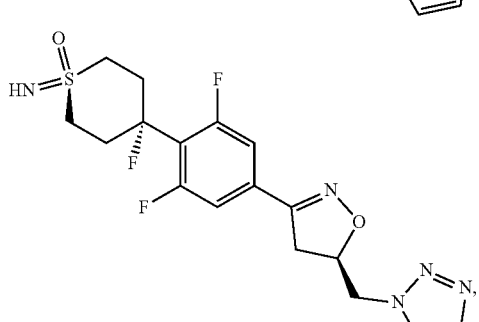
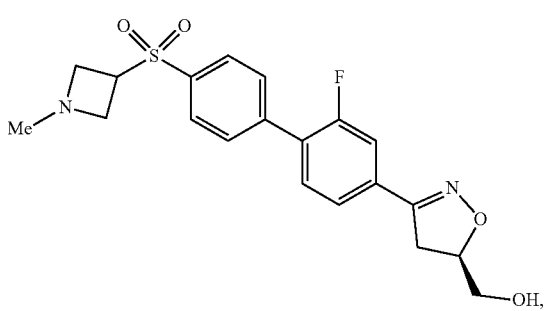

31
-continued
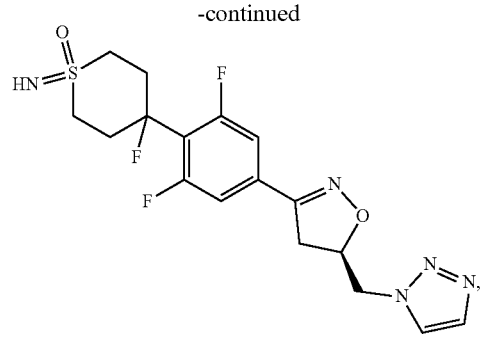
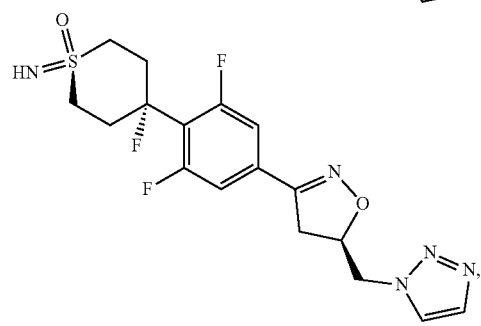
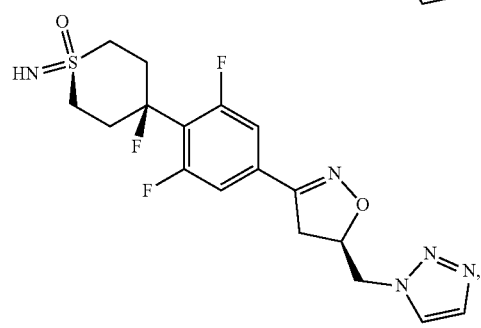
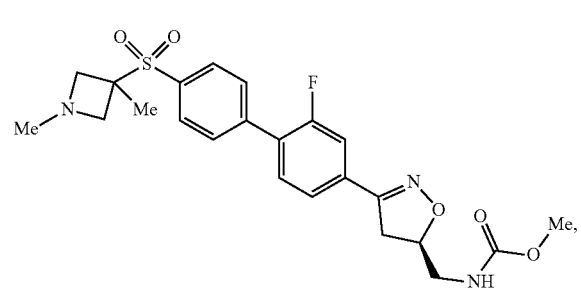
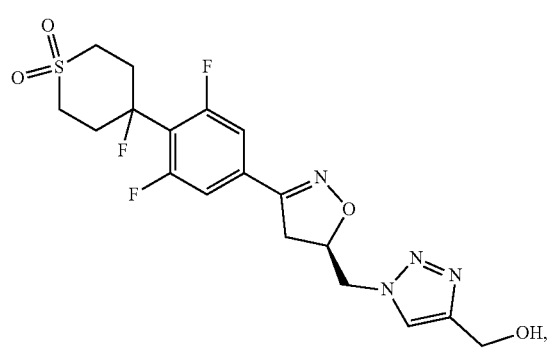
32
-continued
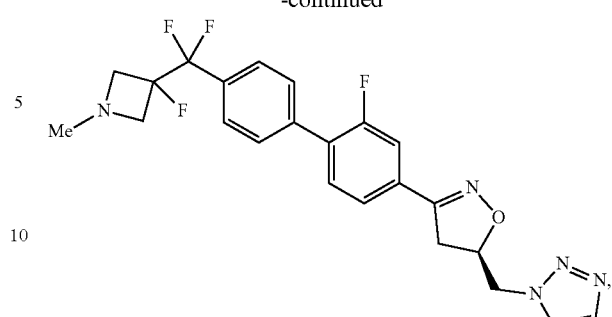
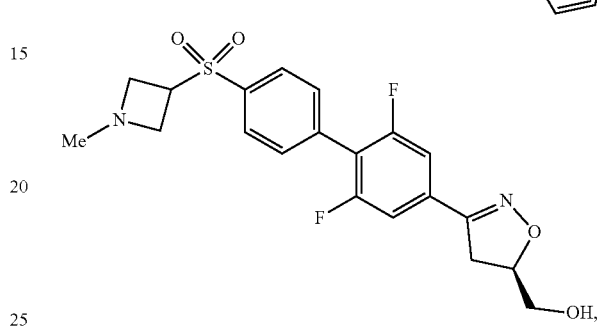
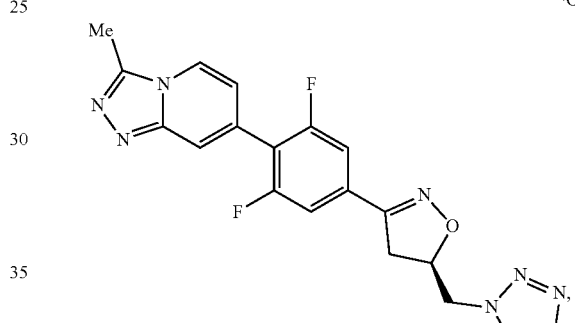
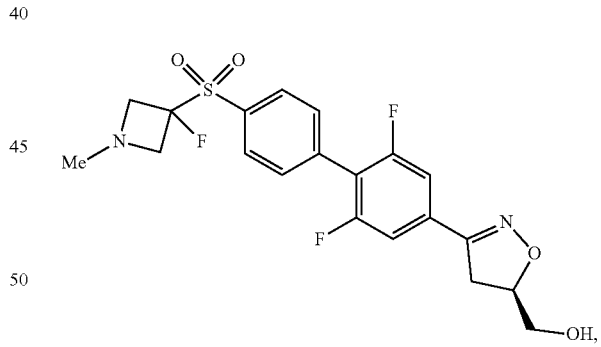
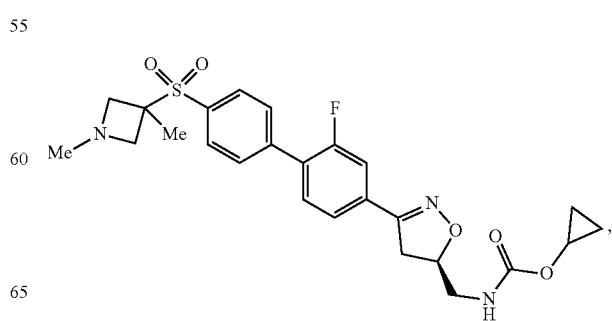

33
-continued
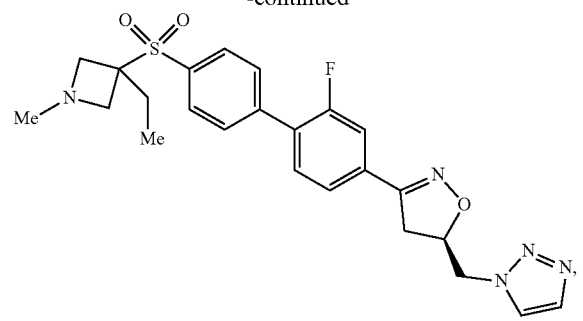
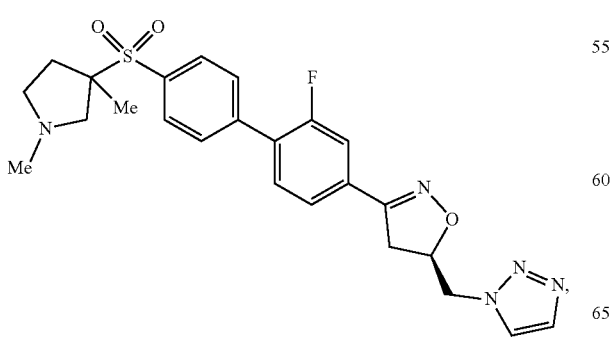
34
-continued
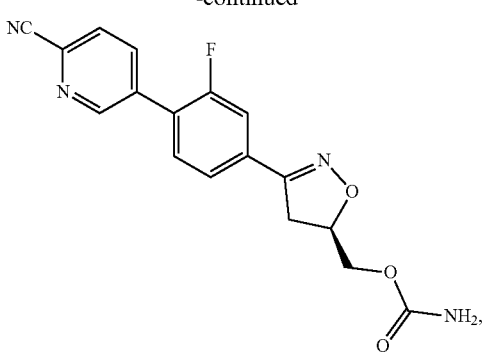
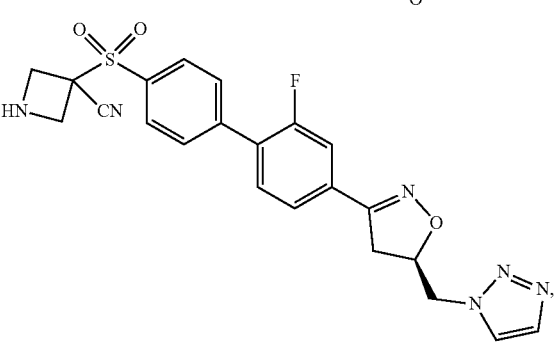
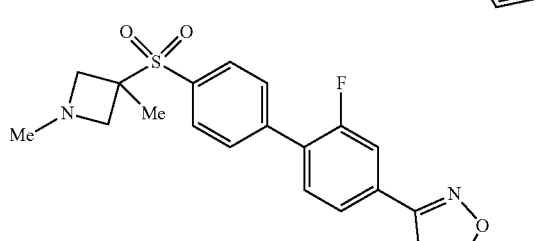
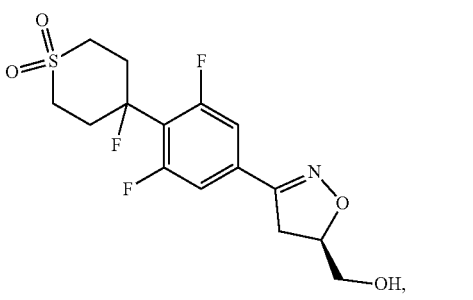

-continued
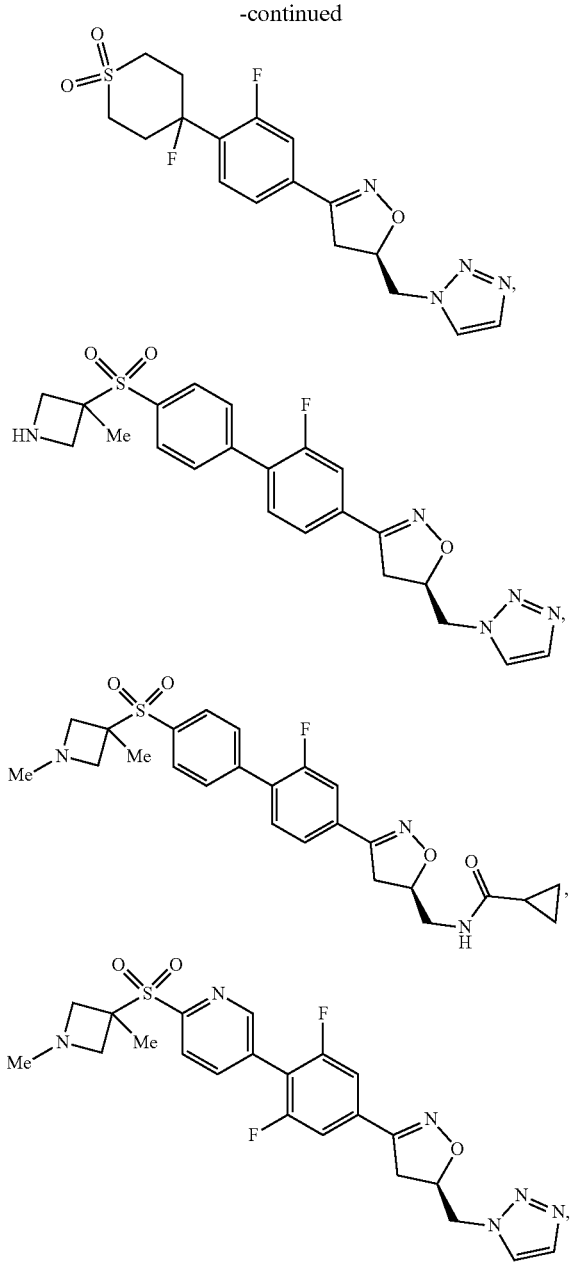
-continued
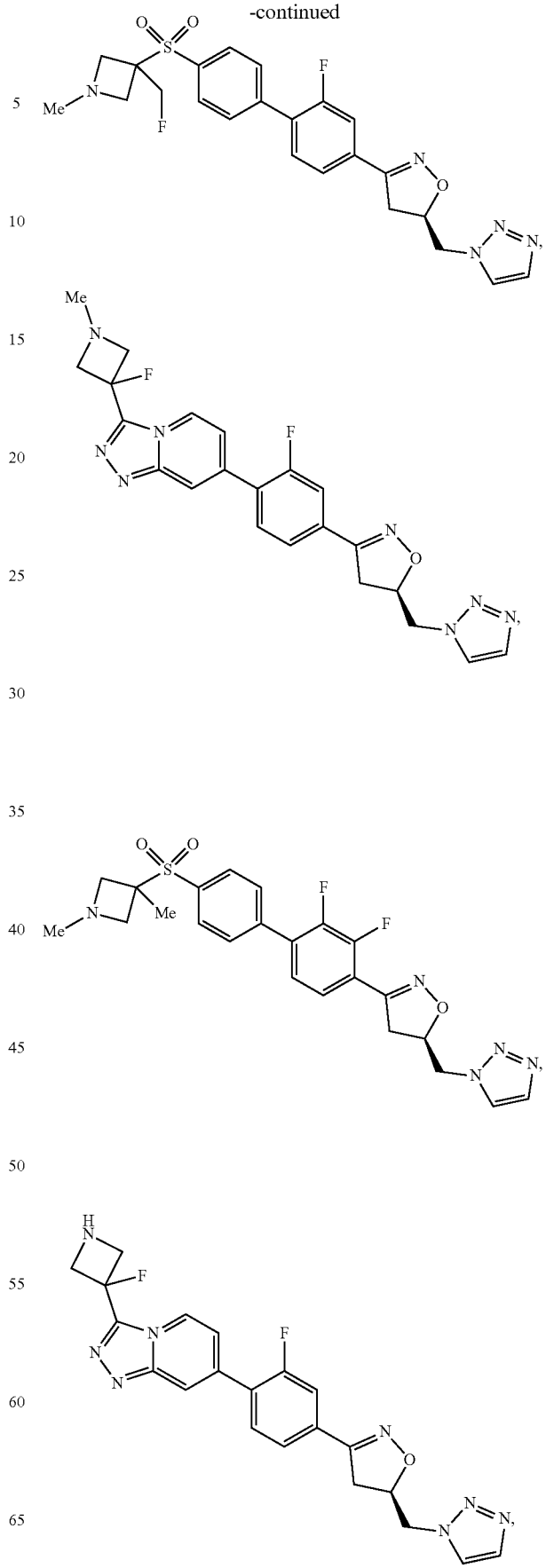

-continued

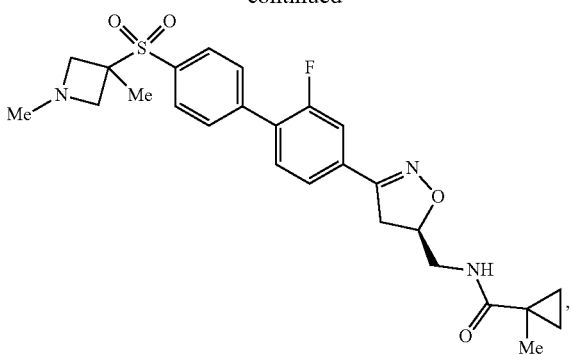

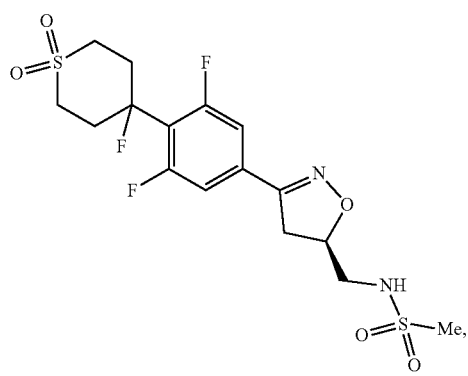

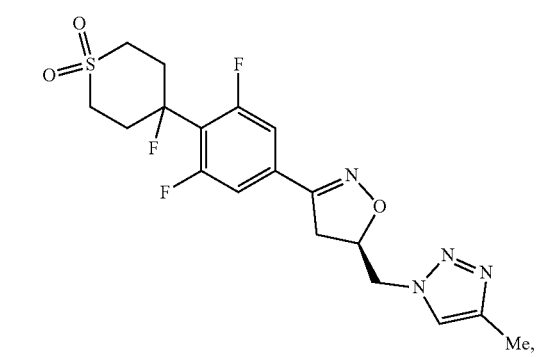

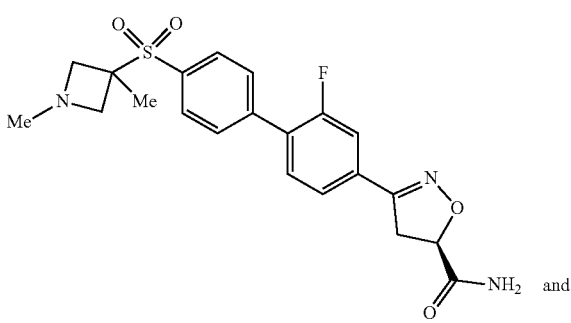
and

-continued

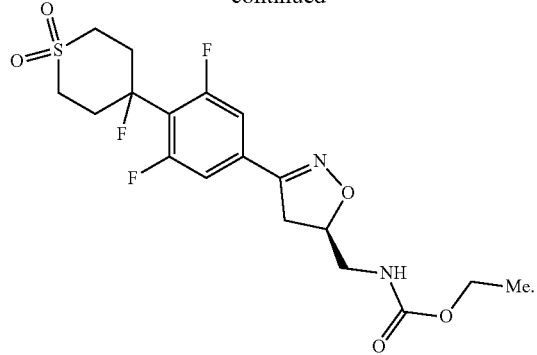

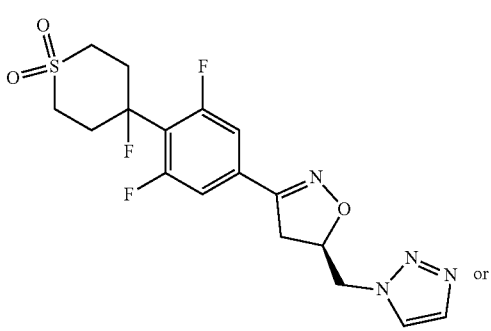

Specific embodiments disclosed herein include compounds, or pharmaceutically acceptable salts thereof, having the following structure:

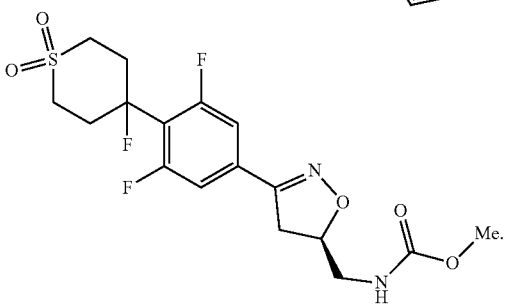
or

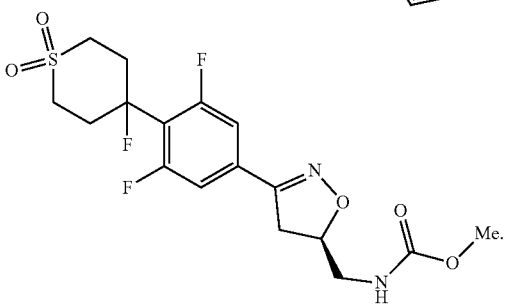

Reference to different embodiments with respect to Formula I compounds, specifically includes different embodiments of Formula I such as Formula IA and Formula IB, sub-embodiments of Formula IA and Formula IB, other embodiments provided herein, and individual compounds described herein.

Other embodiments of the present invention include the following:

(a) A pharmaceutical composition comprising an effective amount of a compound of Formula I, IA, or IB, as defined herein, or a pharmaceutically acceptable salt thereof, and a pharmaceutically acceptable carrier.

(b) The pharmaceutical composition of (a), further comprising a second compound, wherein the second compound is an antibiotic.

(c) The pharmaceutical composition of (b), wherein the second compound is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

(d) A pharmaceutical composition comprising (i) a compound of formula I, IA, or IB, or a pharmaceutically acceptable salt thereof, and (ii) a second compound, wherein the second compound is an antibiotic, wherein the compound of formula I, IA, or IB, and the second compound are each employed in an amount that renders the combination effective for treating or preventing bacterial infection.

(e) The combination of (d), wherein the second compound is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

(f) A method for treating a bacterial infection in a subject which comprises administering to a subject in need of such treatment an effective amount of a compound of Formula I, IA, or IB, or a pharmaceutically acceptable salt thereof.

(g) A method for preventing and/or treating a bacterial infection which comprises administering to a subject in need of such treatment an effective amount of a compound of Formula I, IA, or IB, or a pharmaceutically acceptable salt thereof.

(h) A method for treating a bacterial infection which comprises administering to a subject in need of such treatment a therapeutically effective amount of the composition of (a), (b), (c), (d), or (e).

(i) The method of treating a bacterial infection as set forth in (f), (g), or (h), wherein the bacterial infection is due to *Mycobacterium tuberculosis*.

(j) A method for preventing and/or treating a mycobacterial infection which comprises administering to a subject in need of such treatment an effective amount of a composition comprising a compound described herein, or a pharmaceutically acceptable salt thereof.

(k) The method of treating a mycobacterial infection as set forth in (j), wherein the mycobacterial infection is due to *M. tuberculosis*.

(l) The method of treating a mycobacterial infection as set forth in (j), wherein the composition is a composition of (a), (b), (c), (d), or (e).

The present invention also includes a compound of Formula I, IA, or IB, or a pharmaceutically acceptable salt thereof, (i) for use in, (ii) for use as a medicament for, or (iii) for use in the preparation (or manufacture) of a medicament for, medicine or treating bacterial infection, particularly a mycobacterial infection. In these uses, the compounds of the present invention can optionally be employed in combination with one or more second therapeutic agents including ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

Additional embodiments of the invention include the pharmaceutical compositions, combinations and methods set forth in (a)-(l) above and the uses set forth in the preceding paragraph, wherein the compound of the present invention employed therein is a compound of one of the embodiments, sub-embodiments, classes or sub-classes described above. The compound may optionally be used in the form of a pharmaceutically acceptable salt in these embodiments.

In the embodiments of the compounds and salts provided above, it is to be understood that each embodiment may be combined with one or more other embodiments, to the extent that such a combination provides a stable compound or salt and is consistent with the description of the embodiments. It is further to be understood that the embodiments of compositions and methods provided as (a) through (l) above are understood to include all embodiments of the compounds and/or salts, including such embodiments as result from combinations of embodiments.

Additional embodiments of the present invention include each of the pharmaceutical compositions, combinations, methods and uses set forth in the preceding paragraphs, wherein the compound of the present invention or its salt employed therein is substantially pure. With respect to a pharmaceutical composition comprising a compound of Formula I, IA, or IB or its salt and a pharmaceutically acceptable carrier and optionally one or more excipients, it is understood that the term "substantially pure" is in reference to a compound of Formula I, IA, or IB or its salt per se; i.e., the purity of the active ingredient in the composition.

Definitions and Abbreviations

The terms used herein have their ordinary meaning and the meaning of such terms is independent at each occurrence thereof. That notwithstanding and except where stated otherwise, the following definitions apply throughout the specification and claims. Chemical names, common names, and chemical structures may be used interchangeably to describe the same structure. If a chemical compound is referred to using both a chemical structure and a chemical name and an ambiguity exists between the structure and the name, the structure predominates. These definitions apply regardless of whether a term is used by itself or in combination with other terms, unless otherwise indicated. Hence, the definition of "alkyl" applies to "alkyl" as well as the "alkyl" portions of "hydroxyalkyl," "haloalkyl," "—O-alkyl," etc. . . . .

As used herein, and throughout this disclosure, the following terms, unless otherwise indicated, shall be understood to have the following meanings:

"Alkyl" means saturated carbon chains which may be linear or branched or combinations thereof, unless the carbon chain is defined otherwise. Other groups having the prefix "alk", such as alkoxy and alkanoyl, also may be linear or branched, or combinations thereof, unless the carbon chain is defined otherwise. Examples of alkyl groups include methyl, ethyl, propyl, isopropyl, butyl, sec- and tert-butyl, pentyl, hexyl, heptyl, octyl, and the like.

"Alkenyl" means carbon chains which contain at least one carbon-carbon double bond, and which may be linear or branched, or combinations thereof, unless otherwise defined. Examples of alkenyl include vinyl, allyl, isopropenyl, pentenyl, hexenyl, heptenyl, 1-propenyl, 2-butenyl, 2-methyl-2-butenyl, and the like.

"Antibiotic" refers to a compound or composition which decreases the viability of a microorganism, or which inhibits the growth or proliferation of a microorganism. The phrase "inhibits the growth or proliferation" means increasing the generation time (i.e., the time required for the bacterial cell to divide or for the population to double) by at least about 2-fold. Preferred antibiotics are those which can increase the generation time by at least about 10-fold or more (e.g., at least about 100-fold or even indefinitely, as in total cell death). As used in this disclosure, an antibiotic is further intended to include an antimicrobial, bacteriostatic, or bactericidal agent.

"About", when modifying the quantity (e.g., kg, L, or equivalents) of a substance or composition, or the value of a physical property, or the value of a parameter characterizing a process step (e.g., the temperature at which a process step is conducted), or the like refers to variation in the numerical quantity that can occur, for example, through typical measuring, handling and sampling procedures involved in the preparation, characterization and/or use of the substance or composition; through inadvertent error in these procedures; through differences in the manufacture, source, or purity of the ingredients employed to make or use the compositions or carry out the procedures; and the like. In certain embodiments, "about" can mean a variation of ±0.1, 0.2, 0.3, 0.4, 0.5, 1.0, 2.0, 3.0, 4.0, or 5.0 of the appropriate unit. In certain embodiments, "about" can mean a variation of ±1%, 2%, 3%, 4%, 5%, 10%, or 20%.

"Aromatic ring system" means monocyclic, bicyclic or tricyclic aromatic ring or ring system containing 5-14 ring atoms, wherein at least one of the rings is aromatic. Aromatic ring systems, as used herein, encompass aryls and heteroaryls. The term may be used to describe a carbocyclic ring fused to an aryl group. For example, a 5-7-membered cycloalkyl can be fused through two adjacent ring atoms to a 5-6-membered heteroaryl containing 1, 2, or 3 heteroatom ring atoms selected from the group consisting of N, O, and S. In another example, a heteromonocyclic ring is fused through two ring atoms to a phenyl or 5-6-membered heteroaryl containing 1, 2, or 3 heteroatoms selected from the group consisting of N, O, and S.

"Aryl" means a monocyclic, bicyclic or tricyclic carbocyclic aromatic ring or ring system containing 5-14 carbon atoms, wherein at least one of the rings is aromatic. Examples of aryl include phenyl and naphthyl.

"Cycloalkyl" means a saturated monocyclic, bicyclic or bridged carbocyclic ring, having a specified number of carbon atoms. Examples of cycloalkyl include cyclopropyl, cyclobutyl, cyclopentyl, cyclohexyl, and the like.

The term "heterocycloalkyl," as used herein, refers to a non-aromatic saturated monocyclic or multicyclic ring system comprising 3 to 11 ring atoms, wherein from 1 to 4 of the ring atoms are independently O, S, or N, and the remainder of the ring atoms are carbon atoms. A heterocycloalkyl group can be joined via a ring carbon or ring nitrogen atom (if present). In one embodiment, a heterocycloalkyl group is monocyclic and has from about 3 to about 7 ring atoms. In another embodiment, a heterocycloalkyl group is monocyclic has from about 4 to about 7 ring atoms. In another embodiment, a heterocycloalkyl group is bicyclic and has from about 7 to about 11 ring atoms. In still another embodiment, a heterocycloalkyl group is monocyclic and has 5 or 6 ring atoms. In one embodiment, a heterocycloalkyl group is monocyclic. In another embodiment, a heterocycloalkyl group is bicyclic. There are no adjacent oxygen and/or sulfur atoms present in the ring system. Any —NH group in a heterocycloalkyl ring may exist protected such as, for example, as an —N(BOC), —N(Cbz), —N(Tos) group and the like; such protected heterocycloalkyl groups are considered part of this invention. The term "heterocycloalkyl" also encompasses a heterocycloalkyl group, as defined above, which is fused to an aryl (e.g., benzene) or heteroaryl ring. A heterocycloalkyl group can be optionally substituted by one or more "ring system substituents" which may be the same or different, and are as defined herein below. The nitrogen or sulfur atom of the heterocycloalkyl (if present) can be optionally oxidized to the corresponding N-oxide, S-oxide or S,S-dioxide. Non-limiting examples of monocyclic heterocycloalkyl rings include oxetanyl, piperidyl, pyrrolidinyl, piperazinyl, morpholinyl, thiomorpholinyl, thiazolidinyl, 1,4-dioxanyl, tetrahydrofuranyl, tetrahydrothiophenyl, delta-lactam, delta-lactone, silacyclopentane, silapyrrolidine and the like, and all isomers thereof.

As used herein, e.g. in the definition of $R^1$, "—CH$_2$NR$^2$COR$^3$" means "—CH$_2$NR$^2$C=OR$^3$".

"Drug resistant" means, in connection with a *Mycobacterium*, a *Mycobacterium* which is no longer susceptible to at least one previously effective drug; which has developed the ability to withstand antibiotic attack by at least one previously effective drug. A drug resistant strain may relay that ability to withstand to its progeny. Said resistance may be due to random genetic mutations in the bacterial cell that alters its sensitivity to a single drug or to different drugs.

"Halogen" includes fluorine, chlorine, bromine and iodine.

"Heteroaryl", as used herein, refers to an aromatic monocyclic or multicyclic ring system comprising about 5 to about 14 ring atoms, wherein from 1 to 4 of the ring atoms is independently O, N, SO$_2$, or S and the remaining ring atoms are carbon atoms. In one embodiment, a heteroaryl group has 5 to 10 ring atoms. In another embodiment, a heteroaryl group is monocyclic and has 5 or 6 ring atoms. In another embodiment, a heteroaryl group is bicyclic. A heteroaryl group can be optionally substituted by one or more "ring system substituents" which may be the same or different, and are as defined herein below. A heteroaryl group is joined via a ring carbon atom, and any nitrogen atom of a heteroaryl can be optionally oxidized to the corresponding N-oxide. The term "heteroaryl" also encompasses a heteroaryl group, as defined above, which is fused to a benzene ring. Non-limiting examples of heteroaryls include pyridyl, pyrazinyl, furanyl, thienyl, pyrimidinyl, pyridone (including N-substituted pyridones), isoxazolyl, isothiazolyl, oxazolyl, oxadiazolyl, thiazolyl, pyrazolyl, furazanyl, pyrrolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, benzimidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like, and all isomeric forms thereof. In another embodiment of the present invention, heteroaryl is pyridine. Examples of bicyclic rings include:

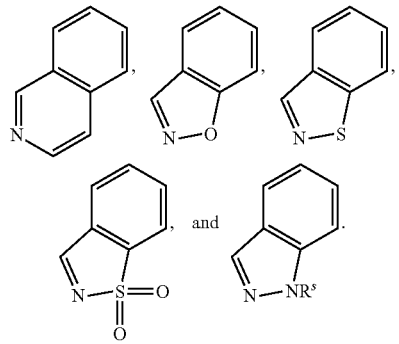

"Heterocycle" means a monocyclic or bicyclic saturated, partially unsaturated, unsaturated, or aromatic ring system containing 5-10 atoms and containing at least one ring heteroatom selected from the group consisting of N, S, $SO_2$ and O. In select embodiments, the ring system contains 1-4 heteroatoms selected from the group consisting of N, S, $SO_2$ and O. When a heterocycle contains two rings, the rings may be fused, bridged or spirocyclic. Heterocycle includes heteroaryls and heterocycloalkyls.

"Oxo" means an oxygen atom connected to another atom by a double bond and is can be represented "=O".

"Tuberculosis" comprises disease states usually associated with infections caused by *mycobacteria* species comprising *M. tuberculosis* complex. The term "tuberculosis" is also associated with mycobacterial infections caused by *mycobacteria* other than *M. tuberculosis* (MOTT). Other mycobacterial species include *M. avium-intracellulare, M. kansarii, M. fortuitum, M. chelonae, M. leprae, M. africanum*, and *M. micron, M. avium* paratuberculosis, *M. intracellulare, M. scrofulaceum, M. xenopi, M. marinum*, and *M. ulcerans*.

Another embodiment of the present invention is a compound of Formula I, or a pharmaceutically acceptable salt thereof, as originally defined or as defined in any of the foregoing embodiments, sub-embodiments, aspects, classes or sub-classes, wherein the compound or its salt is in a substantially pure form. As used herein "substantially pure" means suitably at least about 60 wt. %, typically at least about 70 wt. %, preferably at least about 80 wt. %, more preferably at least about 90 wt. % (e.g., from about 90 wt. % to about 99 wt. %), even more preferably at least about 95 wt. % (e.g., from about 95 wt. % to about 99 wt. %, or from about 98 wt. % to 100 wt. %), and most preferably at least about 99 wt. % (e.g., 100 wt. %) of a product containing a compound of Formula I, IA, or IB or a salt of Formula I, IA, or IB (e.g., the product isolated from a reaction mixture affording the compound or salt) consists of the compound or salt. The level of purity of the compounds and salts can be determined using a standard method of analysis such as thin layer chromatography, gel electrophoresis, high performance liquid chromatography, and/or mass spectrometry. If more than one method of analysis is employed and the methods provide experimentally significant differences in the level of purity determined, then the method providing the highest level of purity governs. A compound or salt of 100% purity is one which is free of detectable impurities as determined by a standard method of analysis. With respect to a compound of the invention which has one or more asymmetric centers and can occur as mixtures of stereoisomers, a substantially pure compound can be either a substantially pure mixture of the stereoisomers or a substantially pure individual diastereomer or enantiomer.

The present invention encompasses all stereoisomeric forms of the compounds of Formula I, Formula IA and Formula IB. Unless a specific stereochemistry is indicated, the present invention is meant to comprehend all such isomeric forms of these compounds. Centers of asymmetry that are present in the compounds of Formula I, Formula IA, and Formula IB can all independently of one another have (R) configuration or (S) configuration. When bonds to the chiral carbon are depicted as straight lines in the structural Formulas of the invention, it is understood that both the (R) and (S) configurations of the chiral carbon, and hence both enantiomers and mixtures thereof, are embraced within the Formula. Similarly, when a compound name is recited without a chiral designation for a chiral carbon, it is understood that both the (R) and (S) configurations of the chiral carbon, and hence individual enantiomers and mixtures thereof, are embraced by the name. The production of specific stereoisomers or mixtures thereof may be identified in the Examples where such stereoisomers or mixtures were obtained, but this in no way limits the inclusion of all stereoisomers and mixtures thereof from being within the scope of this invention.

The invention includes all possible enantiomers and diastereomers and mixtures of two or more stereoisomers, for example mixtures of enantiomers and/or diastereomers, in all ratios. Thus, enantiomers are a subject of the invention in enantiomerically pure form, both as levorotatory and as dextrorotatory antipodes, in the form of racemates and in the form of mixtures of the two enantiomers in all ratios. In the case of a cis/trans isomerism the invention includes both the cis form and the trans form as well as mixtures of these forms in all ratios. The preparation of individual stereoisomers can be carried out, if desired, by separation of a mixture by customary methods, for example by chromatography or crystallization, by the use of stereochemically uniform starting materials for the synthesis or by stereoselective synthesis. Optionally a derivatization can be carried out before a separation of stereoisomers. The separation of a mixture of stereoisomers can be carried out at an intermediate step during the synthesis of a compound of Formula I, Formula IA, or Formula IB or it can be done on a final racemic product. Absolute stereochemistry may be determined by X-ray crystallography of crystalline products or crystalline intermediates which are derivatized, if necessary, with a reagent containing a stereogenic center of known configuration. Where compounds of this invention are capable of tautomerization, all individual tautomers as well as mixtures thereof are included in the scope of this invention. Unless a particular isomer, salt, solvate (including hydrates) or solvated salt of such racemate, enantiomer, diastereomer or tautomer is indicated, the present invention includes all such isomers, as well as salts, solvates (including hydrates) and solvated salts of such racemates, enantiomers, diastereomers and tautomers and mixtures thereof.

When any variable (e.g., $R^1$, $R^a$, etc.) occurs more than one time in any constituent or in formula I, its definition on each occurrence is independent of its definition at every other occurrence. Also, combinations of substituents and/or variables are permissible only if such combinations result in stable compounds. A squiggly line across a bond in a substituent variable represents the point of attachment.

Under standard nomenclature used throughout this disclosure, the terminal portion of the designated side chain is described last, preceded by the adjacent functionality toward the point of attachment.

In choosing compounds of the present invention, one of ordinary skill in the art will recognize that the various substituents, i.e. $R^1$, $R^2$, etc., are to be chosen in conformity with well-known principles of chemical structure connectivity and stability.

The term "substituted" means that one or more hydrogens on the designated atom is replaced with a selection from the indicated group, provided that the designated atom's normal valency under the existing circumstances is not exceeded, and that the substitution results in a stable compound. The term substituted shall be deemed to include multiple degrees of substitution by a named substituent. Where multiple substituent moieties are disclosed or claimed, the substituted compound can be independently substituted by one or more of the disclosed or claimed substituent moieties, singly or plurally. By independently substituted, it is meant that the (two or more) substituents can be the same or different.

By "stable compound" or "stable structure" is meant a compound that is sufficiently robust to survive isolation to a useful degree of purity from a reaction mixture, and whose structure and properties remain or can be caused to remain essentially unchanged for a period of time sufficient to allow use of the compound for the purposes described herein (e.g., therapeutic administration to a subject). The compounds of the present invention are limited to stable compounds embraced by Formula I.

When a group, e.g., $C_1$-$C_8$ alkyl, is indicated as being substituted, such substitutions can also occur where such group is part of a larger substituent, e.g., —$C_1$-$C_6$alkyl-$C_3$-$C_7$cycloalkyl and —$C_1$-$C_8$alkyl-aryl.

In the compounds of Formula I, IA, and IB, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of Formula I, IA, and IB. For example, different isotopic forms of hydrogen (H) include protium ($^1$H) and deuterium ($^2$H or D). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds within Formula I, IA, and IB can be prepared without undue experimentation by conventional techniques well known to those skilled in the art or by processes analogous to those described in the EXAMPLES herein using appropriate isotopically-enriched reagents and/or intermediates.

Unless expressly stated to the contrary in a particular context, any of the various cyclic rings and ring systems described herein may be attached to the rest of the compound at any ring atom (i.e., any carbon atom or any heteroatom) provided that a stable compound results.

Unless expressly stated to the contrary, all ranges cited herein are inclusive. For example, a heteroaromatic ring described as containing from "1 to 4 heteroatoms" means the ring can contain 1, 2, 3 or 4 heteroatoms. It is also to be understood that any range cited herein includes within its scope all of the sub-ranges within that range. Thus, for example, a heterocyclic ring described as containing from "1 to 4 heteroatoms" is intended to include as aspects thereof, heterocyclic rings containing 2 to 4 heteroatoms, 3 or 4 heteroatoms, 1 to 3 heteroatoms, 2 or 3 heteroatoms, 1 or 2 heteroatoms, 1 heteroatom, 2 heteroatoms, 3 heteroatoms, and 4 heteroatoms. Similarly, $C_{1-6}$ when used with a chain, for example an alkyl chain, means that the chain can contain 1, 2, 3, 4, 5 or 6 carbon atoms. It also includes all ranges contained therein including $C_{1-5}$, $C_{1-4}$, $C_{1-3}$, $C_{1-2}$, $C_{2-6}$, $C_{3-6}$, $C_{4-6}$, $C_{5-6}$, and all other possible combinations.

It should also be noted that any carbon as well as heteroatom with unsatisfied valences in the text, schemes, examples and tables herein is assumed to have the sufficient number of hydrogen atom(s) to satisfy the valences.

When any substituent or variable (e.g., alkyl, $R^8$, $R^{11}$, etc.) occurs more than one time in any constituent or in Formula (I), its definition on each occurrence is independent of its definition at every other occurrence, unless otherwise indicated.

The term "compound" refers to the free compound and, to the extent they are stable, any hydrate or solvate thereof. A hydrate is the compound complexed with water, and a solvate is the compound complexed with an organic solvent.

As indicated above, the compounds of the present invention can be employed in the form of pharmaceutically acceptable salts. It will be understood that, as used herein, the compounds of the instant invention can also include the pharmaceutically acceptable salts, and also salts that are not pharmaceutically acceptable when they are used as precursors to the free compounds or their pharmaceutically acceptable salts or in other synthetic manipulations.

The term "pharmaceutically acceptable salt" refers to a salt which possesses the effectiveness of the parent compound and which is not biologically or otherwise undesirable (e.g., is neither toxic nor otherwise deleterious to the recipient thereof). The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, ascorbate, adipate, alginate, aspirate, benzenesulfonate, benzoate, bicarbonate, bisulfate, bitartrate, borate, bromide, butyrate, camphorate, camphorsulfonate, camsylate, carbonate, chloride, clavulanate, citrate, cyclopentane propionate, diethylacetic, digluconate, dihydrochloride, dodecylsulfanate, edetate, edisylate, estolate, esylate, ethanesulfonate, formic, fumarate, gluceptate, glucoheptanoate, gluconate, glutamate, glycerophosphate, glycollylarsanilate, hemisulfate, heptanoate, hexanoate, hexylresorcinate, hydrabamine, hydrobromide, hydrochloride, 2-hydroxyethanesulfonate, hydroxynaphthoate, iodide, isonicotinic, isothionate, lactate, lactobionate, laurate, malate, maleate, mandelate, mesylate, methylbromide, methylnitrate, methyl sulfate, methanesulfonate, mucate, 2-naphthalenesulfonate, napsylate, nicotinate, nitrate, N-methylglucamine ammonium salt, oleate, oxalate, pamoate (embonate), palmitate, pantothenate, pectinate, persulfate, phosphate/diphosphate, pimelic, phenylpropionic, polygalacturonate, propionate, salicylate, stearate, sulfate, subacetate, succinate, tannate, tartrate, teoclate, thiocyanate, tosylate, triethiodide, trifluoroacetate, undeconate, valerate and the like. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Particularly preferred are the ammonium, calcium, magnesium, potassium, and sodium salts. Salts derived from pharmaceutically acceptable organic non-toxic bases include salts of primary, secondary, and tertiary amines, cyclic amines, dicyclohexyl amines and basic ion-exchange resins, such as arginine, betaine, caffeine, choline, N,N-dibenzylethylenediamine, diethylamine, 2-diethylaminoethanol, 2-dimethylaminoethanol, ethanolamine, ethylamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like. Also, included are the basic nitrogen-containing groups may be quaternized with such agents as lower alkyl halides, such as methyl, ethyl, propyl, and butyl chloride, bromides and iodides; dialkyl sulfates like dimethyl, diethyl, dibutyl; and diamyl sulfates, long chain halides such as decyl, lauryl, myristyl and stearyl chlorides, bromides and iodides, aralkyl halides like benzyl and phenethyl bromides and others.

These salts can be obtained by known methods, for example, by mixing a compound of the present invention with an equivalent amount and a solution containing a desired acid, base, or the like, and then collecting the desired salt by filtering the salt or distilling off the solvent. The compounds of the present invention and salts thereof may form solvates with a solvent such as water, ethanol, or glycerol. The compounds of the present invention may form an acid addition salt and a salt with a base at the same time according to the type of substituent of the side chain.

The compounds of the invention can also be employed in the form of a prodrug. For example, the hydrogen in —COOH be replaced with any the following groups: $C_{1-6}$ alkyl, $C_{3-6}$ cycloalkyl, —$C_{1-6}$alkyl-$C_{3-6}$cycloalkyl, $C_{3-7}$ cycloheteroalkyl, —$C_{1-6}$alkyl-$C_{3-7}$cycloheteroalkyl, aryl, —$C_{1-10}$alkyl-aryl, heteroaryl, and —$C_{1-10}$ alkyl-heteroaryl. Any $C_{1-6}$ alkyl, $C_{3-6}$ cycloalkyl, or $C_{3-7}$ cycloheteroalkyl can also be substituted. Any aryl or heteroaryl can also be substituted as indicated.

As set forth above, the present invention includes pharmaceutical compositions comprising a compound of Formula I, IA, or IB of the present invention, optionally one or more other active components, and a pharmaceutically acceptable carrier. The characteristics of the carrier will depend on the route of administration. By "pharmaceutically acceptable" is meant that the ingredients of the pharmaceutical composition must be compatible with each other, do not interfere with the effectiveness of the active ingredient(s), and are not deleterious (e.g., toxic) to the recipient thereof. Thus, compositions according to the invention may, in addition to the inhibitor, contain diluents, fillers, salts, buffers, stabilizers, solubilizers, and other materials well known in the art.

Also, as set forth above, the present invention includes a method for treating a bacterial infection which comprises administering to a subject in need of such treatment a therapeutically effective amount of a compound of Formula I, IA, or IB or a pharmaceutically acceptable salt thereof. The term "subject" (or, alternatively, "patient") as used herein refers to an animal, preferably a mammal, most preferably a human, who has been the object of treatment, observation or experiment. The term "administration" and variants thereof (e.g., "administering" a compound) in reference to a compound of Formula I, IA or IB mean providing the compound, or a pharmaceutically acceptable salt thereof, to the individual in need of treatment. When a compound or a salt thereof is provided in combination with one or more other active agents, "administration" and its variants are each understood to include provision of the compound or its salt and the other agents at the same time or at different times. When the agents of a combination are administered at the same time, they can be administered together in a single composition or they can be administered separately. It is understood that a "combination" of active agents can be a single composition containing all of the active agents or multiple compositions each containing one or more of the active agents. In the case of two active agents a combination can be either a single composition comprising both agents or two separate compositions each comprising one of the agents; in the case of three active agents a combination can be either a single composition comprising all three agents, three separate compositions each comprising one of the agents, or two compositions one of which comprises two of the agents and the other comprises the third agent; and so forth.

The compositions and combinations of the present invention are suitably administered in effective amounts. The term "effective amount" as used herein with respect to a compound means the amount of active compound sufficient to cause a bacteriocidal or bacteriostatic effect. In one embodiment, the effective amount is a "therapeutically effective amount" meaning the amount of active compound that can overcome bacterial drug resistance and which is sufficient to inhibit bacterial replication and/or result in bacterial killing. When the active compound (i.e., active ingredient) is administered as the salt, references to the amount of active ingredient are to the free acid or free base form of the compound.

The administration of a composition of the present invention is suitably parenteral, oral, sublingual, transdermal, topical, intranasal, intratracheal, intraocular, or intrarectal, wherein the composition is suitably formulated for administration by the selected route using formulation methods well known in the art, including, for example, the methods for preparing and administering formulations described in chapters 39, 41, 42, 44 and 45 in Remington—The Science and Practice of Pharmacy, $21^{st}$ edition, 2006. In one embodiment, compounds of the invention are administered intravenously in a hospital setting. In another embodiment, administration is oral in the form of a tablet or capsule or the like. The dosage of the compounds of the invention and of their pharmaceutically acceptable salts may vary within wide limits and should naturally be adjusted, in each particular case, to the individual conditions and to the pathogenic agent to be controlled. In general, for a use in the treatment of bacterial infections, the daily dose may be between 0.005 mg/kg to 100 mg/kg, 0.01 mg/kg to 10 mg/kg, 0.05 mg/kg to 5 mg/kg, 0.05 mg/kg to 1 mg/kg.

In some embodiments, the compound of the invention is provided in a pharmaceutical formulation for oral, intravenous, intramuscular, nasal, or topical administration. Thus, in some embodiments, the formulation can be prepared in a dosage form, such as but not limited to, a tablet, capsule, liquid (solution or suspension), suppository, ointment, cream, or aerosol. In some embodiments, the presently disclosed subject matter provides such compounds and/or formulations that have been lyophilized and that can be reconstituted to form pharmaceutically acceptable formulations for administration, for example, as by intravenous or intramuscular injection.

Intravenous administration of a compound of the invention can be conducted by reconstituting a powdered form of the compound with an acceptable solvent. Suitable solvents include, for example, saline solutions (e.g., 0.9% Sodium Chloride Injection) and sterile water (e.g., Sterile Water for Injection, Bacteriostatic Water for Injection with methylparaben and propylparaben, or Bacteriostatic Water for Injection with 0.9% benzyl alcohol). The powdered form of the compound can be obtained by gamma-irradiation of the compound or by lyophilization of a solution of the compound, after which the powder can be stored (e.g., in a sealed vial) at or below room temperature until it is reconstituted. The concentration of the compound in the reconstituted IV solution can be, for example, in a range of from about 0.1 mg/mL to about 20 mg/mL.

The methods of the presently disclosed subject matter are useful for treating these conditions in that they inhibit the onset, growth, or spread of the condition, cause regression of the condition, cure the condition, or otherwise improve the general well-being of a subject afflicted with, or at risk of, contracting the condition. Thus, in accordance with the presently disclosed subject matter, the terms "treat", "treating", and grammatical variations thereof, as well as the phrase "method of treating", are meant to encompass any desired therapeutic intervention, including but not limited to a method for treating an existing infection in a subject, and a method for the prophylaxis (i.e., preventing) of infection, such as in a subject that has been exposed to a microbe as disclosed herein or that has an expectation of being exposed to a microbe as disclosed herein.

Infections that may be treatable by the compounds of the invention can be caused by a variety of microbes, including fungi, algae, protozoa, bacteria, and viruses. In some embodiments, the infection is a bacterial infection. Exemplary microbial infections that may be treated by the methods of the invention include, but are not limited to, infections caused by one or more of *Staphylococcus aureaus, Enterococcus faecalis, Bacillus anthracis*, a *Streptococcus* species (e.g., *Streptococcus pyogenes* and *Streptococcus pneumoniae*), *Escherichia coli, Pseudomonas aeruginosa, Burkholderia cepacia*, a *Proteus* species (e.g., *Proteus mirabilis* and *Proteus vulgaris*), *Klebsiella pneumoniae, Acinetobacter baumannii, Strenotrophomonas maltophillia, Mycobacterium tuberculosis, Mycobacterium bovis*, other *mycobacteria* of the tuberculosis complex, and non-tuberculous *mycobacteria*, including *Mycobacterium ulcerans*.

In certain embodiments, the infection is an infection of a gram-positive bacterium. In some embodiments, the infection is selected from a mycobacterial infection, a *Bacillus anthracis* infection, an *Enterococcus faecalis* infection, and a *Streptococcus pneumoniae* infection.

In some embodiments, the compound of Formula I, IA, or IB is administered prophylactically to prevent or reduce the incidence of one of: (a) a *Mycobacterium tuberculosis* infection in a subject at risk of infection; (b) a recurrence of a *Mycobacterium tuberculosis* infection; and (c) combinations thereof. In some embodiments, the compound of Formula I, IA, or IB is administered to treat an existing *Mycobacterium tuberculosis* infection. In some embodiments, the compound of Formula I, IA, or IB is administered to treat an infection of a multi-drug resistant strain of *Mycobacterium tuberculosis* (i.e., a strain that is resistant to two or more previously known anti-tuberculosis drugs, such as isoniazid, ethambutol, rifampicin, kanamycin, capreomycin, linezolid, and streptomycin). In some embodiments, the compound of Formula (I) has a minimum inhibitory concentration (MIC) against *Mycobacterium tuberculosis* of 25 µg/mL or less. In some embodiments, the compound of Formula I, IA or IB is administered to treat an infection of a multi-drug resistant strain of *Mycobacterium tuberculosis*.

Thus, the methods of the presently disclosed subject matter can be useful for treating tuberculosis in that they inhibit the onset, growth, or spread of a TB infection, cause regression of the TB infection, cure the TB infection, or otherwise improve the general well-being of a subject afflicted with, or at risk of, contracting tuberculosis.

Subjects suffering from an *M. tuberculosis* or other tuberculosis-related infection can be determined via a number of techniques, e.g., sputum smear, chest X-ray, tuberculin skin test (i.e., Mantoux test or PPD test) and/or the presence of other clinical symptoms (e.g., chest pain, coughing blood, fever, night sweats, appetite loss, fatigue, etc.). If desired, bacterial RNA, DNA or proteins can be isolated from a subject believed to be suffering from TB and analyzed via methods known in the art and compared to known nucleic or amino acid sequences of bacterial RNA, DNA or protein.

In some embodiments, the compound of Formula I, IA, or IB has a minimum inhibitory concentration (MIC) against *Mycobacterium tuberculosis* of 25 µg/mL or less. MICs can be determined via methods known in the art, for example, as described in Hurdle et al., 2008, *J. Antimicrob. Chemother.* 62:1037-1045.

In some embodiments, the methods of the invention further comprise administering to the subject an additional therapeutic compound. In some embodiments, the compound of the invention is administered to the subject before, after, or at the same time as one or more additional therapeutic compounds. In some embodiments, the additional therapeutic compound is an antibiotic. In some embodiments, the additional therapeutic compound is an anti-tuberculosis therapeutic. In some embodiments, the additional therapeutic compound is selected from the group consisting of isoniazid, ethambutol, rifampicin, kanamycin, capreomycin, linezolid, and streptomycin.

The invention thus provides in a further aspect, a combination comprising a compound of Formula I, IA, or IB or a pharmaceutically acceptable salt thereof, together with one or more additional therapeutic agents. Examples of such one or more additional therapeutic agents are anti-tuberculosis agents including, but not limited to, amikacin, aminosalicylic acid, capreomycin, cycloserine, ethambutol, ethionamide, isoniazid, kanamycin, pyrazinamide, rifamycins (such as rifampin, rifapentine and rifabutin), streptomycin, clarithromycin, azithromycin, oxazolidinones and fluoroquinolones (such as ofloxacin, ciprofloxacin, moxifloxacin and gatifloxacin). Such chemotherapy is determined by the judgment of the treating physician using preferred drug combinations. "First-line" chemotherapeutic agents used to treat a *Mycobacterium tuberculosis* infection that is not drug resistant include isoniazid, rifampin, ethambutol, streptomycin and pyrazinamide. "Second-line" chemotherapeutic agents used to treat a *Mycobacterium tuberculosis* infection that has demonstrated drug resistance to one or more "first-line" drugs include ofloxacin, ciprofloxacin, ethionamide, aminosalicylic acid, cycloserine, amikacin, kanamycin and capreomycin. In addition to the aforementioned, there are a number of new anti-tuberculosis therapeutic agents emerging from clinical studies that may also be employed as the one or more additional therapeutic agents in a combination with a compound of Formula I, IA, or IB including, but not limited to, TMC-207, OPC-67683, PA-824, LL-3858 and SQ-109.

Thus, the other antibiotic which may be combined with the compounds of formula I, IA, or IB, are for example rifampicin (=rifampin); isoniazid; pyrazinamide; amikacin; ethionamide; moxifloxacin; ethambutol; streptomycin; para-aminosalicylic acid; cycloserine; capreomycin; kanamycin; thioacetazone; quinolones/fluoroquinolones such as for example ofloxacin, ciprofloxacin, sparfloxacin; macrolides such as for example clarithromycin, clofazimine, amoxicillin with clavulanic acid; rifamycins; rifabutin; rifapentine.

In a further aspect, the one or more additional therapeutic agent is, for example, an agent useful for the treatment of tuberculosis in a mammal, therapeutic vaccines, antibacterial agents, anti-viral agents; antibiotics and/or agents for the treatment of HIV/AIDS. Examples of such therapeutic agents include isoniazid (INH), ethambutol, rifampin, pirazinamide, streptomycin, capreomycin, ciprofloxacin and clofazimine.

In one aspect, the one or more additional therapeutic agent is a therapeutic vaccine. A compound of Formula I, IA, or IB or a pharmaceutically acceptable salt thereof, may thus be administered in conjunction with vaccination against mycobacterial infection, in particular vaccination against *Mycobacterium tuberculosis* infection. Existing vaccines against mycobacterial infection include *Bacillus* Calmette Guerin (BCG). Vaccines currently under development for the treatment, prophylaxis or amelioration of mycobacterial infection include: modified BCG strains which recombinantly express additional antigens, cytokines and other agents intended to improve efficacy or safety; attenuated *mycobacteria* which express a portfolio of antigens more similar to *Mycobacterium tuberculosis* than BCG; and subunit vaccines. Subunit vaccines may be administered in the form of one or more individual protein antigens, or a fusion or fusions of multiple protein antigens, either of which may optionally be adjuvanted, or in the form of a polynucleotide encoding one or more individual protein antigens, or encoding a fusion or fusions of multiple protein antigens, such as where the polynucleotide is administered in an expression vector. Examples of subunit vaccines include, but are not limited to: M72, a fusion protein derived from the antigens Mtb32a and Mtb39; HyVac-1, a fusion protein derived from antigen 85b and ESAT-6; HyVac-4, a fusion protein derived from antigen 85b and Tb10.4; MVA85a, a modified vaccinia virus Ankara expressing antigen 85a; and Aeras-402, adenovirus 35 expressing a fusion protein derived from antigen 85a, antigen 85b and Tb10.4.

Abbreviations employed herein include the following: ACN=acetonitrile; CBZ-Cl=benzyl chloroformate; CDCl$_3$=deuterated chloroform; DCM=dichloromethane; DIAD=diisopropyl diazodicarboxylate, DIEA=N,N-Diisopropylethylamine; DMF=N,N-dimethylformamide; DMSO=dimethyl sulfoxide; Et=ethyl; EtOAc=ethyl acetate; EtOH=ethanol; GFP=green fluorescent protein; HATU=(1-[Bis(dimethylamino)methylene]-1H-1,2,3-triazolo[4,5-b]pyridinium 3-oxid hexafluorophosphate), HET=heterocycle; H$_2$=hydrogen gas, HPLC=high-performance liquid chromatography; LC-MS=liquid chromatography/mass spectrometry; LiHMDS=Lithium bis(trimethylsilyl)amide; Me=methyl; MeOH=methanol; MIC=minimum inhibitory concentration; MW=molecular weight; MS=mass spectrometry; Mtb=*Mycobacterium tuberculosis*; Pd—C=palladium on carbon; RT=room temperature; TB=tuberculosis; TEA=triethylamine; TFA=trifluoroacetic acid; THF=tetrahydrofuran; and TBDMS=tert-butyl dimethylsilyl.

Methods for Making the Compounds of Formula (I):

The compounds of Formula (I) can be prepared according to the following reaction schemes and EXAMPLES, or modifications thereof, using readily available starting materials, reagents and conventional synthesis procedures. In these reactions, it is also possible to make use of variations which are themselves known to those of ordinary skill in this art, but are not mentioned in greater detail. Alternative synthetic pathways and analogous structures will be apparent to those skilled in the art of organic synthesis in light of the following reaction schemes and EXAMPLES.

Some compounds of Formula (I) are isomers with pseudoasymmetric centers, such pseudoasymmetric centers are marked with an asterisk (*) next to the pseudoasymmetric center.

EXAMPLES

Intermediate 1

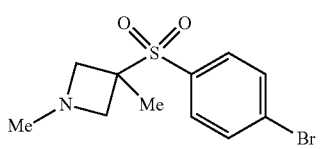 [SMILES: CN1CC(C)(S(=O)(=O)c2ccc(Br)cc2)C1]

3-(4-Bromophenyl)sulfonyl-1,3-dimethyl-azetidine

Step A: tert-Butyl 3-(4-bromophenyl)sulfanylazetidine-1-carboxylate tert-butyl 3-bromoazetidine-1-carboxylate (3.50 g, 14.8 mmol) was added to a solution of 4-bromobenzenethiol (2.8 g, 14.8 mmol) and potassium carbonate (6.14 g, 44.4 mmol) in DMF (80 mL) and the reaction mixture was warmed to 50° C. and allowed to stir for 16 h. The reaction mixture was cooled and ethyl acetate (80 mL) was added. The resulting mixture washed with water (3×100 mL) and a saturated aqueous solution of sodium chloride (50 mL), dried over sodium sulfate, filtered, and the filtrate was concentrated under reduced pressure to afford the title compound in sufficient purity for use in the next step. $^1$H NMR (CDCl$_3$, 500 MHz) δ 7.58-7.55 (m, 2H), 7.29-7.21 (m, 2H), 4.47 (dd, J=8.0, 9.0 Hz, 2H), 4.12 (tt, J=5.0, 7.5 Hz, 1H), 4.00 (dd, J=5.5, 9.0 Hz, 2H), 1.58 (s, 9H).

Step B: tert-Butyl 3-(4-bromophenyl)sulfonylazetidine-1-carboxylate

A solution of potassium peroxymonosulfate (20.7 g, 33.7 mmol) in water (80 mL) was slowly added to a solution of tert-butyl 3-(4-bromophenyl)sulfanylazetidine-1-carboxylate (5.8 g, 13.5 mmol) in anhydrous methanol (20 mL), and the reaction mixture was allowed to stir for 16 h. A saturated aqueous solution of sodium sulfite (100 mL) was added, and the resulting mixture was extracted with dichloromethane (3×100 mL). The combined organic layers were washed with a saturated aqueous solution of sodium chloride, dried over sodium sulfate, filtered and the filtrate was concentrated under reduced pressure to afford the title compound in sufficient purity for use in the next step. $^1$H NMR (CDCl$_3$, 400 MHz) δ 7.80-7.69 (m, 4H), 4.32-4.18 (m, 2H), 4.06 (br t, J=8.8 Hz, 2H), 4.00-3.87 (m, 1H), 1.42 (s, 9H).

Step C: tert-Butyl 3-(4-bromophenyl)sulfonyl-3-methyl-azetidine-1-carboxylate

A solution of lithium bis(trimethylsilyl)amide in tetrahydrofuran (1 M, 6.91 mL, 6.91 mmol) was added to a stirred mixture of tert-butyl 3-(4-bromophenyl)sulfonylazetidine-1-carboxylate (1.3 g, 3.5 mmol) in tetrahydrofuran (10 mL) at −78° C. under an atmosphere of dinitrogen, and the reaction mixture was allowed to stir for 30 min. Methyl iodide (0.432 mL, 6.91 mmol) was added. The reaction mixture was allowed to warm to ambient temperature, and the reaction mixture was allowed to stir for 16 h. A saturated aqueous solution of ammonium chloride (100 mL) was added, and the resulting mixture was extracted with ethyl acetate (2×100 mL). The combined organic layers were washed with a saturated aqueous solution of sodium chloride, dried over sodium sulfate, filtered and the filtrate was concentrated under reduced pressure. The residue was purified by silica gel chromatography, eluting with a gradient of petroleum ether:ethyl acetate—100:0 to 90:10 to afford the title compound. MS: m/z=289.9 [M-CO$_2$tBu+H]. $^1$H NMR (CDCl$_3$, 400 MHz) δ 7.79-7.68 (m, 4H), 4.45 (br d, J=8.4 Hz, 2H), 3.68 (br d, J=8.8 Hz, 2H), 1.59 (s, 3H), 1.42 (s, 9H).

Step D: 3-(4-Bromophenyl)sulfonyl-1,3-dimethyl-azetidine

A solution of diisobutylaluminium hydride in tetrahydrofuran (1 M, 10.25 mL, 10.25 mmol) was added slowly to a solution of tert-butyl 3-(4-bromophenyl)sulfonyl-3-methyl-azetidine-1-carboxylate (1 g, 2.6 mmol) in tetrahydrofuran (10 mL) at −78° C. under an atmosphere of dinitrogen, and the reaction mixture was warmed to 65° C. and allowed to stir for 10 h. The reaction mixture was cooled to −78° C., and a saturated aqueous solution of sodium potassium tartrate (100 mL) was added to the reaction mixture. The resulting mixture was allowed to stir for 1 h and then was extracted with ethyl acetate (2×100 mL). The combined organic layers were washed with a saturated aqueous solution of sodium chloride, dried over sodium sulfate, filtered and the filtrate was concentrated under reduced pressure. The residue was purified by silica gel chromatography, eluting with a gradient of petroleum ether:ethyl acetate—100:0 to 90:10 to afford the title compound. MS: m/z=305.8 [M+H]. $^1$H NMR (CDCl$_3$, 400 MHz) δ 7.71 (s, 4H), 3.72 (d, J=8.4 Hz, 2H), 3.21 (d, J=8.4 Hz, 2H), 2.38 (s, 3H), 1.59 (s, 3H).

Intermediate 2

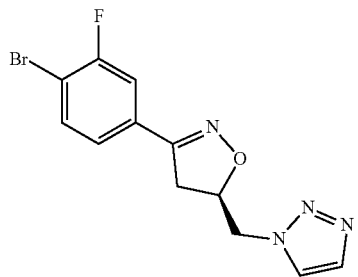 [SMILES: Fc1cc(C2=NO[C@@H](Cn3ccnn3)C2)ccc1Br]

(5R)-3-(4-Bromo-3-fluoro-phenyl)-5-(triazol-1-ylmethyl)-4,5-dihydroisoxazole

Intermediate 2 was prepared in a similar manner as (5R)-5-(azidomethyl)-3-(4-bromo-3,5-difluoro-phenyl)-4,5-dihydroisoxazole, described in Example 2. MS: m/z=324.8 [M+H].

Intermediate 3

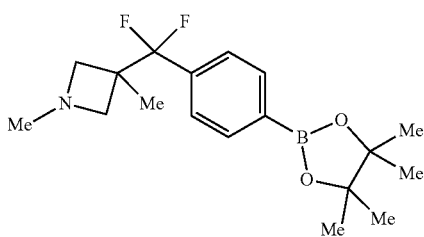 [SMILES: CN1CC(C)(C(F)(F)c2ccc(B3OC(C)(C)C(C)(C)O3)cc2)C1]

3-{Difluoro[4-(4,4,5,5-tetramethyl-1,3,2-dioxaborolan-2-yl)phenyl]methyl}-1,3-dimethylazetidine Step A: tert-Butyl 3-[methoxy(methyl)carbamoyl]azetidine-1-carboxylate 1,1'-carbonyldiimidazole (5.44 g, 33.5 mmol) was added to a mixture of 1-(tert-butoxycarbonyl)azetidine-3-carboxylic acid (5.0 g, 24.9 mmol) in tetrahydrofuran (60 mL) and the reaction mixture was allowed to stir for 1.5 h. A mixture of N,O-dimethylhydroxylamine hydrochloride (3.37 g, 34.5 mmol) in acetonitrile (90 mL) and triethylamine (5.06 mL, 36.3 mmol) was added and the reaction mixture was allowed to stir for 1 d. The reaction mixture was concentrated under reduced pressure. Water (75 mL) was added to the residue and the resulting mixture was extracted with ethyl acetate (3×70 mL). The combined organic layers were washed with an aqueous solution of citric acid (5%, 2×50 mL), water (2×40 mL) and a saturated aqueous solution of sodium chloride (2×40 mL), dried over sodium sulfate, filtered and the filtrate was concentrated under reduced pressure to afford the title compound in sufficient purity for use in the next step. $^1$H NMR (CDCl$_3$, 400 MHz) δ 4.12 (br d, J=7.2 Hz, 2H), 4.09-3.99 (m, 2H), 3.66 (s, 3H), 3.64-3.57 (m, 1H), 3.21 (s, 3H), 1.44 (s, 9H).

Step B: tert-Butyl 3-(4-bromobenzoyl)azetidine-1-carboxylate

N-butyllithium (14.7 mL, 36.8 mmol) was added to a solution of 1,4-dibromobenzene (8.69 g, 36.8 mmol) in tetrahydrofuran (36 mL) at −78° C. and the reaction mixture was warmed to −25° C. and allowed to stir for 30 min. The reaction mixture was cooled to −78° C. and a solution of tert-butyl 3-[methoxy(methyl)carbamoyl]azetidine-1-carboxylate (6 g, 24.56 mmol) in tetrahydrofuran (36 mL) was added and the reaction mixture was warmed to −25° C. and allowed to stir for 3 h. A saturated aqueous solution of ammonium chloride (70 mL) was added and the resulting mixture was extracted with ethyl acetate (3×70 mL). The combined organic layers were washed with a saturated aqueous solution of sodium chloride (2×40 mL), dried over sodium sulfate, filtered and the filtrate was concentrated under reduced pressure. The residue was purified by silica gel chromatography, eluting with petroleum ether:ethyl acetate—94:6 to afford the title compound. $^1$H NMR (CDCl$_3$, 400 MHz) δ 7.73-7.68 (m, 2H), 7.67-7.61 (m, 2H), 4.27-4.16 (m, 4H), 4.12 (t, J=7.2 Hz, 1H), 1.44 (s, 9H).

Step C: tert-Butyl 3-(4-bromobenzoyl)-3-methylazetidine-1-carboxylate

A solution of lithium bis(trimethylsilyl)amide in tetrahydrofuran (1.0 M, 4.41 mL, 4.41 mmol) was added to a solution of tert-butyl 3-(4-bromobenzoyl)azetidine-1-carboxylate (1.0 g, 2.9 mmol) in tetrahydrofuran (5 mL) at −78° C. under an atmosphere of dinitrogen. The reaction mixture was allowed to stir for 1 h. Iodomethane (0.368 mL, 5.88 mmol) was added and the reaction mixture was allowed to warm to ambient temperature and stir for 2 h. A saturated aqueous solution of ammonium chloride (20 mL) was added and the resulting mixture was extracted with ethyl acetate (3×20 mL). The combined organic layers were washed with a saturated aqueous solution of sodium chloride (2×20 mL), dried over sodium sulfate, filtered and the filtrate was concentrated under reduced pressure to afford the title compound in sufficient purity for use in the next step. $^1$H NMR (CDCl$_3$, 400 MHz) δ 1.44 (s, 9H), 1.73 (s, 3H), 3.87 (br d, J=8.8 Hz, 2H), 4.41 (d, J=8.8 Hz, 2H), 7.58-7.66 (m, 4H).

Step D: tert-Butyl 3-[(4-bromophenyl)(difluoro)methyl]-3-methylazetidine-1-carboxylate Bis(2-methoxyethyl)aminosulfur trifluoride (2.65 mL, 14.4 mmol) was added to a solution of tert-butyl 3-(4- bromobenzoyl)-3-methylazetidine-1-carboxylate (510 mg, 1.44 mmol) in dichloromethane (8 mL). The reaction mixture was allowed to stir for 3 d. The reaction mixture was poured into a cold, saturated aqueous solution of sodium bicarbonate (20 mL) and the resulting mixture was extracted with dichloromethane (3×20 mL). The combined organic layers were washed with a saturated aqueous solution of ammonium chloride (20 mL), dried over sodium sulfate, filtered and the filtrate was concentrated under reduced pressure. The residue was purified by silica gel chromatography, eluting with petroleum ether:ethyl acetate—93:7 to afford the title compound. $^1$H NMR (CDCl$_3$, 500 MHz) δ 1.29 (s, 3H), 1.46 (s, 9H), 3.52 (br d, J=8.5 Hz, 2H), 4.26 (d, J=8.5 Hz, 2H), 7.30 (d, J=8.5 Hz, 2H), 7.58 (d, J=8.5 Hz, 2H).

Step E: 3-[(4-Bromophenyl)(difluoro)methyl]-1,3-dimethylazetidine

A solution of diisobutylaluminum hydride in tetrahydrofuran (1 M, 3.40 mL, 3.4 mmol) was added to a mixture of tert-butyl 3-[(4-bromophenyl)(difluoro)methyl]-3-methylazetidine-1-carboxylate (320 mg, 0.851 mmol) in tetrahydrofuran (2 mL) at −78° C. The reaction mixture was warmed to 65° C. and allowed to stir for 16 h. The reaction mixture was cooled to 0° C. and a saturated aqueous solution of sodium potassium tartrate (20 mL) was added and the resulting mixture was allowed to stir for 1 h. The mixture was extracted with ethyl acetate (3×20 mL) and the combined organic layers were washed with a saturated aqueous solution of sodium chloride (1×20 mL), dried over sodium sulfate, filtrated and the filtrate was concentrated under reduced pressure to afford the title compound in sufficient purity for use in the next step. MS: m/z=292.0 [M+H]. $^1$H NMR (CDCl$_3$, 500 MHz) δ 1.19 (s, 3H), 2.22-2.30 (m, 3H), 2.99 (br d, J=7.6 Hz, 2H), 3.31 (d, J=7.6 Hz, 2H), 7.13-7.16 (m, 2H), 7.43 (d, J=8.4 Hz, 2H).

Step F: 3-{Difluoro[4-(4,4,5,5-tetramethyl-1,3,2-dioxaborolan-2-yl)phenyl]methyl}-1,3-dimethylazetidine

[1,1'-bis(diphenylphosphino)ferrocene]dichloropalladium(II) (50.4 mg, 0.069 mmol) was added to a solution of 3-[(4-bromophenyl)(difluoro)methyl]-1,3-dimethylazetidine (200 mg, 0.689 mmol), bis(pinacolato)diboron (210 mg, 0.827 mmol) and potassium acetate (135 mg, 1.379 mmol) in deoxygenated 1,4-dioxane (2 mL) under an atmosphere of dinitrogen. The reaction mixture was warmed to 100° C. and allowed to stir for 2 h. The reaction mixture was cooled, filtered and the filtrate was concentrated under reduced pressure to afford the title compound in sufficient purity for use in the next step. MS: m/z=338.1 [M+H]. $^1$H NMR (CDCl$_3$, 400 MHz) δ 1.29 (s, 3H), 1.36 (s, 12H), 2.41 (s, 3H), 3.20 (br d, J=8.4 Hz, 2H), 3.50 (d, J=8.4 Hz, 2H), 7.37 (d, J=8.4 Hz, 2H), 7.84 (d, J=8.4 Hz, 2H).

Intermediate 4

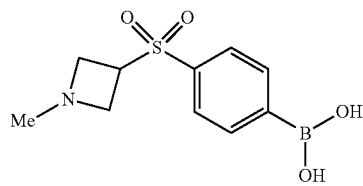 [SMILES: CN1CC(S(=O)(=O)c2ccc(B(O)O)cc2)C1]

[4-(1-Methylazetidine-3-sulfonyl)phenyl]boronic acid

Step A: 3-(4-Bromobenzene-1-sulfonyl)azetidine

Trifluoroacetic acid (3.0 mL, 38.9 mmol) was added to a solution of tert-butyl 3-(4-bromophenyl)sulfonylazetidine-1-carboxylate (described in Intermediate 1) (2.0 g, 5.32 mmol) in dichloromethane (20 mL) The reaction mixture was allowed to stir for 16 h. A saturated aqueous solution of sodium bicarbonate was added slowly to adjust pH to ~8 and the resulting mixture was extracted with dichloromethane (3×50 mL). The combined organic layers were dried over sodium sulfate, filtered and the filtrate was concentrated under reduced pressure to afford the title compound in sufficient purity for use in the next step. $^1$H NMR (CDCl$_3$, 400 MHz) δ 7.76-7.68 (m, 4H), 4.19-4.06 (m, 3H), 3.81-3.69 (m, 2H).

Step B: 3-(4-Bromobenzene-1-sulfonyl)-1-methylazetidine

Paraformaldehyde (2.12 g, 23.5 mmol), acetic acid (0.539 mL, 9.42 mmol) and magnesium sulfate (150 mg) were added to solution of 3-(4-bromobenzene-1-sulfonyl)azetidine (1.3 g, 4.71 mmol) in dichloroethane (20 mL). The reaction mixture was allowed to stir for 2 h. Sodium triacetoxyborohydride (2.99 g, 14.1 mmol) was added and the reaction mixture was warmed to 50° C. and allowed to stir for 16 h. A saturated aqueous solution of sodium bicarbonate (30 mL) was added slowly to adjust pH to ~7 and the resulting mixture was extracted with dichloromethane (3×50 mL). The combined organic layers were dried over sodium sulfate, filtered and the filtrate was concentrated under reduced pressure. The residue was purified by silica gel chromatography, eluting with a gradient of petroleum ether:ethyl acetate—100:0 to 75:25 to afford the title compound. MS: m/z=291.9 [M+H]. $^1$H NMR (CDCl$_3$, 400 MHz) δ 76-7.67 (m, 4H), 4.01-3.87 (m, 1H), 3.56-3.46 (m, 4H), 2.35 (s, 3H).

Step C: [4-(1-Methylazetidine-3-sulfonyl)phenyl]boronic acid

[1,1'-bis(diphenylphosphino)ferrocene]dichloropalladium(II) (76 mg, 0.10 mmol) was added to a mixture of 3-(4-bromobenzene-1-sulfonyl)-1-methylazetidine (300 mg, 1.03 mmol), bis(pinacolato)diboron (263 mg, 1.03 mmol) and potassium acetate (203 mg, 2.07 mmol) in 1,4-dioxane (10 mL). The reaction mixture was deoxygenated with dinitrogen. The reaction mixture was warmed to 100° C. and allowed to stir for 2 h. The reaction mixture was cooled, filtered, washed with dichloromethane (30 mL), and the filtrate was concentrated under reduced pressure. The residue was purified by silica gel chromatography, eluting with a gradient of dichloromethane:methanol—100:0 to 50:50 to afford the title compound. MS: m/z=255.9 [M+H]. $^1$H NMR (CD$_3$OD, 400 MHz) δ 7.87-7.71 (m, 2H), 7.65-7.59 (m, 2H), 4.15-4.06 (m, 1H), 3.55-3.45 (m, 4H), 2.30 (s, 3H).

Intermediate 5

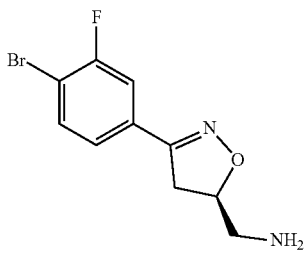 [SMILES: NC[C@H]1CC(c2ccc(Br)c(F)c2)=NO1]

1-[(5R)-3-(4-Bromo-3-fluorophenyl)-4,5-dihydro-1,2-oxazol-5-yl]methanamine

Intermediate 5 was prepared in a similar manner as 1-[(5R)-3-(4-bromo-3,5-difluorophenyl)-4,5-dihydro-1,2-oxazol-5-yl]methanamine, described in Example 4. MS: m/z=272.8 [M+H].

Intermediate 6

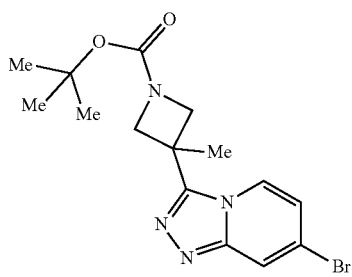 [SMILES: CC(C)(C)OC(=O)N1CC(C)(c2nnc3cc(Br)ccn23)C1]

tert-Butyl 3-(7-bromo[1,2,4]triazolo[4,3-a]pyridin-3-yl)-3-methylazetidine-1-carboxylate

Step A: tert-Butyl 3-[2-(4-bromopyridin-2-yl)hydrazinecarbonyl]-3-methylazetidine-1-carboxylate Triethylamine (3.41 mL, 24.5 mmol) and ethyl chloroformate (1.53 mL, 15.9 mmol) were added to a solution of 1-(tert-butoxycarbonyl)-3-methylazetidine-3-carboxylic acid (2.63 g, 12.2 mmol) in tetrahydrofuran (50 mL) at 0° C. The reaction mixture was allowed to stir for 30 min. 4-Bromo-2-hydrazinylpyridine (2.3 g, 12.23 mmol) was added and the reaction mixture was warmed to 10° C. and allowed to stir for 16 h. The reaction mixture was filtered and the filtrate was concentrated under reduced pressure. The residue was purified by silica gel chromatography, eluting with a gradient of petroleum ether:ethyl acetate—100:0 to 80:20 to afford the title compound. MS: m/z=386.9 [M+H]. $^1$H NMR (CDCl$_3$, 500 MHz) δ 8.47 (br s, 1H), 7.94 (d, J=5.5 Hz, 1H), 7.21 (br s, 1H), 6.95-6.91 (m, 1H), 6.79 (s, 1H), 4.26 (d, J=8.5 Hz, 2H), 3.71 (d, J=8.5 Hz, 2H), 1.61 (s, 3H), 1.43 (s, 9H).

Step B: tert-Butyl 3-(7-bromo[1,2,4]triazolo[4,3-a]pyridin-3-yl)-3-methylazetidine-1-carboxylate Hexachloroethane (4.09 g, 17.29 mmol) was added to a solution of tert-butyl 3-[2-(4-bromopyridin-2-yl)hydrazinecarbonyl]-3-methylazetidine-1-carboxylate (3.7 g, 8.64 mmol), triphenylphosphine (4.53 g, 17.3 mmol) and triethylamine (4.82 mL, 34.6 mmol) in tetrahydrofuran (50 mL) at 0° C. The reaction mixture was warmed to 10° C. and allowed to stir for 2 h. The reaction mixture was filtered and the filtrate was concentrated under reduced pressure. The residue was purified by silica gel chromatography, eluting with a gradient of petroleum ether:ethyl acetate—100:0 to 100:0 to afford the title compound. MS: m/z=368.6 [M+H]. $^1$H NMR (CDCl$_3$, 400 MHz) δ 8.40 (d, J=7.2 Hz, 1H), 8.32 (s, 1H), 7.32 (br d, J=7.2 Hz, 1H), 4.43 (br d, J=8.8 Hz, 2H), 4.09 (br s, 2H), 1.68 (s, 3H), 1.36 (s, 9H).

Example 1

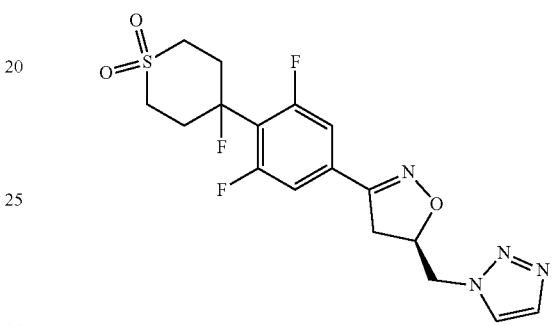

4-[2,6-Difluoro-4-[(5R)-5-(triazol-1-ylmethyl)-4,5-dihydroisoxazol-3-yl]phenyl]-4-fluoro-thiane 1,1-dioxide

Step A: 4-Bromo-3,5-difluoro-benzaldehyde oxime

A 1 L 3-necked, round-bottom flask was purged and maintained with an inert atmosphere of nitrogen at ambient temperature and was charged with ethanol (250 mL), water (250 mL), and 4-bromo-3,5-difluorobenzaldehyde (52 g, 235 mmol). Hydroxylamine hydrochloride (24.5 g, 353 mmol) was added portion wise, and the reaction mixture was allowed to stir for 12 h. The reaction mixture was diluted with water (1 L) and allowed to stir for 30 min. The solids were collected by filtration and dried under reduced pressure to afford the title compound.

Step B: 4-Bromo-3,5-difluoro-N-hydroxy-benzimidoyl chloride

A 2 L, 3-necked round-bottom flask was purged and maintained with an inert atmosphere of nitrogen at 0° C. DMF (750 mL), 4-bromo-3,5-difluoro-benzaldehyde oxime (48 g, 203 mmol), and N-chlorosuccinimide (40.7 g, 305 mmol) were sequentially added to the flask. The reaction mixture was allowed to warm to ambient temperature, and then the reaction mixture was stirred for 4 h. The reaction mixture was diluted with water (1.5 L), and the resulting mixture was extracted with ethyl acetate (2×1 L). The resulting mixture was washed with water (2×1 L) and a saturated solution of aqueous sodium chloride (3×1 L), dried over sodium sulfate, filtered and the filtrate was concentrated under reduced pressure to afford the title compound.

Step C: [(5R)-3-(4-Bromo-3,5-difluoro-phenyl)-4,5-dihydroisoxazol-5-yl]methanol A 2 L, 3-necked round-bottom flask was purged and maintained with an inert atmosphere of nitrogen at 0° C. Chloroform (750 mL), prop-2-en-1-ol (10.4 g, 179 mmol), and a solution of diethylzinc (214 mL, 214 mmol) in chloroform (750 mL) was sequentially added to the flask, and the reaction mixture was allowed to stir for 10 min. (+)-Diisopropyl L-tartrate (8.3 g, 35 mmol) was added, and the reaction mixture was allowed to stir for 1 h. 4-Bromo-3,5-difluoro-N-hydroxy-benzimidoyl chloride (48 g, 177 mmol) was added to the reaction mixture, and the reaction mixture was allowed to stir for 3 h. A saturated aqueous solution of ammonium chloride (200 mL) was added, and the resulting mixture was diluted with water (500 mL). The resulting mixture was extracted with ethyl acetate (2×500 mL), and the organic layers were combined. The combined organic layers were washed with a saturated aqueous solution of sodium chloride (1×1 L), dried over sodium sulfate, filtered and the filtrate was concentrated under reduced pressure. The residue was purified by silica gel chromatography, eluting with a gradient of petroleum ether:ethyl acetate—95:5 to 83:17 to afford the title compound. MS: m/z=291.9 [M+H]. $^1$H NMR (DMSO-d$_6$, 400 MHz) δ 7.58-7.49 (m, 2H), 5.05 (t, J=5.6 Hz, 1H), 4.80 (ddt, J=12.0, 8.4, 4.4 Hz, 1H), 3.56 (ddd, J=10.9, 4.9, 3.5 Hz, 1H), 3.56-3.42 (m, 1H), 3.44-3.33 (m, 1H), 3.21 (dd, J=17.2, 7.9 Hz, 1H).

Step D: [(5R)-3-(4-Bromo-3,5-difluoro-phenyl)-4,5-dihydroisoxazol-5-yl]methyl methanesulfonate Methanesulfonyl chloride (1.73 mL, 22.3 mmol) was added to a solution of [(5R)-3-(4-bromo-3,5-difluoro-phenyl)-4,5-dihydroisoxazol-5-yl]methanol (5 g, 17 mmol) and N,N-diisopropylethylamine (7.47 mL, 42.8 mmol) in dichloromethane (100 mL) at 0° C. The reaction mixture was allowed to warm to ambient temperature and was stirred for 2 h. Water (50 mL) was added and the resulting mixture was extracted with dichloromethane (3×50 mL). The combined organic layers were washed with a saturated aqueous solution of sodium chloride (200 mL), dried over sodium sulfate, filtered, and the filtrate was concentrated under reduced pressure to afford the title compound in sufficient purity for use in the next step. MS: m/z=371.8 [M+H]. $^1$H NMR (DMSO-d$_6$, 400 MHz) δ 7.55 (d, J=7.6 Hz, 2H), 5.16-5.00 (m, 1H), 4.43-4.26 (m, 2H), 3.56 (dd, J=11.2, 17.5 Hz, 1H), 3.30-3.17 (m, 4H).

Step E: (5R)-5-(Azidomethyl)-3-(4-bromo-3,5-difluoro-phenyl)-4,5-dihydroisoxazole Sodium azide (1.63 g, 25.1 mmol) was added to a solution of [(5R)-3-(4-bromo-3,5-difluoro-phenyl)-4,5-dihydroisoxazol-5-yl]methyl methanesulfonate (6.2 g, 16.8 mmol) in DMF (100 mL) at ambient temperature, and the reaction mixture was warmed to 70° C. and allowed to stir for 15 h. The reaction mixture was poured into a saturated aqueous solution of sodium bicarbonate (100 mL), and the resulting mixture was extracted with ethyl acetate (3×100 mL). The combined organic layers were washed with a saturated aqueous solution of sodium bicarbonate (2×50 mL) and a saturated aqueous solution of sodium chloride (2×100 mL), dried over sodium sulfate, filtered, and the filtrate was concentrated under reduced pressure to afford the title compound in sufficient purity for use in the next step. MS: m/z=317.0 [M+H].

Step F: (5R)-3-(4-Bromo-3,5-difluoro-phenyl)-5-(triazol-1-ylmethyl)-4,5-dihydroisoxazole Bicyclo[2.2.1]hepta-2,5-diene (8.5 mL, 84 mmol) was added to a solution of (5R)-5-(azidomethyl)-3-(4-bromo-3,5-difluoro-phenyl)-4,5-dihydroisoxazole (5.3 g, 16.7 mmol) in anhydrous 1,4-dioxane (100 mL) at ambient temperature, and the reaction mixture was warmed to 100° C. and allowed to stir for 12 h. The reaction mixture was cooled and concentrated under reduced pressure. The residue was purified by silica gel chromatography, eluting with a gradient of petroleum ether:ethyl acetate—100:0 to 40:60 to afford the title compound. MS: m/z=344.9 [M+H]. $^1$H NMR (DMSO-d$_6$, 500 MHz) δ 8.20-8.12 (m, 1H), 7.75 (d, J=0.8 Hz, 1H), 7.58-7.50 (m, 2H), 5.31-5.17 (m, 1H), 4.74-4.60 (m, 2H), 3.61 (dd, J=10.9, 17.5 Hz, 1H), 3.34-3.27 (m, 1H).

Step G: 4-[2,6-Difluoro-4-[(5R)-5-(triazol-1-ylmethyl)-4,5-dihydroisoxazol-3-yl]phenyl]-1,1-dioxo-thian-4-ol A solution of isopropylmagnesium lithium chloride in tetrahydrofuran (1.3 M, 53.8 mL, 69.9 mmol) was added dropwise to a solution of (5R)-3-(4-bromo-3,5-difluoro-phenyl)-5-(triazol-1-ylmethyl)-4,5-dihydroisoxazole (16 g, 46.6 mmol) and 1,1-dioxothian-4-one (7.60 g, 51.3 mmol) in tetrahydrofuran (300 mL) at −78° C. under an atmosphere of dinitrogen. The reaction mixture was warmed to ambient temperature and allowed to stir for 2 h. A saturated aqueous solution of ammonium chloride (300 mL) was added, and the resulting mixture was extracted with ethyl acetate (3×100 mL). The combined organic layers were washed with a saturated aqueous solution of sodium chloride, dried over sodium sulfate, filtered and the filtrate was concentrated under reduced pressure. The residue was purified by silica gel chromatography, eluting with a gradient of petroleum ether:ethyl acetate—100:0 to 0:100 to afford the title compound. MS: m/z=395.1 [M−H$_2$O+H]. $^1$H NMR (DMSO-d$_6$, 400 MHz) δ 8.13 (d, J=0.8 Hz, 1H), 7.73 (d, J=1.2 Hz, 1H), 7.34-7.26 (m, 2H), 6.00 (s, 1H), 5.25-5.17 (m, 1H), 4.70-4.60 (m, 2H), 3.57 (dd, J=11.0, 17.6 Hz, 1H), 3.43-3.35 (m, 2H), 3.30-3.24 (m, 1H), 3.04 (br d, J=11.7 Hz, 2H), 2.61 (br t, J=13.3 Hz, 2H), 2.34 (br d, J=12.9 Hz, 2H).

Step H: 4-[2,6-Difluoro-4-[(5R)-5-(triazol-1-ylmethyl)-4,5-dihydroisoxazol-3-yl]phenyl]-4-fluoro-thiane 1,1-dioxide Bis(2-methoxyethyl)aminosulfur trifluoride (3.86 mL, 21.0 mmol) was added to a solution of 4-[2,6-difluoro-4-[(5R)-5-(triazol-1-ylmethyl)-4,5-dihydroisoxazol-3-yl]phenyl]-1,1-dioxo-thian-4-ol (6.4 g, 14 mmol) in dichloromethane (850 mL) at 0° C., and the reaction mixture was allowed to stir for 2 h. A saturated aqueous solution of sodium bicarbonate (100 mL) was added, and the resulting mixture was concentrated under reduced pressure to remove dichloromethane. The resulting mixture was filtered, and the precipitate collected. The precipitate was purified by preparative HPLC, eluting with a gradient of acetonitrile:water containing 10 mM ammonium carbonate—20:80 to 50:50 to afford the title compound. MS: m/z=415.0 [M+H]. $^1$H NMR (DMSO-d$_6$, 500 MHz) δ 8.14 (s, 1H), 7.74 (s, 1H), 7.41 (d, J=13.0 Hz, 2H), 5.25-5.21 (m, 1H), 4.69-4.65 (m, 2H), 3.59-3.55 (m, 1H), 3.44-3.40 (m, 2H), 3.27-3.19 (m, 3H), 2.81-2.66 (m, 4H).

Example 2

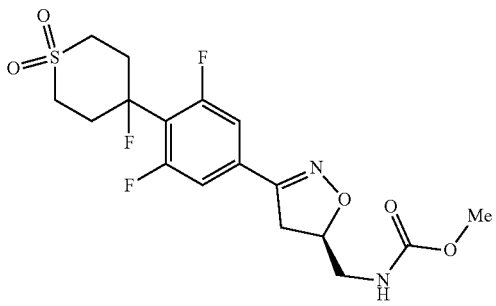 [SMILES: COC(=O)NC[C@H]1CC(c2cc(F)c(C3(F)CCS(=O)(=O)CC3)c(F)c2)=NO1]

Methyl N-[[(5R)-3-[3,5-difluoro-4-(4-fluoro-1,1-dioxo-thian-4-yl)phenyl]-4,5-dihydroisoxazol-5-yl]methyl]carbamate Step A: 4-[4-[(5R)-5-(Azidomethyl)-4,5-dihydroisoxazol-3-yl]-2,6-difluoro-phenyl]-1,1-dioxo-thian-4-ol To a mixture of (5R)-5-(azidomethyl)-3-(4-bromo-3,5-difluoro-phenyl)-4,5-dihydroisoxazole (described in Example 1) (1160 mg, 3.66 mmol) and 1,1-dioxothian-4-one (542 mg, 3.66 mmol) in tetrahydrofuran (20 mL) under an atmosphere of dinitrogen at −78° C. was added a solution of isopropylmagnesium lithium chloride in tetrahydrofuran (1.3 M, 4.22 mL, 5.49 mmol) and the reaction mixture was allowed to stir for 1 h. The reaction mixture was warmed to ambient temperature and allowed to stir for 16 h. Water (30 mL) was added, and the resulting mixture was extracted with ethyl acetate (2×30 mL). The combined organic layers were washed with a saturated aqueous solution of sodium chloride, dried over sodium sulfate, filtered and the filtrate was concentrated under reduced pressure. The residue was purified by silica gel chromatography, eluting with ethyl acetate to afford the title compound. $^1$H NMR (DMSO-$d_6$, 400 MHz) δ 7.37-7.33 (m, 2H), 6.04 (s, 1H), 5.00-4.94 (m, 1H), 3.58-3.57 (m, 1H), 3.49-3.48 (m, 2H), 3.46-3.40 (m, 2H), 3.22-3.18 (m, 1H), 3.06-3.03 (m, 2H) 2.62-2.58 (m, 2H), 2.36-2.33 (m, 2H).

Step B: 4-[4-[(5R)-5-(Azidomethyl)-4,5-dihydroisoxazol-3-yl]-2,6-difluoro-phenyl]-4-fluoro-thiane 1,1-dioxide Bis(2-methoxyethyl)aminosulfur trifluoride (0.072 mL, 0.388 mmol) was added to a solution of 4-[4-[(5R)-5-(azidomethyl)-4,5-dihydroisoxazol-3-yl]-2,6-difluoro-phenyl]-1,1-dioxo-thian-4-ol (100 mg, 0.259 mmol) in dichloromethane (4 mL) at 0° C. The reaction was warmed to ambient temperature and allowed to stir for 3 h. A saturated aqueous solution of sodium bicarbonate (30 mL) was added and the resulting mixture was extracted with dichloromethane (3×30 mL). The combined organic layers were was washed with a saturated aqueous solution of sodium chloride, dried over sodium sulfate, filtered and the filtrate was concentrated under reduced pressure to afford the title compound in sufficient purity for use in the next step. $^1$H NMR (DMSO-$d_6$, 400 MHz) δ 7.48-7.45 (m, 2H), 5.02-4.96 (m, 1H), 3.50-3.48 (m, 1H), 3.47-3.45 (m, 2H), 3.38-3.35 (m, 2H), 3.22-3.20 (m, 3H), 2.68-2.65 (m, 4H).

Step C: [(5R)-3-[3,5-Difluoro-4-(4-fluoro-1,1-dioxo-thian-4-yl)phenyl]-4,5-dihydroisoxazol-5-yl]methanamine Triphenylphosphine (105 mg, 0.402 mmol) was added to a solution of 4-[4-[(5R)-5-(azidomethyl)-4,5-dihydroisoxazol-3-yl]-2,6-difluoro-phenyl]-4-fluoro-thiane 1,1-dioxide (130 mg, 0.335 mmol) in tetrahydrofuran (4 mL). The reaction mixture was warmed to 70° C. and allowed to stir for 3 h. The reaction mixture was cooled and concentrated under reduced pressure. The residue was washed with a mixture of ethyl acetate:petroleum ether (1:1, 2×5 mL) to afford the title compound in sufficient purity for use in the next step. $^1$H NMR (DMSO-$d_6$, 400 MHz) δ 7.48-7.40 (m, 2H), 4.74-4.73 (m, 1H), 3.47-3.37 (m, 4H), 3.26-3.20 (m, 4H), 2.82-2.65 (m, 4H).

Step D: Methyl N-[[(5R)-3-[3,5-difluoro-4-(4-fluoro-1,1-dioxo-thian-4-yl)phenyl]-4,5-dihydroisoxazol-5-yl]methyl]carbamate N-ethyl-N-isopropylpropan-2-amine (0.159 mL, 0.911 mmol) was added to a solution of [(5R)-3-[3,5-difluoro-4-(4-fluoro-1,1-dioxo-thian-4-yl)phenyl]-4,5-dihydroisoxazol-5-yl]methanamine (110 mg, 0.304 mmol) in dichloromethane (4 mL) at 0° C., and the reaction mixture was allowed to stir 10 min. Methyl chloroformate (0.026 mL, 0.334 mmol) was added, and the reaction mixture was allowed to warm to ambient temperature and stir for 2 h. A saturated aqueous solution of sodium bicarbonate (3 mL) was added, and the resulting mixture was concentrated under reduced pressure. The residue was purified by preparative HPLC, eluting with a gradient of acetonitrile:water containing 10 mM ammonium carbonate—25:75 to 55:45 to afford the title compound. MS: m/z=421.1 [M+H]. $^1$H NMR (DMSO-$d_6$, 400 MHz) δ 7.44-7.41 (m, 2H), 4.81-4.79 (m, 1H), 3.53 (s, 3H), 3.46-3.42 (m, 3H), 3.20-3.15 (m, 5H), 2.82-2.78 (m, 2H), 2.72-2.66 (m, 2H).

Example 3

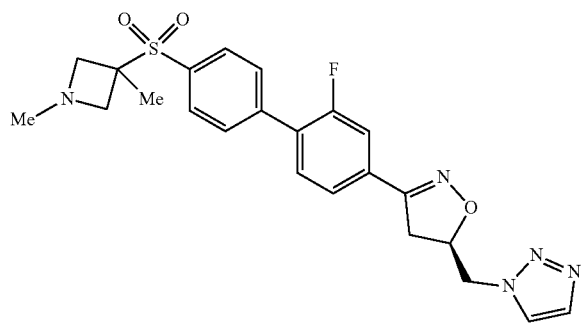

(5R)-3-[4-[4-(1,3-Dimethylazetidin-3-yl)sulfonylphenyl]-3-fluoro-phenyl]-5-(triazol-1-ylmethyl)-4,5-dihydroisoxazole Step A: [2-Fluoro-4-[(5R)-5-(triazol-1-ylmethyl)-4,5-dihydroisoxazol-3-yl]phenyl]boronic acid Potassium acetate (26.3 g, 268 mmol, 3.0 equiv), bis(pinacolato)diboron (45.3 g, 178 mmol), and 1,1'-bis(diphenylphosphino)ferrocene palladium dichloride (6.52 g, 8.92 mmol) were added to a solution of (5R)-3-(4-bromo-3-fluoro-phenyl)-5-(triazol-1-ylmethyl)-4,5-dihydroisoxazole (Intermediate 2) (29 g, 89 mmol) in 1,4-dioxane (580 mL), and the reaction mixture was warmed to 80° C. and allowed to stir for 5 h. The reaction mixture was concentrated under reduced pressure. Water (500 mL) and dichloromethane (500 mL) were added to the reaction mixture. The pH of the resulting mixture was adjusted to a pH of 9-10 with an aqueous solution of sodium hydroxide (4 M), and the mixture was allowed to stir for 3 h. The layers were separated, the aqueous layer adjusted to a pH of 3-4 by addition of an aqueous solution of hydrochloric acid (6 M), and the mixture was filtered. The precipitate was collected and dried under reduced pressure to afford the title compound in a sufficient purity for use in the next step.

Step B: (5R)-3-[3-Fluoro-4-(4,4,5,5-tetramethyl-1,3,2-dioxaborolan-2-yl)phenyl]-5-(triazol-1-ylmethyl)-4,5-dihydroisoxazole 4 Å molecular sieves (19.0 g) and 2,3-dimethylbutane-2,3-diol (9.3 g, 79 mmol) was added to a solution of [2-fluoro-4-[(5R)-5-(triazol-1-ylmethyl)-4,5-dihydroisoxazol-3-yl]phenyl]boronic acid (19 g, 65.5 mmol) in toluene (380 mL), and the reaction mixture was warmed to 105° C. and allowed to stir for 5 h. The reaction mixture was cooled and filtered, and the filtrate was concentrated under reduced pressure to afford the title compound in sufficient purity for use in the next step. MS: m/z=373 [M+H]. $^1$H NMR (CDCl$_3$, 300 MHz) δ 7.81-7.67 (m, 3H), 7.33-7.24 (m, J=7.8 Hz, 2H), 5.17 (s, 1H), 4.69 (t, J=4.8 Hz, 2H), 3.48 (dd, J=17.1, 10.7 Hz, 1H), 3.20 (dd, J=17.1, 7.2 Hz, 1H), 1.36 (s, 12H), 1.25 (d, J=7.5 Hz, 1H).

Step C: (5R)-3-[4-[4-(1,3-Dimethylazetidin-3-yl)sulfonylphenyl]-3-fluoro-phenyl]-5-(triazol-1-ylmethyl)-4,5-dihydroisoxazole Chloro(2-dicyclohexylphosphino-2',4',6'-triisopropyl-1,1'-biphenyl)[2-(2'-amino-1,1'-biphenyl)]palladium(II) (0.297 g, 0.378 mmol) was added to a stirred mixture of 3-(4-bromophenyl)sulfonyl-1,3-dimethyl-azetidine (Intermediate 1, 2.3 g, 7.56 mmol), (5R)-3-[3-fluoro-4-(4,4,5,5-tetramethyl-1,3,2-dioxaborolan-2-yl)phenyl]-5-(triazol-1-ylmethyl)-4,5-dihydroisoxazole (3.38 g, 9.07 mmol), and an aqueous solution of tribasic potassium phosphate (2 M, 7.56 mL, 15.1 mmol) in tetrahydrofuran (40 mL). The reaction mixture was warmed to 70° C. and allowed to stir for 2 h. The reaction mixture was cooled, filtered, and the filtrate was concentrated under reduced pressure. The residue was purified by silica gel chromatography, eluting with a gradient of dichloromethane:methanol—100:0 to 90:10. The product fractions were combined and concentrated under reduced pressure. The residue was purified by preparative HPLC, eluting with a gradient of acetonitrile:water containing 10 mM ammonium carbonate—20:80 to 50:50 to afford the title compound. MS: m/z=470.1 [M+H]. $^1$H NMR (DMSO-d$_6$, 400 MHz) δ 8.17 (d, J=0.8 Hz, 1H), 8.02-7.95 (m, 2H), 7.90 (d, J=7.2 Hz, 2H), 7.78-7.71 (m, 2H), 7.62 (d, J=9.6 Hz, 2H), 5.28-5.20 (m, 1H), 4.74-4.65 (m, 2H), 3.71-3.58 (m, 3H), 3.39-3.37 (m, 1H), 3.19 (d, J=8.4 Hz, 2H), 2.26 (s, 3H), 1.53 (s, 3H).

Example 4

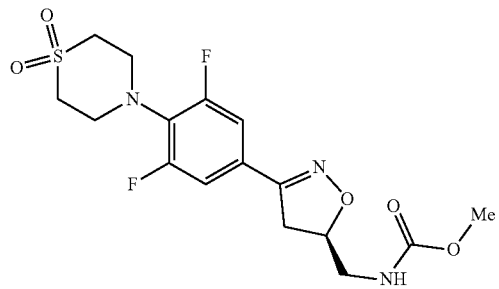 [SMILES: COC(=O)NC[C@H]1CC(c2cc(F)c(N3CCS(=O)(=O)CC3)c(F)c2)=NO1]

Methyl N-[[(5R)-3-[4-(1,1-dioxo-1,4-thiazinan-4-yl)-3,5-difluoro-phenyl]-4,5-dihydroisoxazol-5-yl]methyl]carbamate Step A: 1-[(5R)-3-(4-Bromo-3,5-difluorophenyl)-4,5-dihydro-1,2-oxazol-5-yl]methanamine Triphenylphosphine (1.01 g, 3.85 mmol) was added to a solution of (5R)-5-(azidomethyl)-3-(4-bromo-3,5-difluorophenyl)-4,5-dihydro-1,2-oxazole (described in Example 1) (940 mg, 2.96 mmol) in tetrahydrofuran (10 mL) and water (1 mL). The reaction mixture was warmed to 70° C. and allowed to stir for 4 h. The reaction mixture was cooled and concentrated under reduced pressure. The residue was purified by silica gel chromatography, eluting with a gradient of petroleum ether:ethyl acetate—100:0 to 0:100 followed by dichloromethane:methanol—90:10 to afford the title compound. MS: m/z=292.9 [M+H]. $^1$H NMR (CDCl$_3$, 500 MHz) δ 7.59-7.50 (m, 1H), 7.26 (t, J=3.5 Hz, 3H), 4.90-4.81 (m, 1H), 3.31 (dd, J=11.0, 16.5 Hz, 1H), 3.13 (dd, J=8.0, 16.5 Hz, 1H), 3.04 (dd, J=4.0, 13.5 Hz, 1H), 2.89 (dd, J=6.0, 13.5 Hz, 1H).

Step B: Methyl {[(5R)-3-(4-bromo-3,5-difluorophenyl)-4,5-dihydro-1,2-oxazol-5-yl]methyl}carbamate N-ethyl-N-isopropylpropan-2-amine (0.893 mL, 5.15 mmol) and methyl chloroformate (0.160 mL, 2.06 mmol) were added to a mixture of 1-[(5R)-3-(4-bromo-3,5-difluorophenyl)-4,5-dihydro-1,2-oxazol-5-yl]methanamine (500 mg, 1.72 mmol) in dichloromethane (15 mL) at 0° C., and the reaction mixture was allowed to warm to ambient temperature and stir for 2 h. A saturated aqueous solution of sodium bicarbonate (10 mL) was added and the resulting mixture was extracted with dichloromethane (2×10 mL). The combined organic layers were washed with a saturated aqueous solution of sodium chloride (20 mL), dried over sodium sulfate, filtered and the filtrate was concentrated under reduced pressure to afford the title compound in sufficient purity for use in the next step. MS: m/z=350.9 [M+H]. $^1$H NMR (CDCl$_3$, 400 MHz) δ 7.24 (s, 2H), 4.93 (br s, 1H), 3.67 (s, 3H), 3.58-3.41 (m, 2H), 3.34 (dd, J=10.6, 16.4 Hz, 1H), 3.09 (br dd, J=7.6, 16.0 Hz, 1H).

Step C: Methyl N-[[(5R)-3-[4-(1,1-dioxo-1,4-thiazinan-4-yl)-3,5-difluoro-phenyl]-4,5-dihydroisoxazol-5-yl]methyl]carbamate Chloro(2-dicyclohexylphosphino-2',6'-dimethoxy-1,1'-biphenyl)[2-(2'-amino-1,1'-biphenyl)]palladium(II) (33.0 mg, 0.046 mmol) was added to a mixture of methyl {[(5R)-3-(4-bromo-3,5-difluorophenyl)-4,5-dihydro-1,2-oxazol-5-yl]methyl}carbamate (200 mg, 0.458 mmol), thiomorpholine 1,1-dioxide (248 mg, 1.83 mmol) and cesium carbonate (448 mg, 1.38 mmol) in tert-amyl alcohol (5 mL). The reaction mixture was warmed to 120° C. and allowed to stir for 1 h. The reaction mixture was cooled, filtered, and the filtrate was concentrated under reduced pressure. The residue was purified by preparative HPLC, eluting with a gradient of acetonitrile:water containing 10 mM ammonium carbonate—20:80 to 50:50 to afford the title compound. MS: m/z=404.1 [M+H]. $^1$H NMR (DMSO-$d_6$, 400 MHz) δ 7.35 (s, 3H), 4.74 (br dd, J=6.8, 11.2 Hz, 1H), 3.56 (br s, 4H), 3.51 (s, 3H), 3.40 (dd, J=10.6, 17.2 Hz, 1H), 3.23 (br s, 4H), 3.19-3.04 (m, 3H).

Example 5

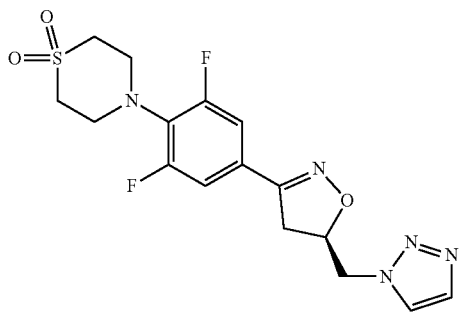 [SMILES: O=S1(=O)CCN(c2c(F)cc(C3=NO[C@@H](Cn4ccnn4)C3)cc2F)CC1]

4-(2,6-Difluoro-4-{(5R)-5-[(1H-1,2,3-triazol-1-yl)methyl]-4,5-dihydro-1,2-oxazol-3-yl}phenyl)-1λ$^6$-thiomorpholine-1,1-dione Thiomorpholine 1,1-dioxide (126 g, 933 mmol), [(4,5-Bis(diphenylphosphino)-9,9-dimethylxanthene)-2-(2'-amino-1,1'-biphenyl)]palladium(II) methanesulfonate (22.1 g, 23.3 mmol), and cesium carbonate (228 g, 699 mmol) were added to a solution of (5R)-3-(4-bromo-3,5-difluoro-phenyl)-5-(triazol-1-ylmethyl)-4,5-dihydroisoxazole (described in Example 1) (16 g, 46.6 mmol) and 1,1-dioxothian-4-one (80.0 g, 233 mmol) in tert-amyl alcohol (2.40 L). The reaction mixture was warmed to 120° C. and allowed to stir for 18 h. The reaction mixture was cooled and poured into water (2.0 L) and the resulting mixture was extracted with ethyl acetate (2×2.0 L). The combined organic layers were washed with a saturated aqueous solution of sodium chloride (1×1.0 L), dried over sodium sulfate, filtered and the filtrate was concentrated under reduced pressure. The residue was purified by preparative HPLC, eluting with a gradient of acetonitrile:water containing 0.2% formic acid—22:78 to 52:48. The product fractions were combined and concentrated under reduced pressure. The residue was resolved by chiral supercritical fluid chromatography, using a Chiralpak AD column and eluting with 55% methanol (containing 0.1% ammonium hydroxide) in $CO_2$ to afford the title compound. MS: m/z=398.0 [M+H]. $^1$H NMR (DMSO-$d_6$, 400 MHz) δ 8.12 (s, 1H), 7.73 (s, 1H), 7.30-7.34 (d, J=16.0 Hz, 2H), 5.16-5.20 (m, 1H), 4.63-4.65 (m, 2H), 3.50-3.59 (m, 6H), 3.22-3.33 (m, 6H).

Example 6

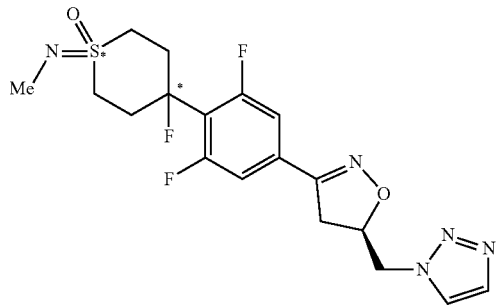

4-(2,6-Difluoro-4-{(5R)-5-[(1H-1,2,3-triazol-1-yl)methyl]-4,5-dihydro-1,2-oxazol-3-yl}phenyl)-4-fluoro-1-(methylimino)-1λ$^6$-thian-1-one Step A: 4-(2,6-Difluoro-4-{(5R)-5-[(1H-1,2,3-triazol-1-yl)methyl]-4,5-dihydro-1,2-oxazol-3-yl}phenyl)thian-4-ol A solution of isopropylmagnesium lithium chloride in tetrahydrofuran (1.3 M, 31.9 mL, 41.5 mmol) was added to a mixture of (5R)-3-(4-bromo-3,5-difluoro-phenyl)-5-(triazol-1-ylmethyl)-4,5-dihydroisoxazole (described in Example 1) (9.5 g, 27.7 mmol) and dihydro-2H-thiopyran-4(3H)-one (3.54 g, 30.5 mmol) in tetrahydrofuran (200 mL) under an atmosphere of dinitrogen at −78° C., and the reaction mixture was allowed to stir for 30 min. The reaction mixture was warmed to ambient temperature and allowed to stir for 16 h. A saturated aqueous solution of ammonium chloride (100 mL) and ethyl acetate (200 mL) were added and the resulting mixture was extracted with ethyl acetate (3×100 mL). The combined organic layers were washed with a saturated aqueous solution of sodium chloride (1×100 mL), dried over sodium sulfate, filtered and the filtrate was concentrated under reduced pressure. The residue was purified by silica gel chromatography, eluting with a gradient of dichloromethane:ethyl acetate—100:0 to 95:5 to afford the title compound. MS: m/z=403.1 [M+Na]. $^1$H NMR (CDCl$_3$, 400 MHz) δ 7.75 (d, J=0.8 Hz, 1H), 7.70 (d, J=0.8 Hz, 1H), 7.12-6.99 (m, 2H), 5.25-5.13 (m, 1H), 4.70 (dd, J=1.6, 4.0 Hz, 2H), 3.47-3.15 (m, 4H), 2.68 (t, J=6.4 Hz, 1H), 2.53-2.34 (m, 4H), 2.32-2.19 (m, 1H), 2.27 (br d, J=15.6 Hz, 2H).

Step B: 1-({(5R)-3-[3,5-Difluoro-4-(4-fluorothian-4-yl)phenyl]-4,5-dihydro-1,2-oxazol-5-yl}methyl)-1H-1,2,3-triazole Bis(2-methoxyethyl)aminosulfur trifluoride (4.07 mL, 22.1 mmol) was added to a solution of 4-(2,6-difluoro-4-{(5R)-5-[(1H-1,2,3-triazol-1-yl)methyl]-4,5-dihydro-1,2-oxazol-3-yl}phenyl)thian-4-ol (4.2 g, 11.04 mmol) in dichloromethane (150 mL) at 0° C. The reaction mixture was allowed to warm to ambient temperature and stir for 1 h. A saturated aqueous solution of sodium bicarbonate (50 mL) was added, and the resulting mixture was concentrated under reduced pressure. The residue was filtered and the precipitate was washed with water (20 mL). The precipitate was purified by silica gel chromatography, eluting with a gradient of dichloromethane:ethyl acetate—97:3 to 95:5 to afford the title compound. MS: m/z=363.1 [M-F]. $^1$H NMR (CDCl₃, 400 MHz) δ 7.82-7.64 (m, 2H), 7.08 (d, J=10.2 Hz, 2H), 5.27-5.15 (m, 1H), 4.76-4.61 (m, 2H), 3.42 (dd, J=11.2, 17.2 Hz, 1H), 3.28-3.10 (m, 3H), 2.62-2.25 (m, 6H).

Step C: 4-(2,6-Difluoro-4-{(5R)-5-[(1H-1,2,3-triazol-1-yl)methyl]-4,5-dihydro-1,2-oxazol-3-yl}phenyl)-4-fluoro-1-imino-1λ⁶-thian-1-one (Diacetoxyiodo)benzene (5.47 g, 17.0 mmol) and ammonium carbamate (2.12 g, 27.2 mmol) were added to a solution of 1-({(5R)-3-[3,5-difluoro-4-(4-fluorothian-4-yl)phenyl]-4,5-dihydro-1,2-oxazol-5-yl}methyl)-1H-1,2,3-triazole (2.6 g, 6.80 mmol) in methanol (15 mL), the reaction mixture was allowed to stir for 3 h. The reaction mixture was concentrated under reduced pressure and the residue was filtered. The precipitate was washed with water (50 mL) and dried under reduced pressure to afford the title compound in sufficient purity for use in the next step. MS: m/z=414.1 [M+H]. ¹H NMR (DMSO-d₆, 400 MHz) δ 8.17-8.08 (m, 1H), 7.73 (s, 1H), 7.39 (dd, J=2.2, 11.2 Hz, 2H), 5.35-5.11 (m, 1H), 4.76-4.46 (m, 2H), 4.01 (s, 1H), 3.77-3.72 (m, 1H), 3.71-3.35 (m, 2H), 3.30-3.00 (m, 4H), 2.89-2.60 (m, 2H), 2.54 (s, 3H).

Step D: 4-(2,6-Difluoro-4-{(5R)-5-[(1H-1,2,3-triazol-1-yl)methyl]-4,5-dihydro-1,2-oxazol-3-yl}phenyl)-4-fluoro-1-(methylimino)-1λ⁶-thian-1-one Sodium hydride (60% dispersion in mineral oil, 0.580 g, 14.5 mmol) was added to a solution of 4-(2,6-difluoro-4-{(5R)-5-[(1H-1,2,3-triazol-1-yl)methyl]-4,5-dihydro-1,2-oxazol-3-yl}phenyl)-4-fluoro-1-imino-1λ⁶-thian-1-one (2.0 g, 4.8 mmol) in DMF (50 mL) at 0° C. under an atmosphere of dinitrogen. The reaction mixture was allowed to stir for 20 min. Iodomethane (0.904 mL, 14.51 mmol) was added and the reaction mixture was allowed to warm to ambient temperature and stir for 3 h. A saturated aqueous solution of ammonium chloride (50 mL) was added and the resulting mixture was extracted with ethyl acetate (3×50 mL). The combined organic layers were washed with a saturated aqueous solution of sodium chloride (1×50 mL), dried over sodium sulfate, filtered and the filtrate was concentrated under reduced pressure. The residue was purified by preparative HPLC, eluting with a gradient of acetonitrile:water containing 10 mM ammonium carbonate—20:80 to 50:50. The product fractions were combined and concentrated under reduced pressure. The residue was further separated by chiral supercritical fluid chromatography, using a Chiralpak AD column and eluting with 55% ethanol (containing 0.1% ammonium hydroxide) in CO₂ to afford the title compound (second eluting isomer) and its isomer (first eluting isomer). MS: m/z=428.2 [M+H]. ¹H NMR (DMSO-d₆, 400 MHz) δ 8.16-8.09 (m, 1H), 7.72 (d, J=0.8 Hz, 1H), 7.38 (d, J=10.6 Hz, 2H), 5.28-5.15 (m, 1H), 4.72-4.58 (m, 2H), 3.57 (dd, J=11.2, 17.6 Hz, 1H), 3.43-3.34 (m, 2H), 3.43-3.33 (m, 1H), 3.30-3.19 (m, 3H), 2.79-2.53 (m, 6H), 2.79-2.53 (m, 1H), 2.06 (s, 1H).

Example 7

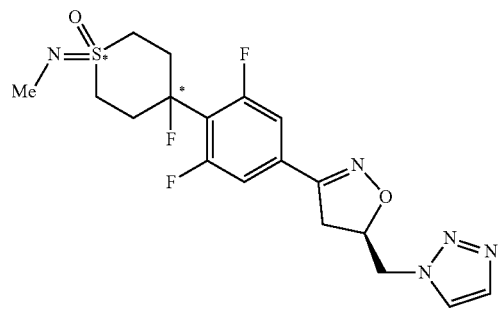

4-(2,6-Difluoro-4-{(5R)-5-[(1H-1,2,3-triazol-1-yl)methyl]-4,5-dihydro-1,2-oxazol-3-yl}phenyl)-4-fluoro-1-(methylimino)-1λ⁶-thian-1-one As described in Example 6, step D, the first eluting isomer after chiral supercritical fluid chromatography. MS: m/z=428.2 [M+H]. ¹H NMR (DMSO-d₆, 400 MHz) δ 8.12 (d, J=1.2 Hz, 1H), 7.72 (s, 1H), 7.39 (d, J=10.6 Hz, 2H), 5.30-5.14 (m, 1H), 4.72-4.57 (m, 2H), 3.57 (dd, J=11.2, 17.2 Hz, 1H), 3.30-3.23 (m, 4H), 3.23-3.07 (m, 2H), 2.82-2.58 (m, 6H).

Example 8

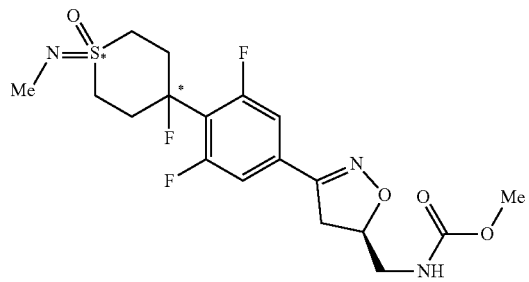

Methyl {[(5R)-3-{3,5-difluoro-4-[4-fluoro-1-(methylimino)-1-oxo-1λ⁶-thian-4-yl]phenyl}-4,5-dihydro-1,2-oxazol-5-yl]methyl}carbamate

Step A: 4-{4-[(5R)-5-(Azidomethyl)-4,5-dihydro-1,2-oxazol-3-yl]-2,6-difluorophenyl}thian-4-ol A solution of isopropylmagnesium lithium chloride in tetrahydrofuran (1.3 M, 6.55 mL, 8.51 mmol) was added to a mixture of (5R)-5-(azidomethyl)-3-(4-bromo-3,5-difluoro-phenyl)-4,5-dihydroisoxazole (described in Example 1) (1.8 g, 5.68 mmol) and dihydro-2H-thiopyran-4(3H)-one (1.055 g, 9.08 mmol) in tetrahydrofuran (40 mL) under an atmosphere of dinitrogen at −78° C. The reaction mixture was allowed to warm to ambient temperature and stirred for 12 h. The reaction mixture was cooled to 0° C., and a saturated aqueous solution of ammonium chloride was added. The resulting mixture was extracted with dichloromethane (2×100 mL). The combined organic layers were washed with saturated aqueous solution of sodium chloride (1×100 mL), dried over sodium sulfate, filtered, and the filtrate was concentrated under reduced pressure. The residue was purified by silica gel chromatography, eluting with a gradient of petroleum ether:ethyl acetate—100:0 to 80:20 to afford the title compound. MS: m/z=355.0 [M+H]. $^1$H NMR (CDCl$_3$, 400 MHz) δ 7.23-7.16 (m, 2H), 4.99-4.93 (m, 1H), 3.58 (dd, J=4.3, 13.2 Hz, 1H), 3.47-3.25 (m, 4H), 3.16 (dd, J=7.0, 16.8 Hz, 1H), 2.72 (t, J=6.8 Hz, 1H), 2.52-2.39 (m, 4H), 2.29 (br d, J=12.8 Hz, 2H).

Step B: (5R)-3-(4-Bromo-3,5-difluoro-phenyl)-5-(triazol-1-ylmethyl)-4,5-dihydroisoxazole Bis(2-methoxyethyl)aminosulfur trifluoride (1.56 mL, 8.47 mmol) was added to a mixture of 4-{4-[(5R)-5-(azidomethyl)-4,5-dihydro-1,2-oxazol-3-yl]-2,6-difluorophenyl}thian-4-ol (1.5 g, 4.23 mmol) in dichloromethane (15 mL) at 0° C. The reaction mixture was allowed to warm to ambient temperature and stir for 4 h. A saturated aqueous solution of sodium bicarbonate (10 mL) was added and the resulting mixture was extracted with dichloromethane (3×20 mL). The combined organic layers were concentrated under reduced pressure and the residue purified by silica gel chromatography, eluting with a gradient of petroleum ether:ethyl acetate—100:0 to 50:50 to afford the title compound. $^1$H NMR (DMSO-d$_6$, 400 MHz) δ 7.42 (d, J=11.2 Hz, 2H), 4.98 (tdd, J=3.5, 7.1, 13.2 Hz, 1H), 3.65-3.39 (m, 3H), 3.20 (dd, J=7.0, 17.6 Hz, 1H), 3.00 (br t, J=12.7 Hz, 2H), 2.57 (br d, J=14.4 Hz, 2H), 2.46-2.38 (m, 3H), 2.46-2.24 (m, 1H).

Step C: 4-{4-[(5R)-5-(Azidomethyl)-4,5-dihydro-1,2-oxazol-3-yl]-2,6-difluorophenyl}-4-fluoro-1-imino-1λ$^6$-thian-1-one (Diacetoxyiodo)benzene (1.81 g, 5.61 mmol) and ammonium carbamate (701 mg, 8.98 mmol) were added to a solution of (5R)-3-(4-bromo-3,5-difluoro-phenyl)-5-(triazol-1-ylmethyl)-4,5-dihydroisoxazole (800 mg, 2.25 mmol) in methanol (30 mL). The reaction mixture was allowed to stir for 2 h. The reaction mixture was concentrated under reduced pressure, and a saturated aqueous solution of sodium bicarbonate (20 mL) was added. The resulting mixture was extracted with dichloromethane (3×20 mL), and the combined organic layers concentrated under reduced pressure. The residue was purified by silica gel chromatography, eluting with ethyl acetate, to afford the title compound. $^1$H NMR (DMSO-d$_6$, 400 MHz) δ 7.45 (dd, J=1.5, 11.2 Hz, 2H), 4.99 (dt, J=6.6, 10.4 Hz, 1H), 4.08-3.71 (m, 1H), 3.68-3.57 (m, 1H), 3.55-3.43 (m, 2H), 3.32-3.16 (m, 3H), 3.15-2.96 (m, 2H), 2.87-2.63 (m, 2H), 2.55 (br d, J=5.6 Hz, 2H).

Step D: 4-{4-[(5R)-5-(Azidomethyl)-4,5-dihydro-1,2-oxazol-3-yl]-2,6-difluorophenyl}-4-fluoro-1-(methylimino)-1λ$^6$-thian-1-one Sodium hydride (60% dispersion in oil, 279 mg, 6.97 mmol) was added to a solution of 4-{4-[(5R)-5-(azidomethyl)-4,5-dihydro-1,2-oxazol-3-yl]-2,6-difluorophenyl}-4-fluoro-1-imino-1λ$^6$-thian-1-one (900 mg, 2.32 mmol) in DMF (25 mL) at 0° C. under an atmosphere of dinitrogen, and the reaction mixture was allowed to stir for 20 min. Iodomethane (0.436 mL, 6.97 mmol) was added, and the reaction mixture was allowed to warm to ambient temperature and stirred for 1 h. A saturated aqueous solution of ammonium chloride (10 mL) was added and the resulting mixture was extracted with ethyl acetate (3×10 mL). The combined organic layers were washed with saturated aqueous solution of sodium chloride (1×10 mL), dried over sodium sulfate, filtered and the filtrate was concentrated under reduced pressure to afford the title compound in sufficient purity for use in the next step. MS: m/z=402.0 [M+H]. $^1$H NMR (DMSO-d$_6$, 400 MHz) δ 7.46 (br dd, J=6.5, 11.0 Hz, 2H), 5.08-4.93 (m, 1H), 3.62 (br dd, J=3.0, 13.5 Hz, 1H), 3.55-3.46 (m, 2H), 3.34-3.26 (m, 2H), 3.22 (ddd, J=2.7, 7.1, 17.5 Hz, 2H), 2.79-2.73 (m, 1H), 2.69 (d, J=18.5 Hz, 3H), 2.64-2.55 (m, 2H), 0.90-0.59 (m, 2H).

Step E: 4-{4-[(5R)-5-(Aminomethyl)-4,5-dihydro-1,2-oxazol-3-yl]-2,6-difluorophenyl}-4-fluoro-1-(methylimino)-1λ$^6$-thian-1-one Triphenylphosphine (737 mg, 2.81 mmol) and water (0.422 mL, 23.4 mmol) were added to a solution of 4-{4-[(5R)-5-(azidomethyl)-4,5-dihydro-1,2-oxazol-3-yl]-2,6-difluorophenyl}-4-fluoro-1-(methylimino)-1λ$^6$-thian-1-one (940 mg, 2.34 mmol) in tetrahydrofuran (15 mL). The reaction mixture was warmed to 70° C. and stirred for 3 h. The reaction mixture was concentrated under reduced pressure and the residue was washed with ethyl acetate and petroleum ether (1:1, 4×20 mL) to afford the title compound in sufficient purity for use in the next step. $^1$H NMR (DMSO-d$_6$, 500 MHz) δ 7.40 (dd, J=6.4, 10.5 Hz, 2H), 4.81-4.64 (m, 1H), 3.38-3.35 (m, 2H), 3.31-3.25 (m, 3H), 3.25-3.18 (m, 2H), 2.75-2.68 (m, 4H), 2.66 (s, 2H), 2.62-2.52 (m, 2H).

Step F: Methyl {[(5R)-3-{3,5-difluoro-4-[4-fluoro-1-(methylimino)-1-oxo-1λ$^6$-thian-4-yl]phenyl}-4,5-dihydro-1,2-oxazol-5-yl]methyl}carbamate N-ethyl-N-isopropylpropan-2-amine (0.461 mL, 2.64 mmol) was added to a solution of 4-{4-[(5R)-5-(aminomethyl)-4,5-dihydro-1,2-oxazol-3-yl]-2,6-difluorophenyl}-4-fluoro-1-(methylimino)-1λ$^6$-thian-1-one (330 mg, 0.879 mmol) in dichloromethane (5 mL) at 0° C., and the reaction mixture was allowed to stir for 10 min. Methyl chloroformate (0.082 mL, 1.06 mmol) was added, and the reaction mixture was warmed to ambient temperature and stirred for 1 h. A saturated aqueous solution of sodium bicarbonate (2 mL) was added, and the resulting mixture was extracted with ethyl acetate (3×10 mL). The combined organic layers were dried over sodium sulfate, filtered, and the filtrate was concentrated under reduced pressure. The residue was purified by preparative HPLC, eluting with a gradient of acetonitrile:water containing 10 mM ammonium carbonate—22:78 to 52:48. The product fractions were combined and concentrated under reduced pressure. The residue was further separated by chiral supercritical fluid chromatography, using a Chiralpak AD column and eluting with 30% ethanol (containing 0.1% ammonium hydroxide) in CO$_2$ to afford the title compound (first eluting isomer) and its isomer (second eluting isomer). MS: m/z=434.2 [M+H]. $^1$H NMR (CD$_3$CN, 500 MHz) δ 7.30 (br d, J=11.0 Hz, 2H), 5.77 (br s, 1H), 4.90-4.80 (m, 1H), 3.58 (s, 3H), 3.43-3.30 (m, 3H), 3.29-3.22 (m, 2H), 3.19-3.05 (m, 3H), 2.93-2.77 (m, 2H), 2.75 (s, 3H), 2.67-2.57 (m, 2H).

Example 9

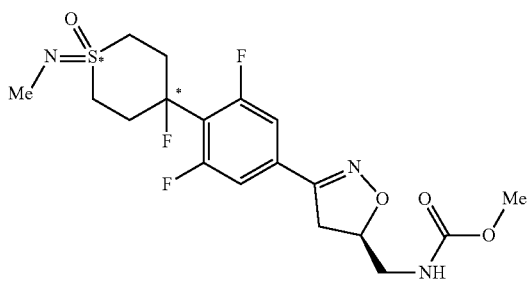

Methyl {[(5R)-3-{3,5-difluoro-4-[4-fluoro-1-(methylimino)-1-oxo-1λ⁶-thian-4-yl]phenyl}-4,5-dihydro-1,2-oxazol-5-yl]methyl}carbamate As described in Example 8, Step F, the second eluting isomer after chiral supercritical fluid chromatography. MS: m/z=434.2 [M+H]. ¹H NMR (CD₃CN, 500 MHz) δ 7.29 (d, J=11.0 Hz, 2H), 5.75 (br s, 1H), 4.84 (tdd, J=5.4, 7.3, 11.0 Hz, 1H), 3.58 (s, 3H), 3.44-3.35 (m, 1H), 3.35-3.28 (m, 4H), 3.27-3.20 (m, 2H), 3.08 (dd, J=7.3, 17.0 Hz, 1H), 2.82-2.66 (m, 5H), 2.59-2.51 (m, 2H).

Example 10

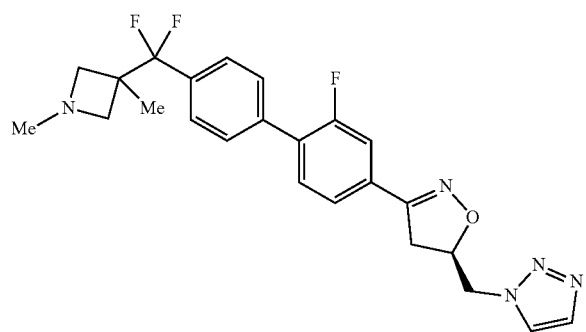

1-{[(5R)-3-{4'-[(1,3-Dimethylazetidin-3-yl)(difluoro)methyl]-2-fluoro[1,1'-biphenyl]-4-yl}-4,5-dihydro-1,2-oxazol-5-yl]methyl}-1H-1,2,3-triazole Tribasic potassium phosphate (181 mg, 0.854 mmol), water (1.0 mL) and chloro(2-dicyclohexylphosphino-2',4',6'-triisopropyl-1,1'-biphenyl)[2-(2'-amino-1,1'-biphenyl)]palladium(II) (11.2 mg, 0.014 mmol) were added to a solution of (5R)-3-(4-bromo-3-fluoro-phenyl)-5-(triazol-1-ylmethyl)-4,5-dihydroisoxazole (Intermediate 2) (93 mg, 0.285 mmol) and 3-{difluoro[4-(4,4,5,5-tetramethyl-1,3,2-dioxaborolan-2-yl)phenyl]methyl}-1,3-dimethylazetidine (Intermediate 3) (160 mg, 0.285 mmol) in tetrahydrofuran (4 mL), the reaction mixture was deoxygenated with dinitrogen. The reaction mixture was warmed to 70° C. and allowed to stir for 2 h. The reaction mixture was cooled, filtered, and the filtrate was concentrated under reduced pressure. The residue was purified by preparative HPLC, eluting with a gradient of acetonitrile:water containing 10 mM ammonium carbonate—37:63 to 67:33 to afford the title compound. MS: m/z=456.1 [M+H]. ¹H NMR (DMSO-d₆, 400 MHz) δ 1.25 (s, 3H), 2.24 (s, 3H), 3.02 (br d, J=7.2 Hz, 2H), 3.29 (br s, 1H), 3.34 (br s, 2H), 3.63 (dd, J=17.4, 11.2 Hz, 1H), 4.58-4.73 (m, 2H), 5.20 (td, J=11.1, 6.4 Hz, 1H), 7.50-7.58 (m, 4H), 7.63-7.74 (m, 4H), 8.15 (d, J=0.8 Hz, 1H).

Example 11

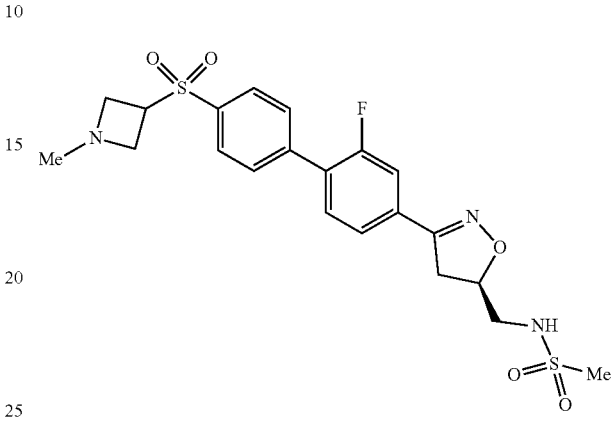

N-({(5R)-3-[2-Fluoro-4'-(1-methylazetidine-3-sulfonyl)[1,1'-biphenyl]-4-yl]-4,5-dihydro-1,2-oxazol-5-yl}methyl)methanesulfonamide

Step A: N-{[(5R)-3-(4-Bromo-3-fluorophenyl)-4,5-dihydro-1,2-oxazol-5-yl]methyl}methanesulfonamide Methane sulfonyl chloride (0.15 mL, 1.92 mmol) was added to a solution of 1-[(5R)-3-(4-bromo-3-fluorophenyl)-4,5-dihydro-1,2-oxazol-5-yl]methanamine (Intermediate 5) (500 mg, 1.83 mmol) and N,N-diisopropylethylamine (0.640 mL, 3.66 mmol) in dichloromethane (10 mL) at 0° C., and the reaction mixture was allowed to stir for 2 h. The reaction mixture was warmed to ambient temperature and washed with a saturated aqueous solution of sodium bicarbonate (20 mL) and an aqueous solution of hydrochloric acid (1 M, 30 mL). The organic layer was dried over sodium sulfate, filtered, and the filtrate was concentrated under reduced pressure. The residue was purified by silica gel chromatography, eluting with a gradient of petroleum ether:ethyl acetate—100:0 to 45:55 to afford the title compound. MS: m/z=350.9 [M+H]. ¹H NMR (CDCl₃, 400 MHz) δ 7.60 (dd, J=7.2, 8.4 Hz, 1H), 7.44 (dd, J=1.6, 9.2 Hz, 1H), 7.29 (d, J=8.4 Hz, 1H), 5.01-4.92 (m, 1H), 4.76 (br t, J=6.0 Hz, 1H), 3.53-3.44 (m, 1H), 3.44-3.26 (m, 3H), 3.01 (s, 3H).

Step B: N-({(5R)-3-[2-Fluoro-4'-(1-methylazetidine-3-sulfonyl)[1,1'-biphenyl]-4-yl]-4,5-dihydro-1,2-oxazol-5-yl}methyl)methanesulfonamide

[1,1'-bis(diphenylphosphino)ferrocene]dichloropalladium(II) (10.3 mg, 0.014 mmol) was added to a mixture of [4-(1-methylazetidine-3-sulfonyl)phenyl]boronic acid (Intermediate 4) (180 mg, 0.141 mmol), N-{[(5R)-3-(4-bromo-3-fluorophenyl)-4,5-dihydro-1,2-oxazol-5-yl]methyl}methanesulfonamide (74.3 mg, 0.212 mmol) and tribasic potassium phosphate (299 mg, 1.41 mmol) in tetrahydrofuran (3 mL) and water (0.117 mL), and the reaction mixture was deoxygenated with dinitrogen. The reaction mixture was warmed to 70° C. and allowed to stir for 2 h. The reaction mixture was cooled, filtered, and the filtrate was concentrated under reduced pressure. The residue was purified by silica gel chromatography, eluting with a gradient of dichloromethane:methanol—100:0 to 90:10. The product fractions were combined and concentrated under reduced pressure. The residue was further purified by preparative HPLC, eluting with a gradient of acetonitrile:water containing 0.1% trifluoroacetic acid—20:80 to 40:60 to afford the title compound. MS: m/z=481.9 [M+H]. $^1$H NMR (DMSO-d$_6$, 500 MHz) δ 8.09 (d, J=8.5 Hz, 2H), 7.96 (d, J=7.5 Hz, 2H), 7.75 (t, J=8.0 Hz, 1H), 7.68 (s, 1H), 7.66 (s, 1H), 7.36 (t, J=6.5 Hz, 1H), 4.92-4.85 (m, 1H), 4.74 (m, 1H), 4.40 (br s, 4H), 3.57 (br dd, J=10.5, 17 Hz, 1H), 3.31-3.27 (m, 1H), 3.23-3.18 (m, 2H), 2.97-2.92 (m, 3H), 2.89 (s, 3H).

Example 12

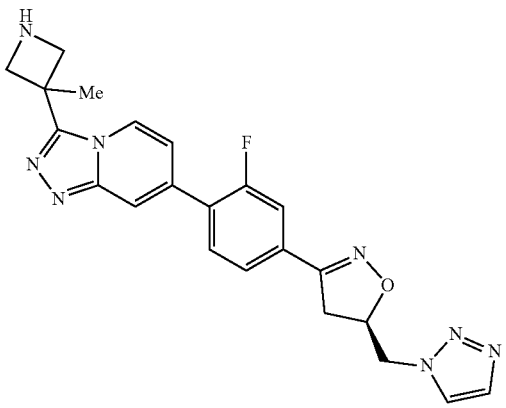 [SMILES: CC1(c2nnc3cc(-c4ccc(C5=NO[C@@H](Cn6ccnn6)C5)cc4F)ccn23)CNC1]

7-(2-Fluoro-4-{(5R)-5-[(1H-1,2,3-triazol-1-yl)methyl]-4,5-dihydro-1,2-oxazol-3-yl}phenyl)-3-(3-methylazetidin-3-yl)[1,2,4]triazolo[4,3-a]pyridine Step A: tert-Butyl 3-[7-(2-fluoro-4-{(5R)-5-[(1H-1,2,3-triazol-1-yl)methyl]-4,5-dihydro-1,2-oxazol-3-yl}phenyl)[1,2,4]triazolo[4,3-a]pyridin-3-yl]-3-methylazetidine-1-carboxylate Chloro(2-dicyclohexylphosphino-2',4',6'-triisopropyl-1,1'-biphenyl)[2-(2'-amino-1,1'-biphenyl)]palladium(II) (10.7 mg, 0.014 mmol) was added to a mixture of tert-butyl 3-(7-bromo[1,2,4]triazolo[4,3-a]pyridin-3-yl)-3-methylazetidine-1-carboxylate (Intermediate 6) (100 mg, 0.272 mmol), (5R)-3-(4-Bromo-3-fluoro-phenyl)-5-(triazol-1-yl-methyl)-4,5-dihydroisoxazole (Intermediate 2) (122 mg, 0.327 mmol) and an aqueous solution of tribasic potassium phosphate (2 M, 0.272 mL, 0.545 mmol) in tetrahydrofuran (3 mL), and the reaction mixture was deoxygenated with dinitrogen. The reaction mixture was warmed to 70° C. and allowed to stir for 2 h. The reaction mixture was cooled, filtered, and the filtrate was concentrated under reduced pressure. The residue was purified by silica gel chromatography, eluting with a gradient of dichloromethane:methanol—100:0 to 90:10 to afford the title compound. MS: m/z=533.2 [M+H]. $^1$H NMR (DMSO-d$_6$, 400 MHz) δ 8.38 (d, J=7.2 Hz, 1H), 8.15 (s, 1H), 8.02 (s, 1H), 7.85-7.78 (m, 1H), 7.73 (s, 1H), 7.67-7.56 (m, 2H), 7.20 (br d, J=7.2 Hz, 1H), 5.22 (br dd, J=4.8, 10.4 Hz, 1H), 4.75-4.61 (m, 2H), 4.48 (br d, J=7.2 Hz, 2H), 4.11 (br s, 2H), 3.64 (dd, J=11.2, 17.2 Hz, 1H), 3.37 (br s, 1H), 1.71 (s, 3H), 1.37 (s, 9H).

Step B: 7-(2-Fluoro-4-{(5R)-5-[(1H-1,2,3-triazol-1-yl)methyl]-4,5-dihydro-1,2-oxazol-3-yl}phenyl)-3-(3-methylazetidin-3-yl)[1,2,4]triazolo[4,3-a]pyridine To a vessel containing tert-butyl 3-[7-(2-fluoro-4-{(5R)-5-[(1H-1,2,3-triazol-1-yl)methyl]-4,5-dihydro-1,2-oxazol-3-yl}phenyl)[1,2,4]triazolo[4,3-a]pyridin-3-yl]-3-methyl-azetidine-1-carboxylate (150 mg, 0.225 mmol) at 15° C. was added a solution of hydrochloric acid in methanol (3 M, 2 mL), and the reaction mixture was allowed to stir for 2 h. The reaction mixture was concentrated under reduced pressure. The residue was purified by preparative HPLC, eluting with a gradient of acetonitrile:water containing 0.04% ammonium hydroxide and 10 mM ammonium carbonate—10:90 to 40:60 to afford the title compound. MS: m/z=433.1 [M+H]. $^1$H NMR (DMSO-d$_6$, 500 MHz) δ 8.61 (d, J=7.2 Hz, 1H), 8.13 (d, J=1.2 Hz, 1H), 7.98 (s, 1H), 7.78 (t, J=8.4 Hz, 1H), 7.71 (d, J=0.8 Hz, 1H), 7.63-7.52 (m, 2H), 7.17 (br d, J=7.2 Hz, 1H), 5.25-5.14 (m, 1H), 4.72-4.58 (m, 2H), 4.00 (d, J=8.0 Hz, 2H), 3.67 (d, J=8.0 Hz, 2H), 3.64-3.56 (m, 1H), 3.35-3.33 (m, 1H), 1.73 (s, 3H).

The following compounds were made using the methods described in the Examples above, substituting the appropriate reactants and/or reagents.

| Example | Structure | Name | MS (M + H$^+$) |
|---|---|---|---|
| 13 | | [(5R)-3-[3-Fluoro-4-[4-(1-methylazetidin-3-yl)sulfonylphenyl]phenyl]-4,5-dihydroisoxazol-5-yl]methanol | 404.9 |

| Example | Structure | Name | MS (M + H+) |
|---|---|---|---|
| 14 | | Methyl N-[[(5R)-3-[4-[4-(1,3-dimethylazetidin-3-yl)sulfonylphenyl]-3-fluoro-phenyl]-4,5-dihydroisoxazol-5-yl]methyl]carbamate | 476.2 |
| 15 | | (5R)-3-[4-[4-[Difluoro-(3-fluoro-1-methyl-azetidin-3-yl)methyl]phenyl]-3-fluoro-phenyl]-5-(triazol-1-ylmethyl)-4,5-dihydroisoxazole | 460.2 |
| 16 | | (5R)-3-[3,5-Difluoro-4-(3-methyl-[1,2,4]triazolo[4,3-a]pyridin-7-yl)phenyl]-5-(triazol-1-ylmethyl)-4,5-dihydroisoxazole | 396.2 |
| 17 | | Cyclopropyl N-[[(5R)-3-[4-[4-(1,3-dimethylazetidin-3-yl)sulfonylphenyl]-3-fluoro-phenyl]-4,5-dihydroisoxazol-5-yl]methyl]carbamate | 502.3 |

-continued

| Example | Structure | Name | MS (M + H⁺) |
|---|---|---|---|
| 18 | | N-[[(5R)-3-[4-[4-(1,3-Dimethylazetidin-3-yl)sulfonylphenyl]-3-fluoro-phenyl]-4,5-dihydroisoxazol-5-yl]methyl]acetamide | 460.2 |
| 19 | | N-({(5R)-3-[2-Fluoro-4'-(methanesulfonyl)[1,1'-biphenyl]-4-yl]-4,5-dihydro-1,2-oxazol-5-yl}methyl)methanesulfonamide | 427.1 |
| 20 | | {(5R)-3-[4-(6-Cyanopyridin-3-yl)-3-fluorophenyl]-4,5-dihydro-1,2-oxazol-5-yl}methyl carbamate | 341.0 |
| 21 | | {(5R)-3-[4'-(1,3-Dimethylazetidine-3-sulfonyl)-2-fluoro[1,1'-biphenyl]-4-yl]-4,5-dihydro-1,2-oxazol-5-yl}methanol | 419.4 |

| Example | Structure | Name | MS (M + H⁺) |
|---|---|---|---|
| 22 | | 1-({(5R)-3-[4'-(1,3-Dimethylazetidine-3-sulfonyl)-2,6-difluoro[1,1'-biphenyl]-4-yl]-4,5-dihydro-1,2-oxazol-5-yl}methyl)-1H-1,2,3-triazole | 488.5 |
| 23 | | 1-({(5R)-3-[2-Fluoro-4'-(3-methylazetidine-3-sulfonyl)[1,1'-biphenyl]-4-yl]-4,5-dihydro-1,2-oxazol-5-yl}methyl)-1H-1,2,3-triazole | 456.1 |
| 24 | | 5-(2,6-Difluoro-4-{(5R)-5-[(1H-1,2,3-triazol-1-yl)methyl]-4,5-dihydro-1,2-oxazol-3-yl}phenyl)-2-(1,3-dimethylazetidine-3-sulfonyl)pyridine | 489.2 |
| 25 | | 1-{[(5R)-3-{2-Fluoro-4'-[3-(fluoromethyl)-1-methylazetidine-3-sulfonyl][1,1'-biphenyl]-4-yl}-4,5-dihydro-1,2-oxazol-5-yl]methyl}-1H-1,2,3-triazole | 488.1 |

-continued

| Example | Structure | Name | MS (M + H⁺) |
|---|---|---|---|
| 26 | 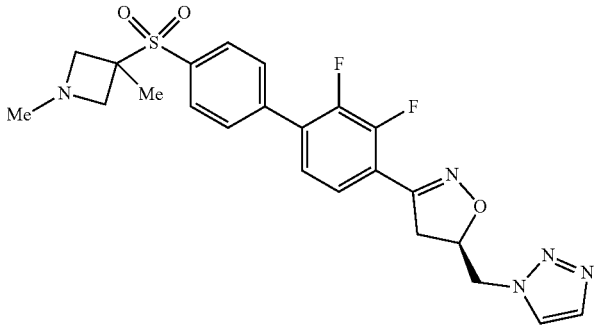 [SMILES: CN1CC(C)(S(=O)(=O)c2ccc(-c3ccc(C4=NO[C@@H](Cn5ccnn5)C4)c(F)c3F)cc2)C1] | 1-({(5R)-3-[4'-(1,3-Dimethylazetidine-3-sulfonyl)-2,3-difluoro[1,1'-biphenyl]-4-yl]-4,5-dihydro-1,2-oxazol-5-yl}methyl)-1H-1,2,3-triazole | 488.2 |
| 27 | 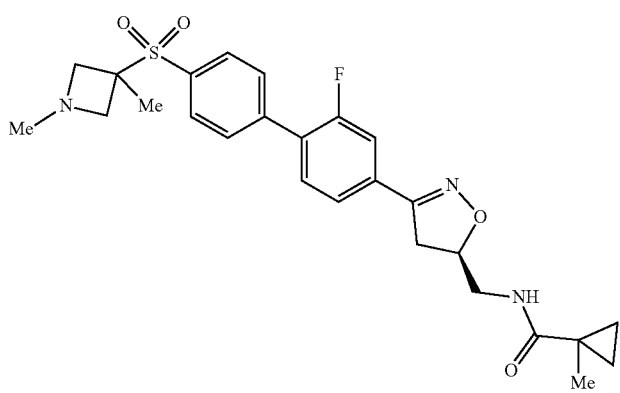 [SMILES: CN1CC(C)(S(=O)(=O)c2ccc(-c3ccc(C4=NO[C@@H](CNC(=O)C5(C)CC5)C4)cc3F)cc2)C1] | N-({(5R)-3-[4'-(1,3-Dimethylazetidine-3-sulfonyl)-2-fluoro[1,1'-biphenyl]-4-yl]-4,5-dihydro-1,2-oxazol-5-yl}methyl)-1-methylcyclopropane-1-carboxamide | 500.2 |
| 28 | 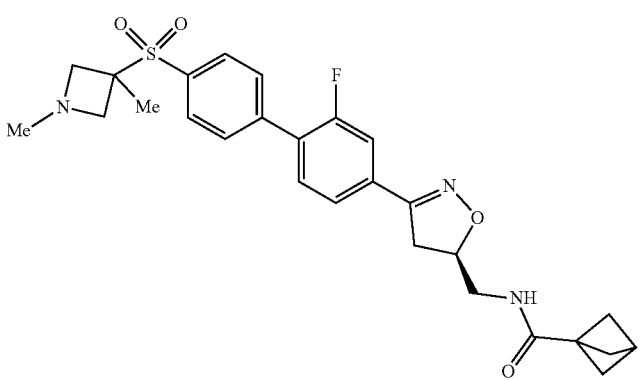 [SMILES: CN1CC(C)(S(=O)(=O)c2ccc(-c3ccc(C4=NO[C@@H](CNC(=O)C56CC(C5)C6)C4)cc3F)cc2)C1] | N-({(5R)-3-[4'-(1,3-Dimethylazetidine-3-sulfonyl)-2-fluoro[1,1'-biphenyl]-4-yl]-4,5-dihydro-1,2-oxazol-5-yl}methyl)bicyclo[1.1.1]pentane-1-carboxamide | 512.1 |
| 29 | 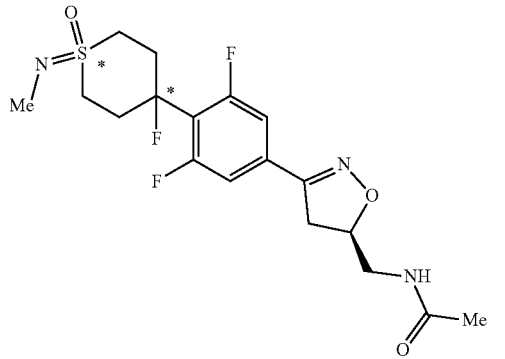 [SMILES: CN=S1(=O)CCC(F)(c2c(F)cc(C3=NO[C@@H](CNC(C)=O)C3)cc2F)CC1] | N-{[(5R)-3-{3,5-Difluoro-4-[4-fluoro-1-(methylimino)-1-oxo-1$\lambda^6$-thian-4-yl]phenyl}-4,5-dihydro-1,2-oxazol-5-yl]methyl}acetamide | 418.1 |

| Example | Structure | Name | MS (M + H⁺) |
|---|---|---|---|
| 30 | | N-{[(5R)-3-{3,5-Difluoro-4-[4-fluoro-1-(methylimino)-1-oxo-1λ⁶-thian-4-yl]phenyl}-4,5-dihydro-1,2-oxazol-5-yl]methyl}acetamide | 418.1 |
| 31 | | 4-(2,6-Difluoro-4-{(5R)-5-[(1H-1,2,3-triazol-1-yl)methyl]-4,5-dihydro-1,2-oxazol-3-yl}phenyl)-1-(methylimino)-1λ⁶-thiomorpholin-1-one | 411.2 |
| 32 | | 1-({(5R)-3-[2-Fluoro-4'-(1-methylazetidine-3-sulfonyl)[1,1'-biphenyl]-4-yl]-4,5-dihydro-1,2-oxazol-5-yl}methyl)-1H-1,2,3-triazole | 456.1 |
| 33 | | N-({(5R)-3-[2,6-Difluoro-4'-(1-methylazetidine-3-sulfonyl)[1,1'-biphenyl]-4-yl]-4,5-dihydro-1,2-oxazol-5-yl}methyl)methanesulfonamide | 500.1 |

| Example | Structure | Name | MS (M + H+) |
|---|---|---|---|
| 34 | | 1-{[(5R)-3-{2,6-Difluoro-4'-[(1-methylazetidin-3-yl)oxy][1,1'-biphenyl]-4-yl}-4,5-dihydro-1,2-oxazol-5-yl]methyl}-1H-1,2,3-triazole | 426.1 |
| 35 | | [(5R)-3-{2-Fluoro-4'-[(1-methylazetidin-3-yl)oxy][1,1'-biphenyl]-4-yl}-4,5-dihydro-1,2-oxazol-5-yl]methanol | 357.2 |
| 36 | | 1-({(5R)-3-[2,6-Difluoro-4'-(1-methylazetidine-3-sulfonyl)[1,1'-biphenyl]-4-yl]-4,5-dihydro-1,2-oxazol-5-yl}methyl)-1H-1,2,3-triazole | 474.1 |
| 37 | | 3-(Azetidin-3-yl)-7-(2-fluoro-4-{(5R)-5-[(1H-1,2,3-triazol-1-yl)methyl]-4,5-dihydro-1,2-oxazol-3-yl}phenyl)[1,2,4]triazolo[4,3-a]pyridine | 419.1 |

| Example | Structure | Name | MS (M + H⁺) |
|---|---|---|---|
| 38 | | 4-(2,6-Difluoro-4-{(5R)-5-[(1H-1,2,3-triazol-1-yl)methyl]-4,5-dihydro-1,2-oxazol-3-yl}phenyl)-4-fluoro-1-imino-1$\lambda^6$-thian-1-one | 414.0 |
| 39 | | 4-(2,6-Difluoro-4-{(5R)-5-[(1H-1,2,3-triazol-1-yl)methyl]-4,5-dihydro-1,2-oxazol-3-yl}phenyl)-4-fluoro-1-imino-1$\lambda^6$-thian-1-one | 414.0 |
| 40 | | 4-{2,6-Difluoro-4-[(5R)-5-{[4-(hydroxymethyl)-1H-1,2,3-triazol-1-yl]methyl}-4,5-dihydro-1,2-oxazol-3-yl]phenyl}-4-fluoro-1$\lambda^6$-thiane-1,1-dione | 445.0 |
| 41 | | {(5R)-3-[2,6-Difluoro-4'-(1-methylazetidine-3-sulfonyl)[1,1'-biphenyl]-4-yl]-4,5-dihydro-1,2-oxazol-5-yl}methanol | 423.0 |

| Example | Structure | Name | MS (M + H⁺) |
|---|---|---|---|
| 42 | | {(5R)-3-[2-Fluoro-4'-(3-fluoro-1-methylazetidine-3-sulfonyl)[1,1'-biphenyl]-4-yl]-4,5-dihydro-1,2-oxazol-5-yl}methanol | 423.4 |
| 43 | | 1-({(5R)-3-[4'-(3-Ethyl-1-methylazetidine-3-sulfonyl)-2-fluoro[1,1'-biphenyl]-4-yl]-4,5-dihydro-1,2-oxazol-5-yl}methyl)-1H-1,2,3-triazole | 484.5 |
| 44 | | 1-({(5R)-3-[2-Fluoro-4'-(3-fluoro-1-methylazetidine-3-sulfonyl)[1,1'-biphenyl]-4-yl]-4,5-dihydro-1,2-oxazol-5-yl}methyl)-1H-1,2,3-triazole | 474.5 |
| 45 | | 1-({(5R)-3-[4'-(1,3-Dimethylpyrrolidine-3-sulfonyl)-2-fluoro[1,1'-biphenyl]-4-yl]-4,5-dihydro-1,2-oxazol-5-yl}methyl)-1H-1,2,3-triazole | 484.2 |

| Example | Structure | Name | MS (M + H⁺) |
|---|---|---|---|
| 46 | | 3-(2'-Fluoro-4'-{(5R)-5-[(1H-1,2,3-triazol-1-yl)methyl]-4,5-dihydro-1,2-oxazol-3-yl}[1,1'-biphenyl]-4-sulfonyl)azetidine-3-carbonitrile | 467.1 |
| 47 | | 4-{2,6-Difluoro-4-[(5R)-5-(hydroxymethyl)-4,5-dihydro-1,2-oxazol-3-yl]phenyl}-4-fluoro-1$\lambda^6$-thiane-1,1-dione | 364.0 |
| 48 | | 4-Fluoro-4-(2-fluoro-4-{(5R)-5-[(1H-1,2,3-triazol-1-yl)methyl]-4,5-dihydro-1,2-oxazol-3-yl}phenyl)-1$\lambda^6$-thiane-1,1-dione | 397.0 |
| 49 | | N-({(5R)-3-[4'-(1,3-Dimethylazetidine-3-sulfonyl)-2-fluoro[1,1'-biphenyl]-4-yl]-4,5-dihydro-1,2-oxazol-5-yl}methyl)cyclopropanecarboxamide | 486.2 |

| Example | Structure | Name | MS (M + H⁺) |
|---|---|---|---|
| 50 | | Cyclopropyl({(5R)-3-[3,5-difluoro-4-(4-fluoro-1,1-dioxo-1λ⁶-thian-4-yl)phenyl]-4,5-dihydro-1,2-oxazol-5-yl}methyl)carbamate | 447.1 |
| 51 | | 3-(3-Fluoro-1-methylazetidin-3-yl)-7-(2-fluoro-4-{(5R)-5-[(1H-1,2,3-triazol-1-yl)methyl]-4,5-dihydro-1,2-oxazol-3-yl}phenyl)[1,2,4]triazolo[4.3-a]pyridine | 451.0 |
| 52 | | 3-(3-Fluoroazetidin-3-yl)-7-(2-fluoro-4-{(5R)-5-[(1H-1,2,3-triazol-1-yl)methyl]-4,5-dihydro-1,2-oxazol-3-yl}phenyl)[1,2,4]triazolo[4.3-a]pyridine | 437.2 |
| 53 | | N-({(5R)-3-[3,5-Difluoro-4-(4-fluoro-1,1-dioxo-1λ⁶-thian-4-yl)phenyl]-4,5-dihydro-1,2-oxazol-5-yl}methyl)methanesulfonamide | 441.1 |

-continued

| Example | Structure | Name | MS (M + H+) |
|---|---|---|---|
| 54 | | 4-(2,6-Difluoro-4-{(5R)-5-[(4-methyl-1H-1,2,3-triazol-1-yl)methyl]-4,5-dihydro-1,2-oxazol-3-yl}phenyl)-4-fluoro-1λ6-thiane-1,1-dione | 429.0 |
| 55 | | Ethyl ({(5R)-3-[3,5-difluoro-4-(4-fluoro-1,1-dioxo-1λ6-thian-4-yl)phenyl]-4,5-dihydro-1,2-oxazol-5-yl}methyl)carbamate | 435.1 |
| 56 | | (5R)-3-[4'-(1,3-Dimethylazetidine-3-sulfonyl)-2-fluoro[1,1'-biphenyl]-4-yl]-4,5-dihydro-1,2-oxazole-5-carboxamide | 432.0 |

Biological Assays

*Mycobacterium tuberculosis* (Mtb) Growth Assay

Inhibition of *Mycobacterium tuberculosis* (Mtb) growth was assessed on two in vivo-relevant carbon sources, glucose and cholesterol, at pH 6.8. For glucose as a carbon source, the media consisted of Middlebrook 7H9 broth supplemented with 4 g/L glucose, 0.08 g/L NaCl, 5 g/L BSA fraction V and 0.05% tyloxapol. For cholesterol as a carbon source, the media consisted of Middlebrook 7H9 broth supplemented with 97 mg/L cholesterol, 0.08 g/L NaCl, 5 g/L BSA fraction V and 0.05% tyloxapol. Mtb expressing green fluorescent protein (Mtb-GFP; H37Rv pMSP12::GFP) was pre-adapted to growth on the relevant carbon source in Middlebrook 7H9-broth base supplemented with bovine serum albumin and tyloxapol prior to the screen. Bacteria were dispensed into 384-well microtiter plates at approximately $2\times10^4$ actively growing cells in 24 μL volumes per well. Microtiter plates were pre-dispensed with 0.2 compound, dimethylsulfoxide (negative control) or rifampicin (25 μM; positive control). Cells were exposed to 2-fold serial dilutions of compounds from 50 μM to 0.049 μM. In some experiments, compounds were tested at lower concentrations. Growth inhibition was assessed after a 7-day growth period by measuring fluorescence using a spectrophotometer. In negative control wells, cells were still actively growing at the time of readout. The lowest concentration of test compound required to inhibit 95% of the growth of the bacteria was defined as the MITC95. All studies were done in a BSL3 facility.

Mitochondrial Protein Synthesis Assay

Inhibition of mitochondrial protein synthesis was assessed in HepG2 cells by comparing the levels of two subunits of oxidative phosphorylation enzyme complexes, subunit I of Complex IV (COX-I) and the 70 kDa subunit of Complex II (SDH-A). COX-I is mitochondrial DNA encoded and SDH-A is nuclear DNA encoded. HepG2 cells were seeded in 96-well collagen coated plates at 8,000 cells per well and exposed to 2-fold serial dilutions of compounds from 100 μM to 6.25 Microtiter plates were incubated for approximately 5 replication cycles (4 days) prior to assessment of protein levels using a kit as described by the manufacturer (ab110217 MitoBiogenesis In Cell ELISA Kit, Abcam, Cambridge, MA). Inhibition of mitochondrial protein synthesis was expressed as a ratio of COX-1 to SDH-A levels.

| Example | Mtb Cho MITC95_μM | Mtb Glu MITC95_μM | MPS IC50_μM |
|---|---|---|---|
| 1 | 1.2 | 1.2 | 93 |
| 2 | 1.6 | 1.6 | >100 |
| 3 | 0.14 | 0.12 | 6.2 |
| 4 | 3.12 | 3.12 | >100 |
| 5 | 3.12 | 3.12 | |
| 6 | 1.56 | 1.56 | >100 |
| 7 | 2.34 | 2.73 | >100 |
| 8 | 3.12 | 3.12 | >100 |
| 9 | 2.34 | 2.73 | >100 |
| 10 | 0.19 | 0.19 | 22 |
| 11 | 1.17 | 0.975 | >100 |
| 12 | 0.78 | 0.78 | >100 |
| 13 | 1.2 | 1.0 | 24 |
| 14 | 0.12 | 0.12 | 42 |
| 15 | 0.055 | 0.035 | 4.3 |
| 16 | 0.59 | 0.39 | 5.4 |
| 17 | 0.39 | 0.39 | |
| 18 | 0.39 | 0.39 | 13 |
| 19 | 9.38 | 6.25 | >100 |
| 20 | 0.19 | 0.39 | 7.2 |
| 21 | 1.56 | 1.56 | >100 |
| 22 | 0.49 | 0.29 | 25 |
| 23 | 0.78 | 1.56 | 16 |
| 24 | 3.12 | 3.12 | 76 |
| 25 | 0.09 | 0.19 | 2.5 |
| 26 | 0.39 | 0.39 | 28 |
| 27 | 0.78 | 0.78 | 37 |
| 28 | 0.78 | 1.56 | 62 |
| 29 | 1.56 | 1.56 | >100 |
| 30 | 1.56 | 1.56 | >100 |
| 31 | 5.47 | 4.69 | >100 |
| 32 | 0.09 | 0.065 | 0.77 |
| 33 | 1.66 | 1.56 | >100 |
| 34 | 0.09 | 0.09 | 2.6 |
| 35 | 3.12 | 3.12 | >50 |
| 36 | 0.39 | 0.39 | 5.9 |
| 37 | 1.56 | 0.78 | 65 |
| 38 | 1.56 | 0.78 | 44 |
| 39 | 1.56 | 0.78 | >100 |
| 40 | 1.56 | 1.56 | >100 |
| 41 | 2.34 | 1.56 | >100 |
| 42 | 0.78 | 0.78 | 64 |
| 43 | 0.19 | 0.19 | 4.1 |
| 44 | 0.12 | 0.09 | 1.4 |
| 45 | 0.39 | 0.19 | 4.0 |
| 46 | 0.78 | 1.56 | 20 |
| 47 | 6.25 | 6.25 | >100 |
| 48 | 6.25 | 6.25 | >100 |
| 49 | 0.17 | 0.15 | 51 |
| 50 | 3.12 | 3.12 | >100 |
| 51 | 0.09 | 0.09 | 1.4 |
| 52 | 0.78 | 0.78 | 27 |
| 53 | 6.25 | 6.25 | >100 |
| 54 | 1.17 | 0.78 | 45 |
| 55 | 3.12 | 3.12 | >100 |
| 56 | 6.25 | 13 | >100 |
| linezolid | 3.14 | 4.58 | 8 |

What is claimed is:

1. A compound, or a pharmaceutically acceptable salt thereof, having the structure:

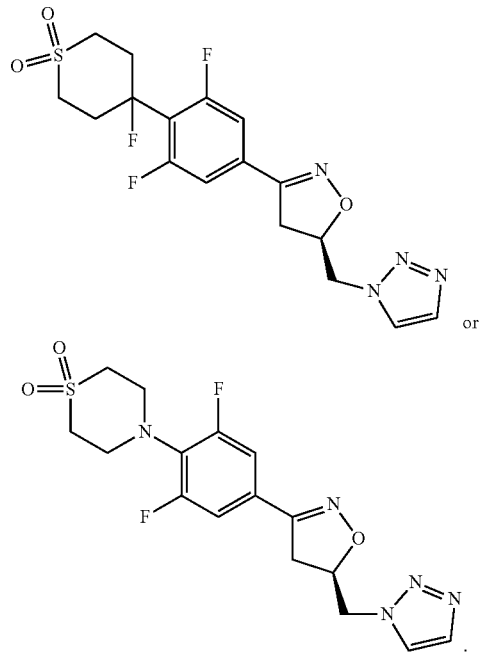

or

2. A compound, or a pharmaceutically acceptable salt thereof, having the structure:

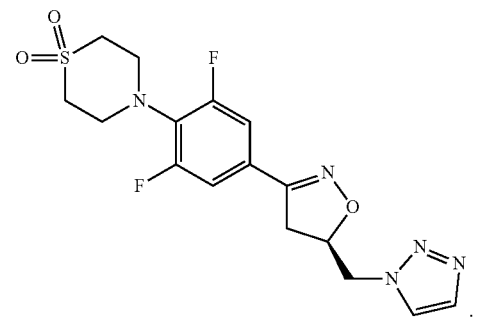 [SMILES: O=S1(=O)CCN(c2c(F)cc(C3=NO[C@@H](Cn4ccnn4)C3)cc2F)CC1]

3. A compound having the structure:

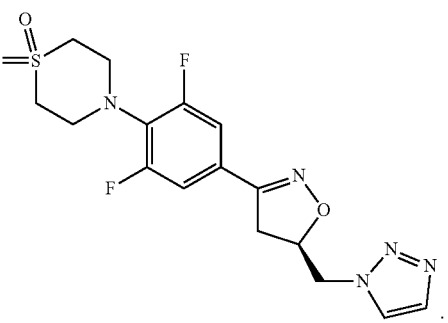

4. A compound, or a pharmaceutically acceptable salt thereof, having the structure:

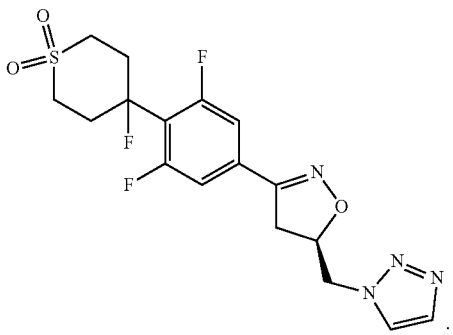 [SMILES: O=S1(=O)CCC(F)(c2c(F)cc(C3=NO[C@@H](Cn4ccnn4)C3)cc2F)CC1]

5. A compound having the structure:

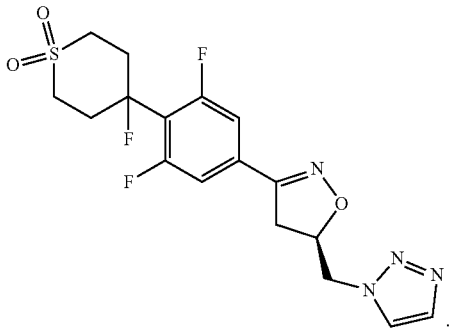 [SMILES: O=S1(=O)CCC(F)(c2c(F)cc(C3=NO[C@@H](Cn4ccnn4)C3)cc2F)CC1]

6. A pharmaceutical composition which comprises a therapeutically effective amount of a compound according to claim 1, or a pharmaceutically acceptable salt thereof, and a pharmaceutically acceptable carrier.

7. A method for treating a bacterial infection which comprises administering to a subject in need of such treatment (i) a therapeutically effective amount of a compound according to claim 1, or a pharmaceutically acceptable salt thereof.

8. The method according to claim 7, wherein the compound or the pharmaceutically acceptable salt thereof is administered orally, parenterally, or topically.

9. The method of claim 7, wherein the bacterial infection is due to *Mycobacterium tuberculosis*.

10. The method according to claim 9, wherein the *Mycobacterium tuberculosis* is a drug resistant mycobacterial strain.

11. The method according to claim 9, further comprising the step of administering a second therapeutic agent for treating *Mycobacterium tuberculosis*.

12. The method of claim 11, wherein the second therapeutic agent is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

13. A pharmaceutical composition which comprises a therapeutically effective amount of a compound according to claim 2, or a pharmaceutically acceptable salt thereof, and a pharmaceutically acceptable carrier.

14. A method for treating a bacterial infection which comprises administering to a subject in need of such treatment (i) a therapeutically effective amount of a compound according to claim 2, or a pharmaceutically acceptable salt thereof.

15. The method according to claim 14, wherein the compound or the pharmaceutically acceptable salt thereof is administered orally, parenterally, or topically.

16. The method of claim 14, wherein the bacterial infection is due to *Mycobacterium tuberculosis*.

17. The method according to claim 16, wherein the *Mycobacterium tuberculosis* is a drug resistant mycobacterial strain.

18. The method according to claim 16, further comprising the step of administering a second therapeutic agent for treating *Mycobacterium tuberculosis*.

19. The method of claim 18, wherein the second therapeutic agent is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

20. A pharmaceutical composition which comprises a therapeutically effective amount of a compound according to claim 4, or a pharmaceutically acceptable salt thereof, and a pharmaceutically acceptable carrier.

21. A method for treating a bacterial infection which comprises administering to a subject in need of such treatment (i) a therapeutically effective amount of a compound according to claim 4, or a pharmaceutically acceptable salt thereof.

22. The method according to claim 21, wherein the compound or the pharmaceutically acceptable salt thereof is administered orally, parenterally, or topically.

23. The method of claim 21, wherein the bacterial infection is due to *Mycobacterium tuberculosis*.

24. The method according to claim 23, wherein the *Mycobacterium tuberculosis* is a drug resistant mycobacterial strain.

25. The method according to claim 23, further comprising the step of administering a second therapeutic agent for treating *Mycobacterium tuberculosis*.

26. The method of claim 25, wherein the second therapeutic agent is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, thiacetazone, meropenem-clavulanate, and thioridazine.

27. A pharmaceutical composition which comprises a therapeutically effective amount of a compound according to claim 3, and a pharmaceutically acceptable carrier.

28. A method for treating a bacterial infection which comprises administering to a subject in need of such treatment (i) a therapeutically effective amount of a compound according to claim 3.

29. The method of claim 28, wherein the bacterial infection is due to *Mycobacterium tuberculosis*.

30. A pharmaceutical composition which comprises a therapeutically effective amount of a compound according to claim 5, and a pharmaceutically acceptable carrier.

31. A method for treating a bacterial infection which comprises administering to a subject in need of such treatment (i) a therapeutically effective amount of a compound according to claim 5.

32. The method of claim 31, wherein the bacterial infection is due to *Mycobacterium tuberculosis*.

\* \* \* \* \*